United States Patent
Iyer et al.

(10) Patent No.: US 12,284,675 B2
(45) Date of Patent: Apr. 22, 2025

(54) CHANNELIZATION AND BWP

(71) Applicant: InterDigital Patent Holdings, Inc., Wilmington, DE (US)

(72) Inventors: Lakshmi R. Iyer, King of Prussia, PA (US); Guodong Zhang, Woodbury, NY (US); Joseph M. Murray, Schwenksville, PA (US); Qing Li, Princeton Junction, NJ (US); Allan Y. Tsai, Boonton, NJ (US); Pascal M. Adjakple, Great Neck, NY (US); Mohamed Awadin, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/438,372

(22) Filed: Feb. 9, 2024

(65) Prior Publication Data
US 2024/0276542 A1 Aug. 15, 2024

Related U.S. Application Data

(63) Continuation of application No. 17/052,871, filed as application No. PCT/US2019/024620 on Mar. 28, 2019, now Pat. No. 11,950,280.
(Continued)

(51) Int. Cl.
*H04W 74/0808* (2024.01)
*H04L 5/00* (2006.01)
(Continued)

(52) U.S. Cl.
CPC ......... *H04W 74/0808* (2013.01); *H04L 5/001* (2013.01); *H04L 5/0092* (2013.01);
(Continued)

(58) Field of Classification Search
CPC ..... H04W 74/0808; H04W 72/23–232; H04W 72/0453; H04L 5/001; H04L 5/0092
See application file for complete search history.

(56) References Cited

U.S. PATENT DOCUMENTS

| 9,603,164 B2 | 3/2017 | Davydov et al. |
| 10,721,762 B2 | 7/2020 | Amuru et al. |

(Continued)

FOREIGN PATENT DOCUMENTS

| CN | 101990242 A | 3/2011 |
| CN | 102577223 A | 7/2012 |

(Continued)

OTHER PUBLICATIONS

Nokia et al: Channel access and co-existence for NR-U operation11, 3GPP Draft; R1-1804313 Channel Access, 3GPP, Mobile Competence Centre, Apr. 15.
(Continued)

*Primary Examiner* — Kevin C. Harper
(74) *Attorney, Agent, or Firm* — Flaster Greenberg, P.C.

(57) ABSTRACT

Methods, systems, and apparatus designed to support flexible carrier bandwidths in new radio. Multiple carrier bands may be combined into a single composite carrier depending on channel availability in the carrier bands. A composite carrier indicator (CCI) indicates to network devices, the available carrier bands within the channel occupancy time. In addition, bandwidth part inactivity time is suspended when channel access is not available.

20 Claims, 74 Drawing Sheets

Related U.S. Application Data

(60) Provisional application No. 62/687,598, filed on Jun. 20, 2018, provisional application No. 62/669,728, filed on May 10, 2018.

(51) Int. Cl.
  *H04W 72/0453* (2023.01)
  *H04W 72/23* (2023.01)
  *H04W 74/00* (2009.01)

(52) U.S. Cl.
  CPC ....... *H04W 72/0453* (2013.01); *H04W 72/23* (2023.01); *H04W 74/006* (2013.01)

(56) References Cited

U.S. PATENT DOCUMENTS

| | | |
|---|---|---|
| 2011/0105050 A1 | 5/2011 | Khandekar et al. |
| 2011/0243083 A1 | 10/2011 | Zhang et al. |
| 2016/0066195 A1 | 3/2016 | Moon et al. |
| 2016/0127913 A1 * | 5/2016 | Li .................. H04W 72/0453 370/329 |
| 2016/0309467 A1 | 10/2016 | Yerramalli et al. |
| 2016/0316473 A1 | 10/2016 | Wang et al. |
| 2016/0366684 A1 | 12/2016 | Kim et al. |
| 2017/0339696 A1 | 11/2017 | Xu et al. |
| 2017/0347270 A1 | 11/2017 | Ouchi et al. |
| 2018/0049198 A1 | 2/2018 | Viger et al. |
| 2019/0053265 A1 | 2/2019 | Kim et al. |
| 2019/0141734 A1 | 5/2019 | Lei et al. |
| 2019/0239253 A1 | 8/2019 | Tomeba et al. |
| 2019/0253200 A1 | 8/2019 | Salem et al. |
| 2019/0268912 A1 | 8/2019 | Myung et al. |
| 2019/0342915 A1 | 11/2019 | Kim et al. |
| 2019/0373635 A1 | 12/2019 | Yang et al. |
| 2020/0059961 A1 | 2/2020 | Do et al. |
| 2020/0128517 A1 | 4/2020 | Dinan |
| 2020/0305193 A1 | 9/2020 | Kim et al. |
| 2020/0404709 A1 | 12/2020 | Zhang |

FOREIGN PATENT DOCUMENTS

| | | |
|---|---|---|
| CN | 105392202 A | 3/2016 |
| CN | 106416117 A | 2/2017 |
| JP | 2017-228815 A | 12/2017 |
| JP | 2018-512016 A | 4/2018 |
| JP | 2018-523438 A | 8/2018 |
| JP | 2018-532314 A | 11/2018 |
| JP | 2019-507537 A | 3/2019 |
| WO | WO 2016/072488 A1 | 5/2016 |
| WO | WO 2016/072495 A1 | 5/2016 |
| WO | WO 2017/010764 A1 | 1/2017 |
| WO | WO 2017/066803 A1 | 4/2017 |
| WO | WO 2017/126935 A1 | 7/2017 |
| WO | 2017171347 A1 | 10/2017 |
| WO | WO 2018/008458 A2 | 1/2018 |
| WO | 2021106843 A1 | 6/2021 |

OTHER PUBLICATIONS

Third Generation Partnership Project (3GPP), "PDCCH Structure for Carrier Aggregation in LTE-Advanced", Sharp, R1-093184, Aug. 24-28, 2009, 4 pages.

Third Generation Partnership Project (3GPP), "On AUL Configuration and Activation", Ericsson, 3GPP TSG RAN WG1 Meeting #91, Reno, USA, Nov. 27 Dec. 1, 2017, R1-1720372, 8 pages.

* cited by examiner

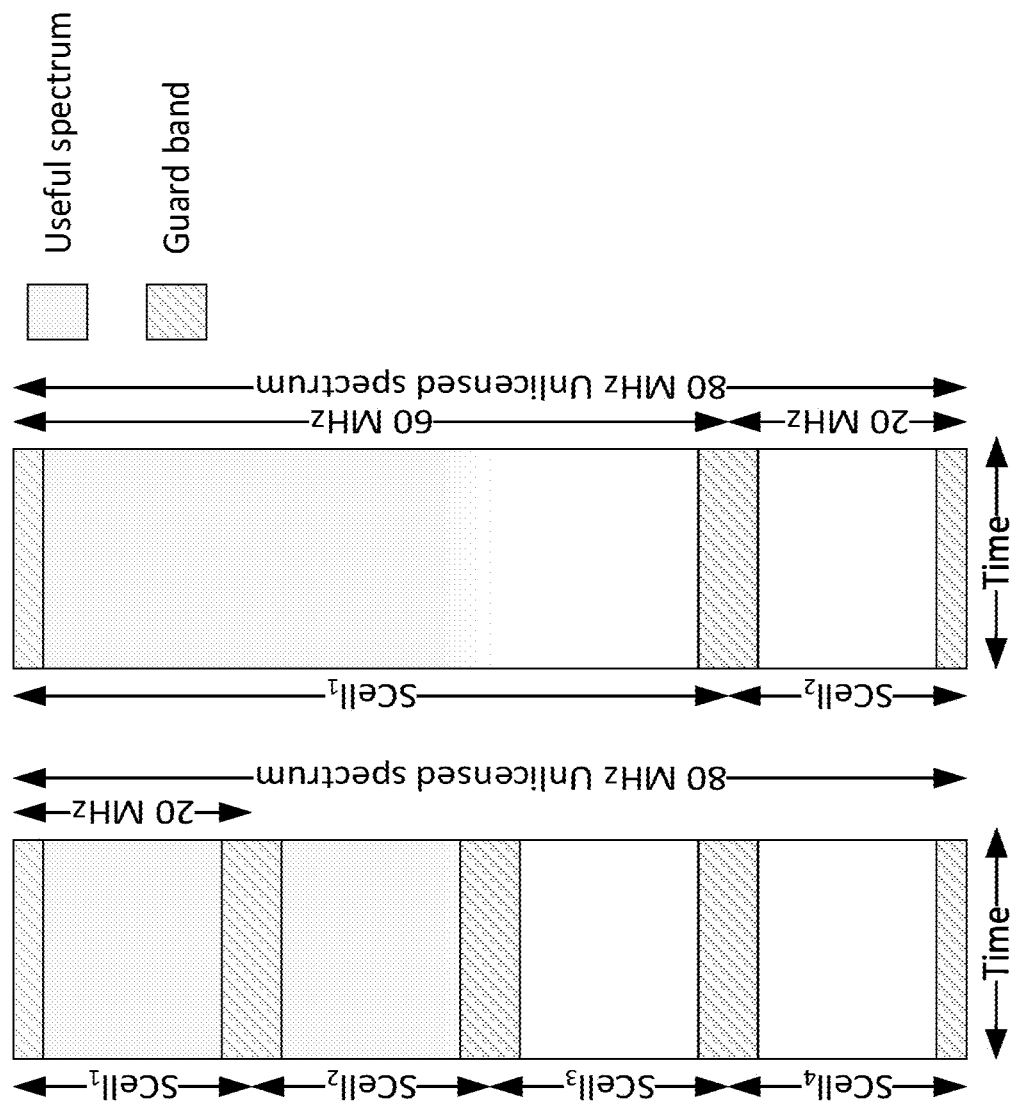

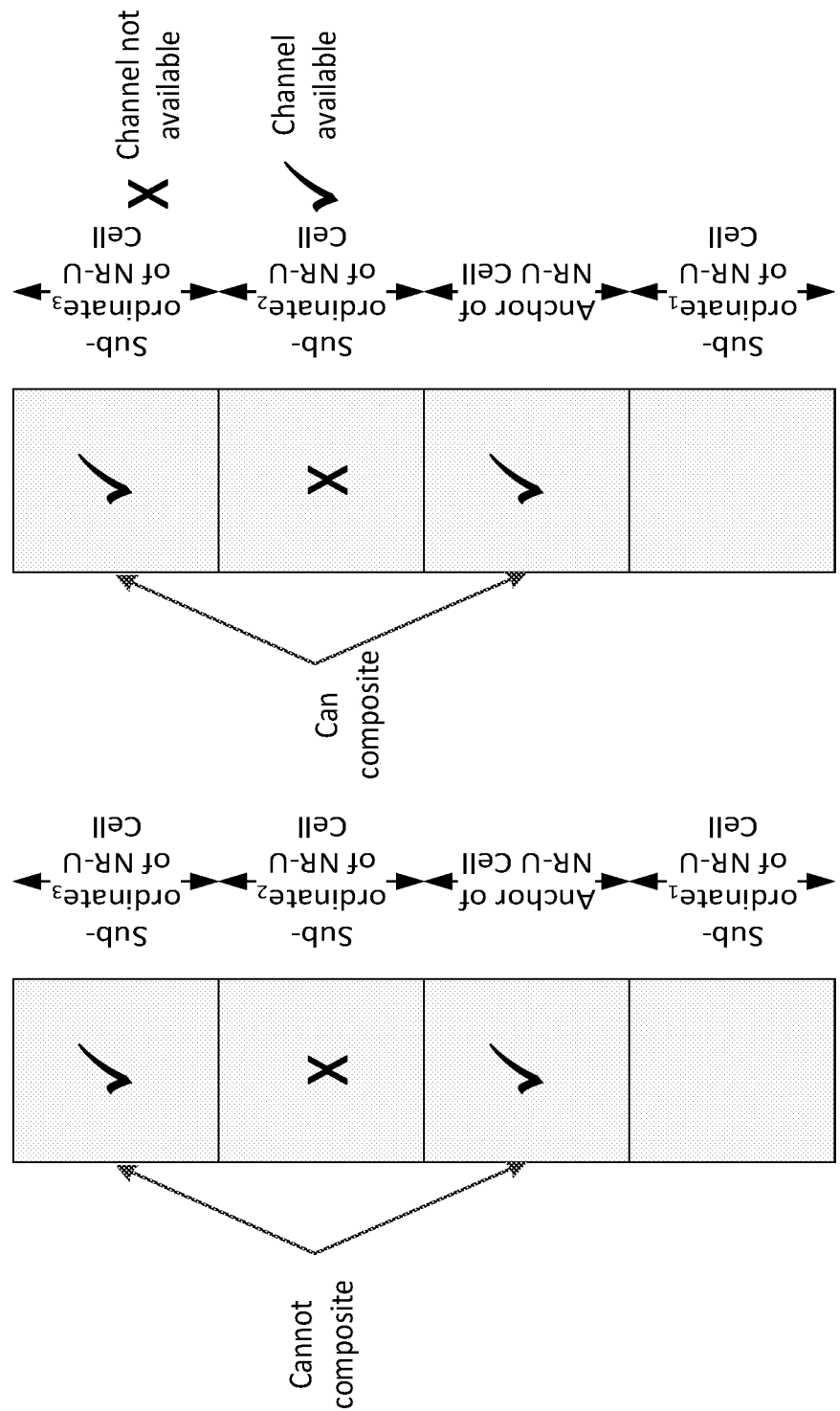

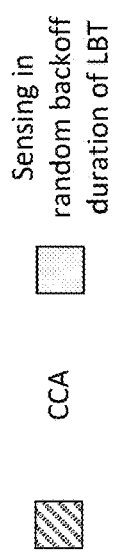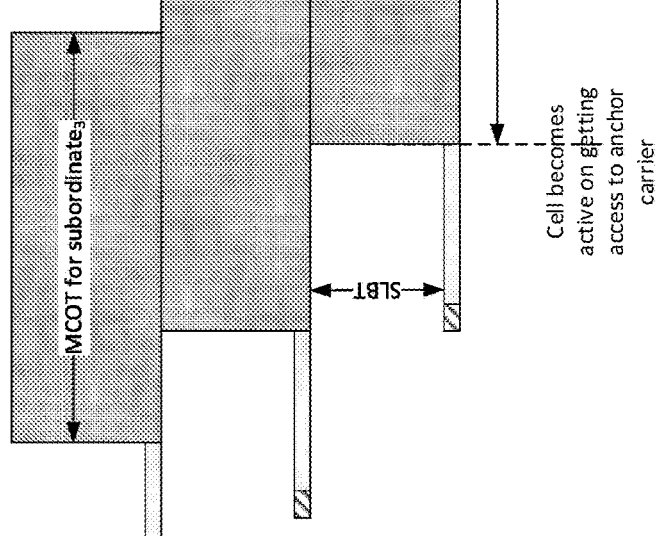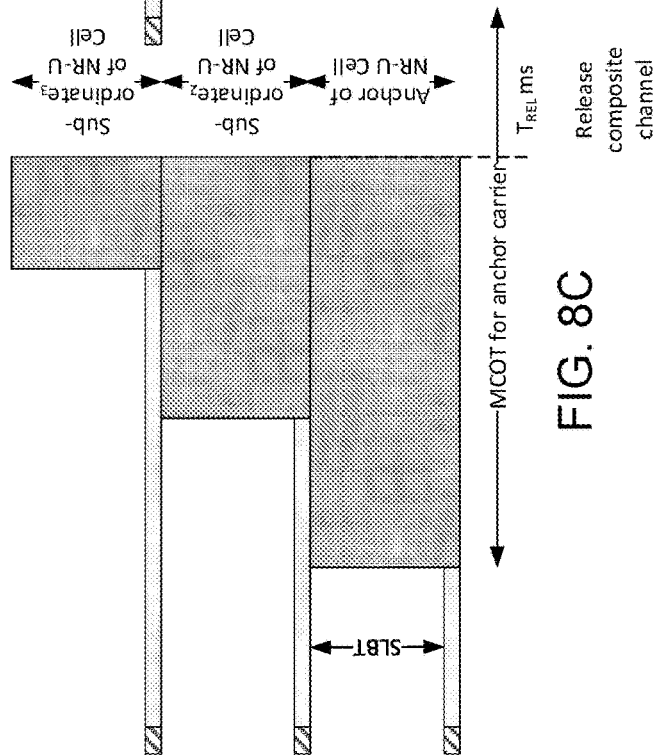
FIG. 8C
FIG. 8D

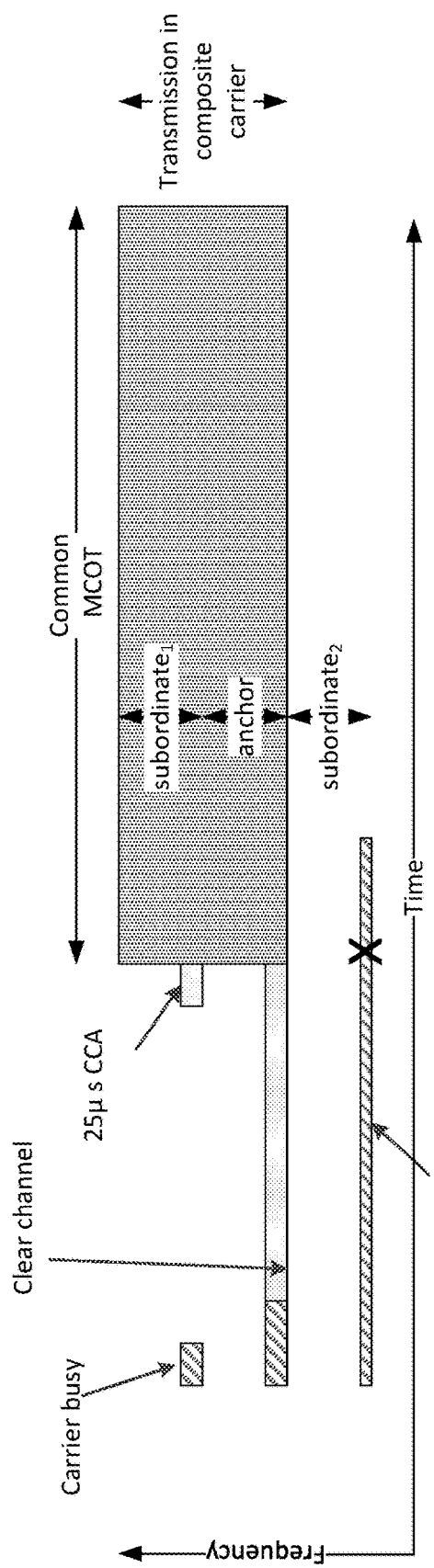
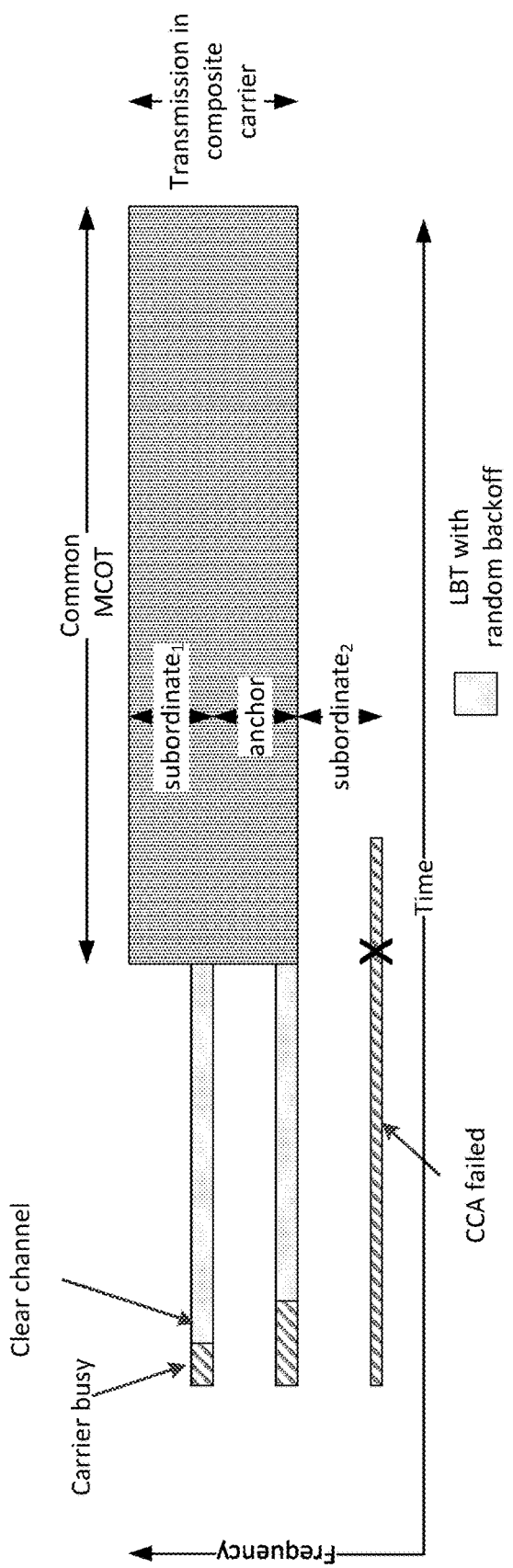
FIG. 16A
FIG. 16B

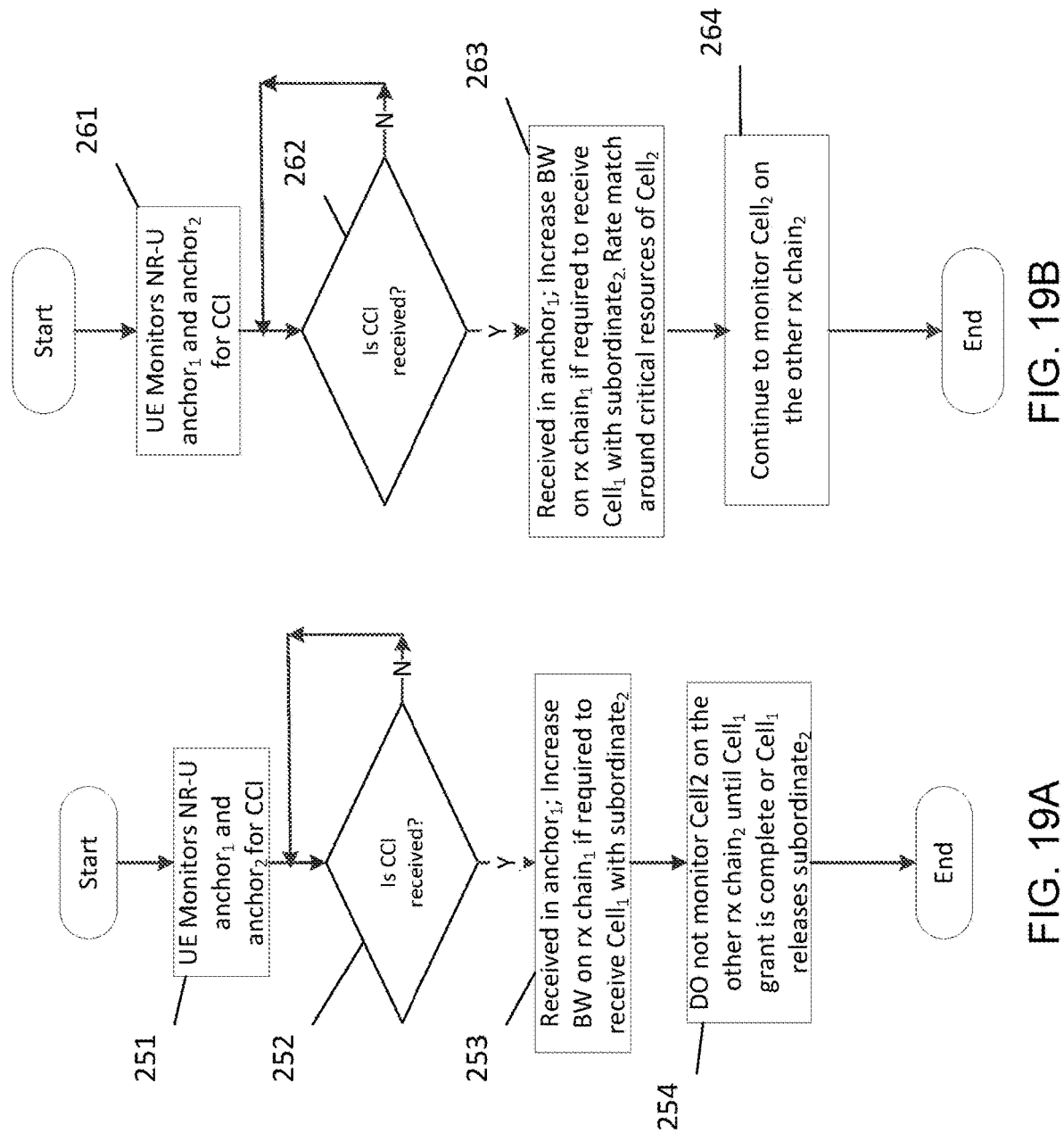

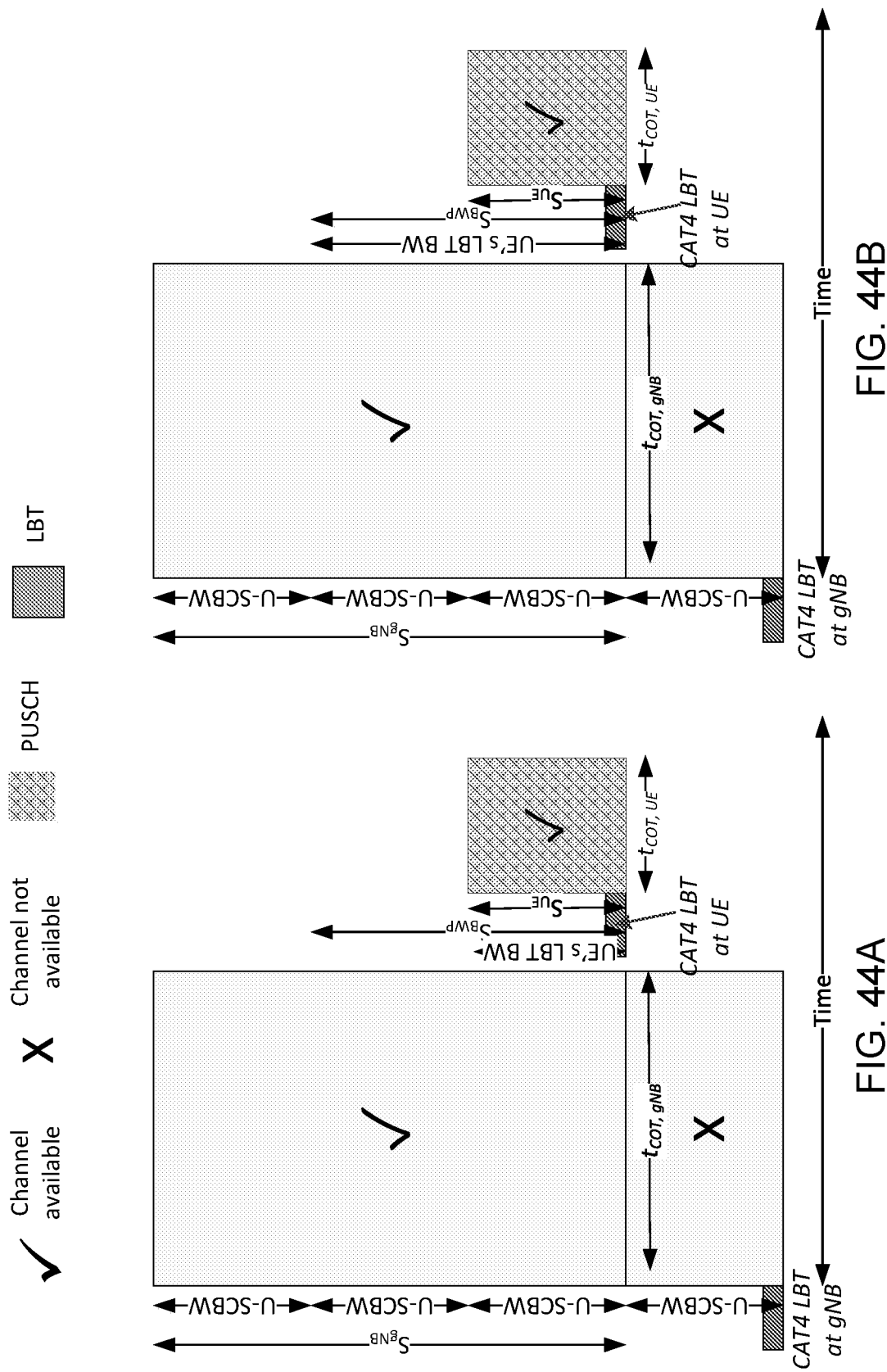

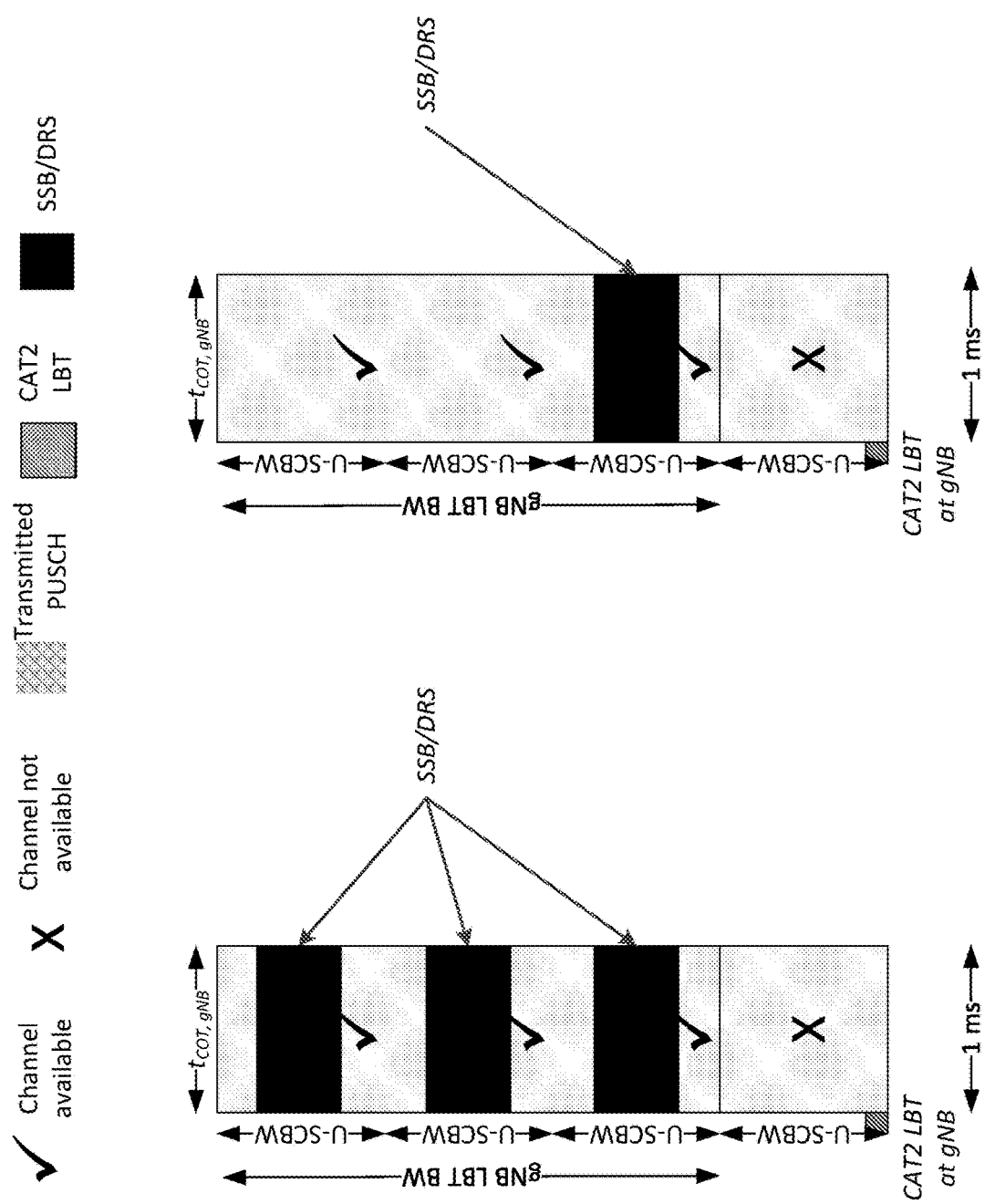

CHANNELIZATION AND BWP

CROSS-REFERENCE TO RELATED APPLICATIONS

This application is a continuation of U.S. patent application Ser. No. 17/052,871, filed Nov. 4, 2020, which is the National Stage entry under 35 U.S.C. § 371 Patent Cooperation Treaty Application No. PCT/US2019/024620, filed Mar. 28, 2019, which claims the benefit of U.S. Provisional Patent Application No. 62/669,728, filed on May 10, 2018, entitled "Channelization And BWP," and U.S. Provisional Patent Application No. 62/687,598, filed on Jun. 20, 2018, entitled "Channelization and BWP," the contents of both are hereby incorporated by reference herein.

BACKGROUND

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA ENB and UE apply Listen-Before-Talk (LBT) before performing a transmission on LAA SCell. LBT is a procedure whereby radio transmitters first sense the medium and transmit only if the medium is sensed to be idle. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

Various LBT approaches exist, but the one recommended by 3GPP is called LBT-Load Based Equipment Category 4. This adds a random access protocol similar to WiFi to ensure not only LTE/WiFi coexistence but a standardized way to ensure LTE/LTE coexistence. In Rel-14, several channel access procedures are introduced to be performed by eNB and UE for both downlink (DL) and uplink (UL) transmissions, respectively. The main channel access procedure is described in Section 15 of TS 36.21335n (Release 15), V15.0.0.

LTE frame structure type 3 is applicable to LAA secondary cell operation with normal cyclic prefix only. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots i and 2i+1. The 10 subframes within a radio frame are available for downlink or uplink transmissions. Downlink transmissions occupy one or more consecutive subframes, starting anywhere within a subframe and ending with the last subframe either fully occupied or following one of the DwPTS durations in as specified in Table 4.2-1 of TS 36.21335n (Release 15), V15.0.0. Uplink transmissions occupy one or more consecutive subframes.

3GPP TR 38.913 defines scenarios and requirements for next generation access technologies. The Key Performance Indicators (KPIs) for eMBB, URLLC and mMTC devices are summarized in Table 1.

TABLE 1

| KPIs for eMBB, URLLC and mMTC Devices | | | |
|---|---|---|---|
| Device | KPI | Description | Requirement |
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes within 1 ms, which is the time it takes to deliver a small data packet from the radio protocol layer 2/3 SDU ingress point to the radio protocol layer 2/3 SDU point of the radio interface, at a certain channel quality (e.g., coverage-edge). | $1-10^{-5}$ within 1 ms |

TABLE 1-continued

KPIs for eMBB, URLLC and mMTC Devices

| Device | KPI | Description | Requirement |
|---|---|---|---|
| mMTC | Coverage | MaxCL in uplink and downlink between device and Base Station site (antenna connector(s)) for a data rate of 160 bps, where the data rate is observed at the egress/ingress point of the radio protocol stack in uplink and downlink. | 164 dB |
| | UE Battery Life | UE battery life can be evaluated by the battery life of the UE without recharge. For mMTC, UE battery life in extreme coverage shall be based on the activity of mobile originated data transfer consisting of 200 bytes UL per day followed by 20 bytes DL from MaxCL of 164 dB, assuming a stored energy capacity of 5 Wh. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

To coordinate inter-technology spectrum access in a distributed and simple manner, a transmitter must first detect the energy across the intended transmission band. This energy detection (ED) mechanism informs the transmitter of ongoing transmissions by other nodes, and helps it to decide whether to transmit or not. However, although simple, this scheme, also known as listen-before-talk (LBT), does not work in all circumstances, for example, when information is encoded to be received below background noise level, or when the nodes are distant and the signals are weak at the receiver. Thus, a node wishing to transmit may sense the channel as unoccupied according to the energy received being below a certain ED threshold, but may still interfere with a nearby node that is receiving.

Nonetheless, LBT is the starting point for coexistence, and is mandatory in many countries' unlicensed band regulations. The ED threshold cannot be lowered too much as false detections would occur due to noise. Consequently, there is a need for additional information for effective inter and intra technology wireless media access.

The 802.11 media access control (MAC) protocol augments the ED mechanism with a virtual carrier sense (VCS) mechanism, whereby 802.11 packet headers are received and decoded at the lowest power levels due to using the most robust modulation and coding. The network allocation vector (NAV), i.e. timeline at each station (STA) of when the channel is free or occupied, is updated based on the contents of such header or control packets, which indicate for how long the channel will be used. For example, the request-to-send/clear-to-send (RTS/CTS) mechanism reserves the channel by causing the NAV to be updated by all nodes that receive the RTS around the transmitter and CTS around the receiver. However, even the VCS has problems, as the capture effect, which causes the stronger overlapped packet to be captured over the weaker one, results in unfairness as the stronger node doesn't experience a collision and the weaker node backs off.

The virtual carrier-sensing is a logical abstraction which limits the need for physical carrier-sensing at the air interface in order to save power. The MAC layer frame headers include a durationfield that specifies the transmission time required for the frame, in which time the medium will be busy. The stations listening on the wireless medium read the Duration field and set their NAV, which is an indicator for a station on how long it must defer from accessing the medium. The NAV may be thought of as a counter, which counts down to zero at a uniform rate. When the counter is zero, the virtual CS indication is that the medium is idle; when nonzero, the indication is busy.

There are two types of LTE access on unlicensed frequencies: LAA, which acts as a supplemental downlink to a licensed LTE carrier (note: unlicensed uplink eLAA is still attached to licensed carrier), and MulteFire, which is characterized by fully standalone operation in the unlicensed band. See MulteFire Release 1.0.1. https://www.multefire.org/specification. In LAA, both the licensed and unlicensed bands are operational at the same time, i.e. data may be received over both bands simultaneously. The PBCH is carried only on the licensed carrier. However Rel-12 discovery reference signals (DRS), which includes the PSS, are transmitted at 40 ms intervals on the unlicensed carrier. Detection of DRS alone does not provide further information, i.e. cell id, and one cannot even determine the operator. MulteFire transmissions do include the PBCH/PDSCH in their downlink transmissions, now called ePBCH, which doubles the energy in the PSS and secondary synchronization signal (SSS) sequences to improve detectability.

With Bandwidth Adaptation (BA), the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1 describes a scenario where 3 different BWPs are configured: 1) BWP1 with a width of 40 MHz and subcarrier spacing of 15 kHz; 2) BWP2 with a width of 10 MHZ and subcarrier spacing of 15 kHz; and 3) BWP3 with a width of 20 MHz and subcarrier spacing of 60 KHz.

A Serving Cell may be configured with at most four BWPs, and for an activated Serving Cell, there is always one active BWP at any point in time. The BWP switching for a Serving Cell is used to activate an inactive BWP and deactivate an active BWP at a time, and is controlled by the physical downlink control channels (PDCCH) indicating a downlink assignment or an uplink grant. Upon addition of SpCell (Special Cell) or activation of an SCell, one BWP is initially active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

SUMMARY

Disclosed herein are methods, systems, and devices that may address one or more of the NR issues disclosed above. Methods, systems, and apparatuses may support flexible carrier bandwidths in new radio. Multiple carrier bands may be combined into a single composite carrier depending on channel availability in the carrier bands. A composite carrier indicator (CCI) indicates to network devices, the available carrier bands within the channel occupancy time (COT). In addition, BWP management is disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 2A exemplary illustration of Channelization of unlicensed spectrum.—example of LTE channelization;

FIG. 2B exemplary illustration of Channelization of unlicensed spectrum—Proposed channelization for NR-U with minimal guard bands between Cells FIG. 3A exemplary illustration of Minimum CBW for NR-U—20 MHz;

FIG. 5A exemplary illustration of Compositing contiguous spectrum;

FIG. 5B exemplary illustration of Compositing non-contiguous spectrum;

FIG. 8C exemplary illustration of CCA/LBT for different compositing methods—Subordinates are added when they become available;

FIG. 8D exemplary illustration of CCA/LBT for different compositing methods—Subordinates with channel access are added to the anchor; the subordinates may b=lose channel access as their MCOT may terminate sooner than the anchor carriers's MCOT;

FIG. 16A exemplary illustration of LBT for compositing the anchor and subordinates—High priority access for subordinates is obtained after LBT for anchor is successful;

FIG. 16B exemplary illustration of LBT for compositing the anchor and subordinates—Same random back off is used for anchor and all subordinates;

FIG. 19A exemplary illustration of Procedure for UE on receiving the CCI, compositing subordinate2 into Cell1 Stop monitoring Cell2;

FIG. 19B exemplary illustration of Procedure for UE on receiving the CCI, compositing subordinate2 into—Cell1 Rate match around Cell2's resources;

FIG. 44A illustrates an example in which UE performs CAT4 LBT for PUSCH transmission—UE performs LBT on U-SCBWs spanning its UL grant;

FIG. 44B illustrates an example in which UE performs CAT4 LBT for PUSCH transmission—UE performs LBT on U-SCBWs spanning its active BWP;

FIG. 50A illustrates an example for SSB/DRS transmission following CAT2 LBT. Following wideband LBT, SSB/DRS is transmitted on multiple raster points across multiple U-SCBWs;

FIG. 50B illustrates an example for SSB/DRS transmission following CAT2 LBT—SSB/DRS is transmitted on predetermined raster point following wideband LBT;

DETAILED DESCRIPTION

New radio (NR) may be designed to support flexible carrier bandwidths (CBWs). In channelizing the unlicensed spectrum for NR-U (creating NR-U carriers), constraints arise due to regulatory requirements for the unlicensed spectrum and incumbent technologies. For example, the ETSI harmonised standard for 5 GHz calls for 20 MHz channels, but also allows operation in smaller bands (as small as 5 MHz) centered at the center of the 20 MHz band. See ETSI EN 301.893, 5 GHZ RAN; Harmonised Standard covering the essential requirements of article 3.2 of Directive 2014/53/EU V2.1.1, 2017-05. NR-U channelization should ensure that the WiFi nodes in the unlicensed band need not change their existing sensing procedures.

The following methods and systems, disclosed herein, may address one or more of the NR issues disclosed above: 1) methods to channelize NR-U spectrum into cells; 2) methods to form a composite cell using an anchor carrier; 3) introduction of Composite Carrier Indicator (CCI) to indicate the configuration of carriers in composite cell; 4) LBT procedures for creating a composite carrier; 5) BWP configurations and procedures in composite cells; 6) UE channel sensing for BWP operation; 7) compositing a carrier without an anchor carrier; or 8) BWP management based on channel availability.

In carrier aggregation in LTE-A, the unlicensed spectrum was supported in maximum carrier bandwidths (CBW) of 20 MHz. Each 20 MHz NR-U spectrum is an SCell. Some spectrum is lost in providing a guard band between adjacent carriers (e.g., frequency bands). So even if the SCells are contiguous, they cannot leverage larger chunks of the bandwidth and utilize the guard band. NR-U operation should leverage the flexibility of NR CBW operation and provide better spectral utilization while ensuring coexistence with incumbent technologies.

Discussed below is channelization in NR-U. In carrier aggregation in LTE-A, up to 20 MHz spectrum may be allocated to an SCell as shown in FIG. 2A where some spectrum is lost in the guard bands between adjacent carriers. On the other hand, NR has flexibility to operate on a wide spectrum. To leverage that flexibility in NR-U disclosed herein is that unlicensed NR-U cells should support operation in the largest available carrier bandwidth thereby avoiding loss of spectrum in guard bands. An example is shown in FIG. 2B where $SCell_1$ uses 60 MHz CBW; so spectrum that was used for guard bands within this cell is now used for in-band transmissions. Note this is just an example and another example may use a single cell with 80 MHz CBW.

The unlicensed-smallest carrier bandwidth (U-SCBW Hz) are defined as the smallest carrier bandwidth (CBW) for a channel or cell in NR-U. An NR-U cell may create a composite carrier of one or more U-SCBWs resulting in the example in FIG. 2B. We refer to creating a channel composed of multiple U-SCBW as "carrier compositing" and the resulting carrier as the "composite carrier".

Figure 1:
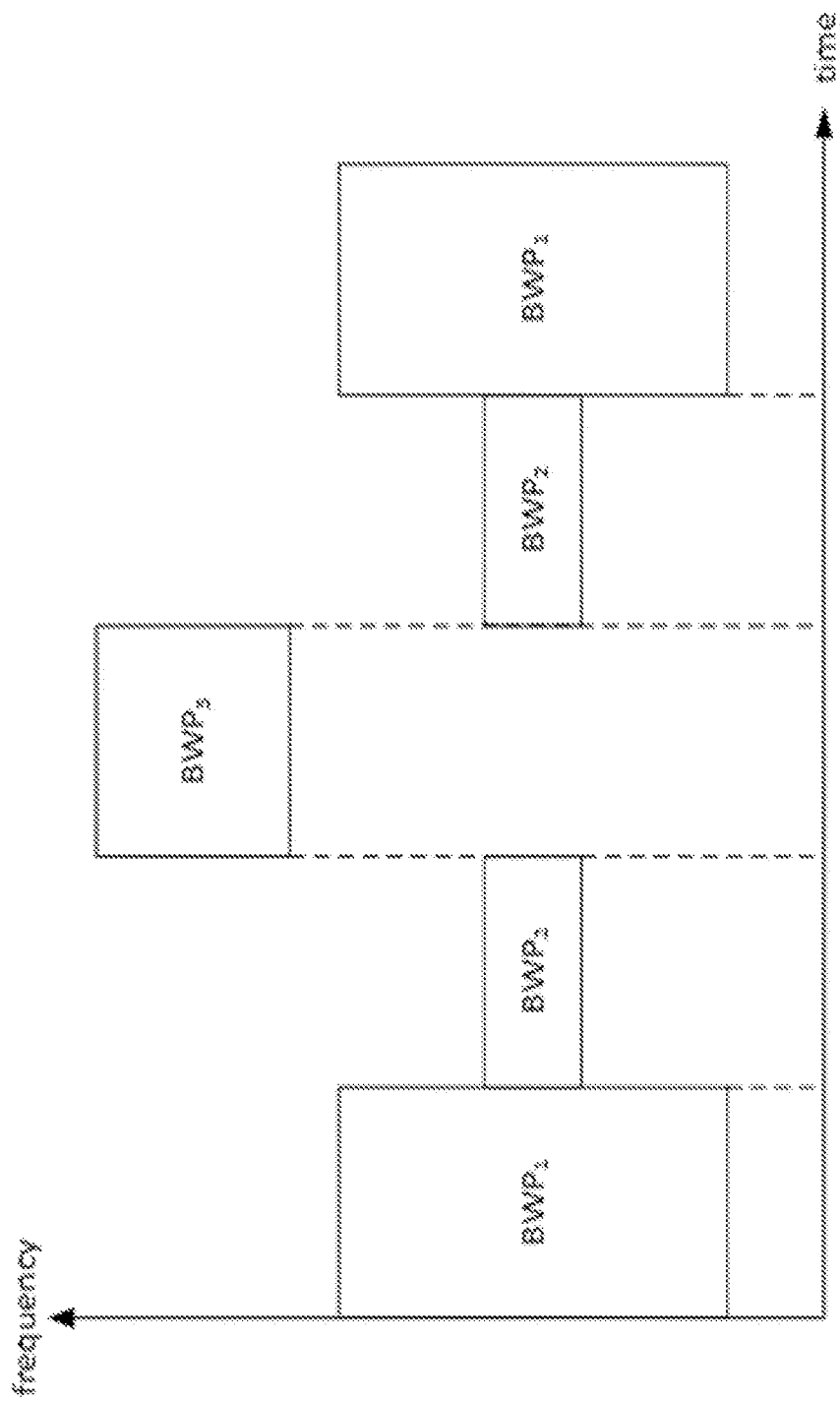
FIG. 1 exemplary illustration of bandwidth adaptation.
Figure 3B:
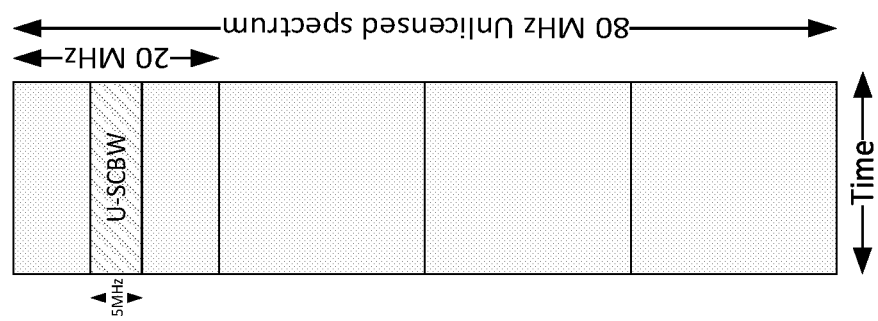
FIG. 3B exemplary illustration of Minimum CBW for NR-U—5 MHz at the center of the 20 MHz carrier.
Figure 3A:
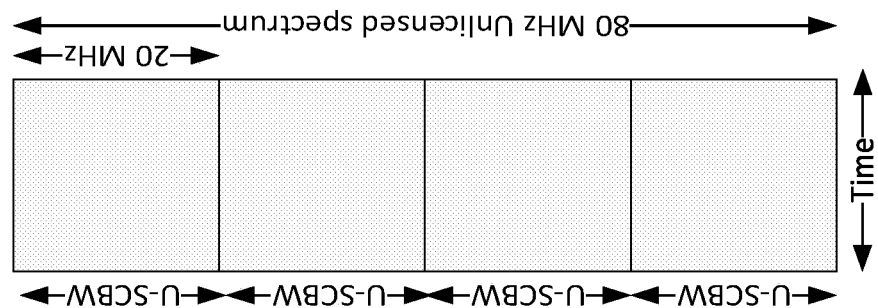

For compatibility with the ETSI harmonised standard for 5 GHZ, NR-U may support the following: 1) U-SCBW=20 MHz so that the channelization is similar to WiFi, as seen in FIG. 3A, in which multiple 20 MHz carriers may be composited into one cell; and 2) Smaller U-SCBW (>=5 MHz) may be supported provided the carrier is at the center of the 20 MHz channel, as seen in FIG. 3B. Smaller U-SCBWs may not be composited as they are centered within the 20 MHz carrier and do not have adjacent U-SCBWs.

Figure 4B:
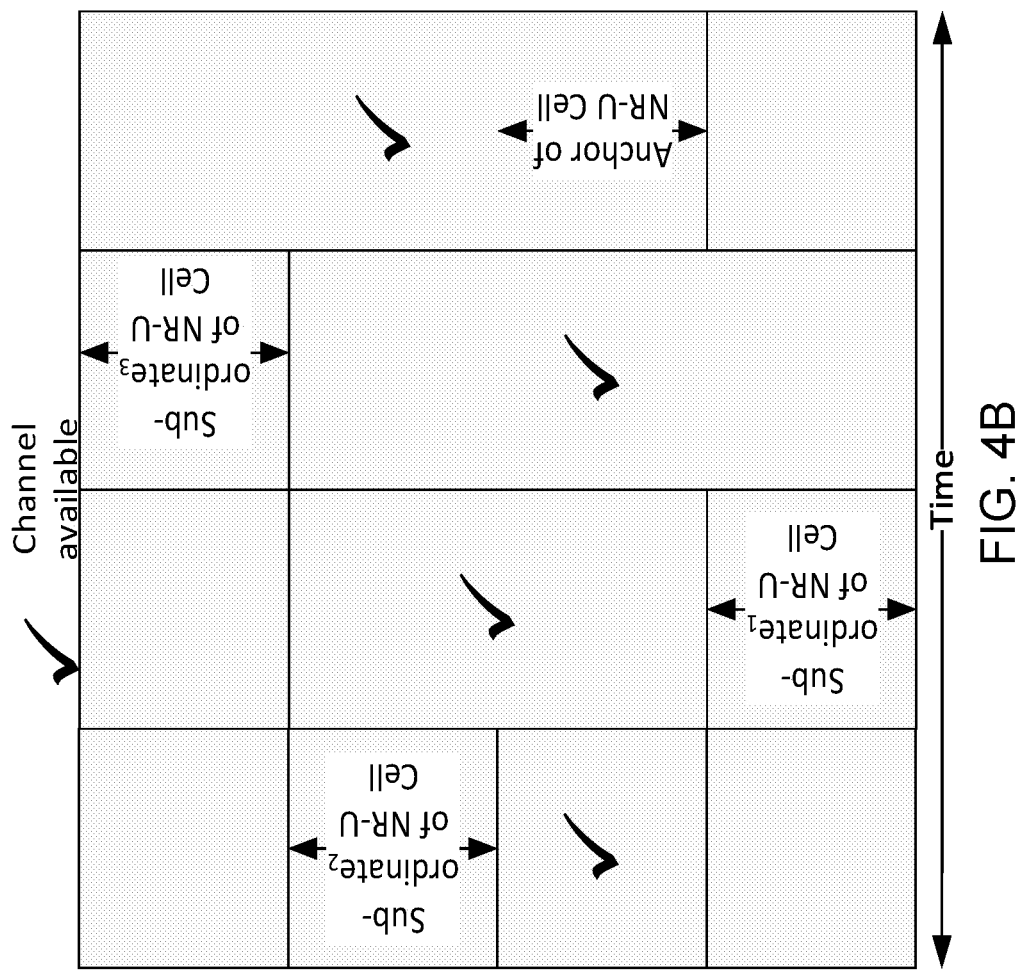
FIG. 4B exemplary illustration of Composited cell—Dynamically varying CBW for composited cell (anchor is present)
Figure 4A:
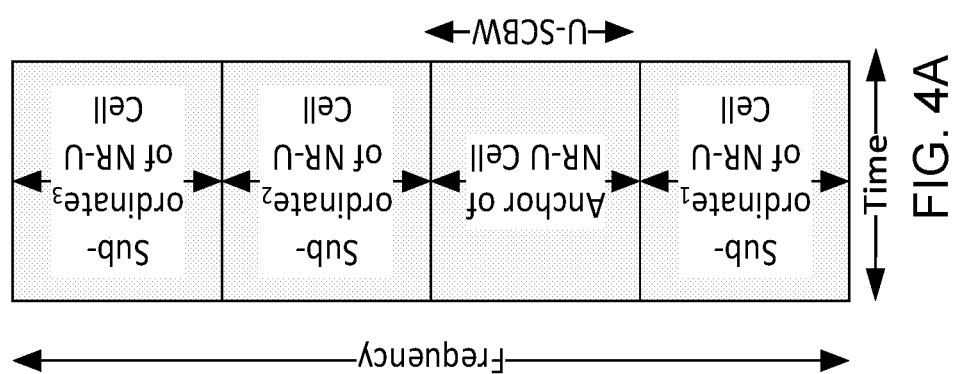
FIG. 4A exemplary illustration of Composited cell—Illustration of anchor and subordinate carriers.

Disclosed below is Carrier Compositing in NR-U. An NR-U cell may be defined by a U-SCBW carrier that may be referred to as the NR-U "anchor carrier." This NR-U cell may be an SCell in CA or a PCell in SA. When other U-SCBW carriers are composited with the anchor carrier, a composite carrier is obtained; the candidate U-SCBWs that may be composited with a first carrier (e.g., an anchor carrier) are referred to as "subordinate carriers." This concept is shown in FIG. 4A. The NR-U cell has one anchor and three subordinates. FIG. 4B shows some ways in which the composite carrier may be obtained—the cell may consist of the anchor alone, or the cell may include the anchor composited with immediate neighbors and even those beyond the immediate neighbors (example: $subordinate_3$ is composited with the anchor and $subordinate_2$). The compositing may be dynamic and change with time. It is contemplated herein that channel access for a common beam (spatial direction) may be used for the anchor and subordinate carriers or channel access to each of the carriers may correspond to a different beam in a different spatial direction. For simplicity, the implementation may use the same beam across the composite carrier. The following subordinates may be composited with the anchor cell: 1) Adjacent subordinates that are immediate neighbors to the anchor; 2) Subordinates adjacent to immediate neighbors; or 3) Other subordinates in the spectrum.

The NR-U composite cell may use the following procedures in compositing the subordinates. The channel should be available at least for the anchor, e.g., CCA/LBT should be successful for the anchor of the cell to perform compositing or access the channel. In the absence or non-availability of subordinates, the cell functions with only the anchor carrier. CCA may be performed as a single interval LBT or a short duration sensing such as the sensing used in eLAA for DRS. An immediate neighbor may be composited if the CCA/LBT on that carrier is successful. A subordinate adjacent to a composited neighbor may be composited if its CCA/LBT is successful. The compositing may be done in one of the following ways: bandwidth gaps allowed or bandwidth gaps not allowed. Bandwidth gaps shown in FIG. 5A may not be allowed in the compositing, e.g., the composite carrier should include a contiguous set of frequency resources. So subordinate$_3$ may not be composited with the anchor. Bandwidth gaps or non-contiguous spectrum may be allowed in the compositing. In FIG. 5B, the subordinate$_3$ may be composited with the anchor. However, in this case guard bands are required at the edges of anchor and subordinate$_3$.

The NR-U composite cell may additionally use the following procedures in compositing the subordinates. A maximum of N subordinate carriers may be composited with the anchor carrier. If a cell has two subordinates available to composite with the anchor carrier but only one is required, it may select the subordinate closest to the anchor as those carriers are more tightly synchronized with the anchor cell. The node may composite only if a minimum of S U-SCBW carriers are available. For example, in 5 MHz with U-SCBW of 20 MHz, compositing may occur only if channel access is available to a 40 MHz chunk of spectrum in addition to the anchor cell. This may ensure that the composited spectrum provides more spectral efficiency compared to the loss of spectrum from the increased overhead due to compositing; the overhead may come from having to signal the configuration of the composited carriers.

When compositing carriers, if nodes perform omni-directional transmission channel sensing on all carriers, they should obtain channel access in all spatial direction. The nodes may also obtain channel access for different spatial directions on each of the composited carriers.

Figure 6:
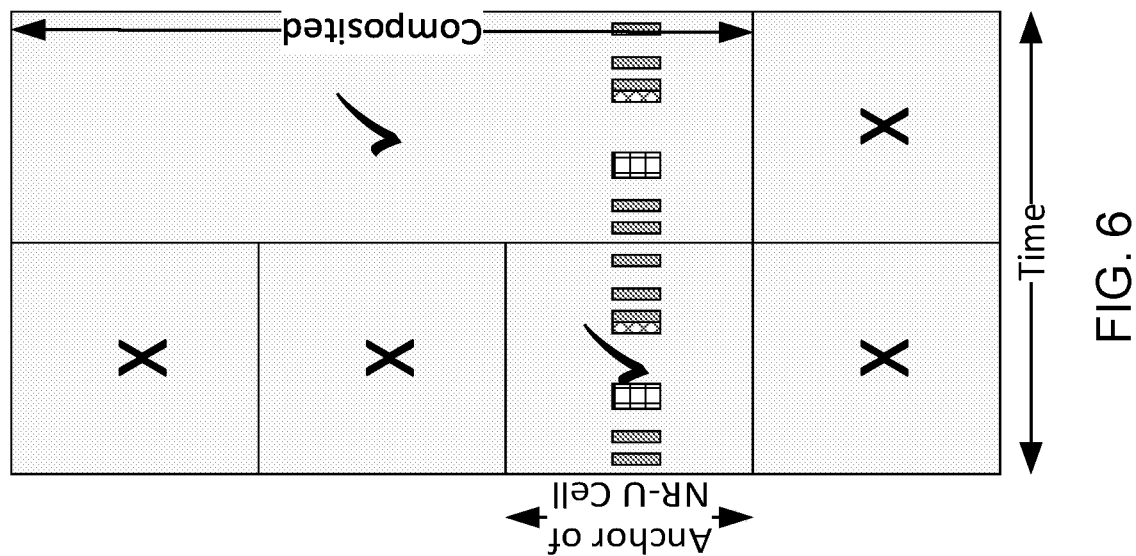
FIG. 6 Signaling information such as SS/PBCH, RACH, etc. in the anchor cell.

Disclosed below is signaling in the anchor carrier. The anchor carrier should be present for an NR-U cell to have channel access. Critical information such as the DRS or SS/PBCH, RMSI CORESET, SI, paging and RACH resources if present (in SA/DC) may be provisioned in the anchor cell. At least cell defining SSBs may be present in the anchor carrier for SA and DC. Even if the composite CBW changes, at least the anchor is available during a channel access, so that the UE performs synchronization and receives paging (for example, in SA/DC) or performs RACH (for RRC in SA/DC or BFR, etc.) on resources within the anchor carrier. These resources may be distinct from potential guard band resources in the anchor carrier which may or may not be available depending on the channel availability of the subordinates. FIG. 6 shows the concept of having these PHY signals within the bandwidth of the anchor carrier. The subordinate carriers may also include other cell defining SSBs and non-cell defining SSBs for measurement.

Disclosed below is signaling information on the composite carrier in the NR-U Cell. As channel availability on a carrier may be dynamic, the availability of subordinate cells may vary dynamically and therefore the bandwidth of the composite carrier may vary dynamically. The composite carrier may be formed both in the DL by the gNB or in the UL by the UE. The node compositing the carriers should indicate the configuration of the composite carrier so that the receiver recognizes how the carrier bandwidth impacts its resources. On the DL, the UE's BWP may change due to the change in the CBW. Guard band PRBs may become available for transmission.

Figure 7B:
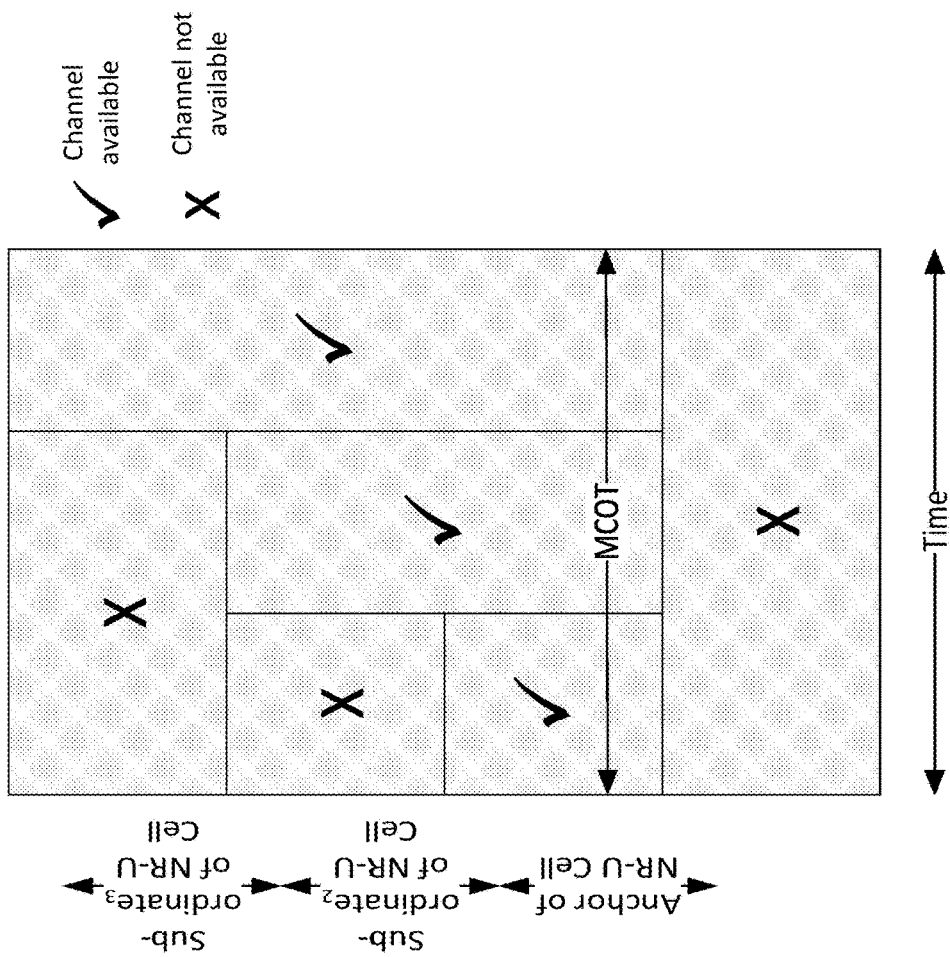
FIG. 7B exemplary illustration of Composite CBW varies during the anchor's MCOT.
Figure 7A:
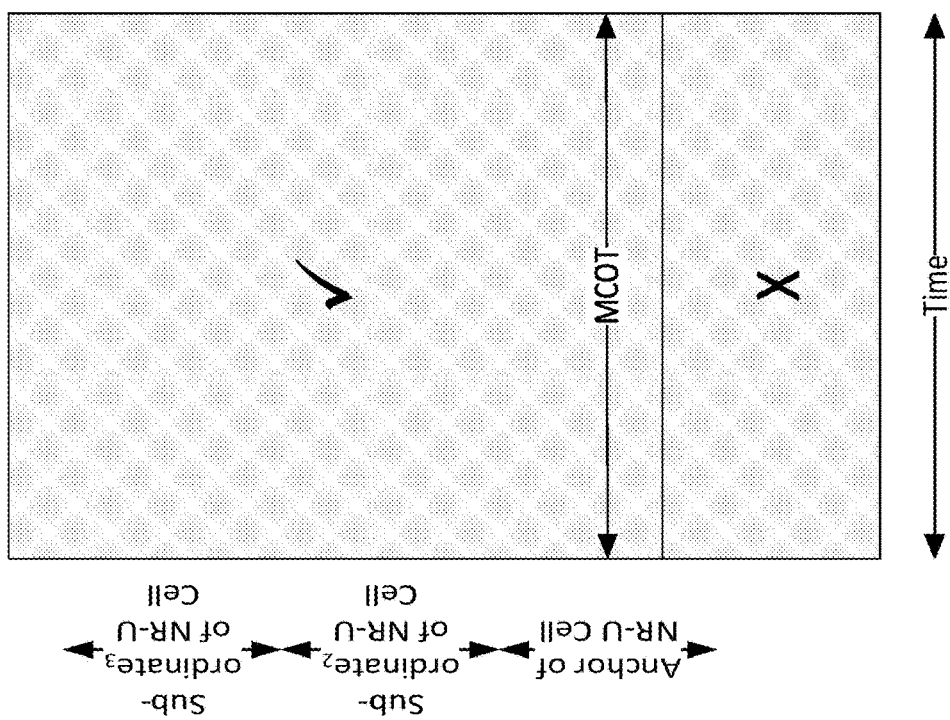
FIG. 7A exemplary illustration of Composite CBW is fixed for duration of anchor's MCOT.
Figure 8B:
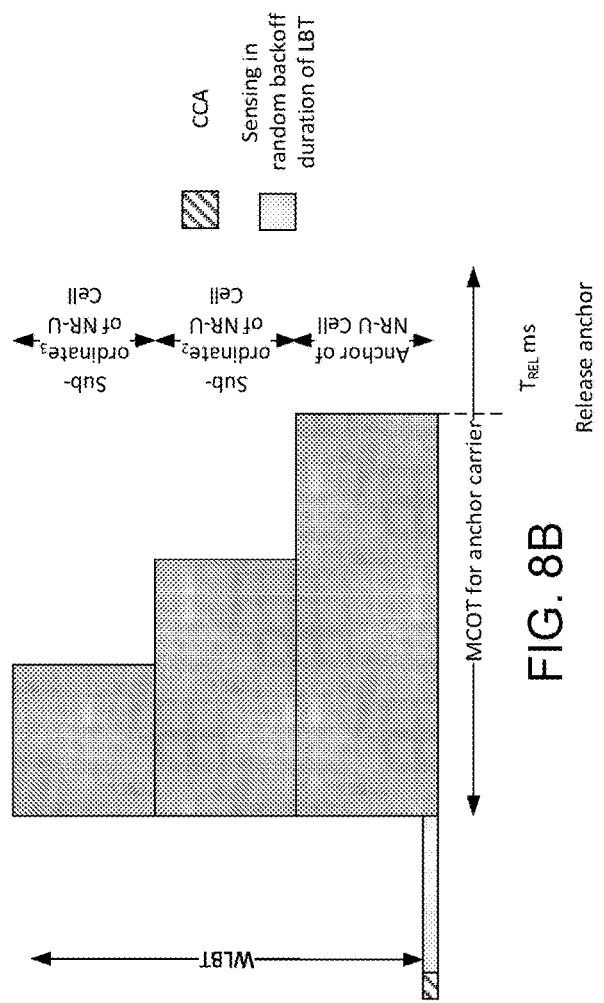
FIG. 8B exemplary illustration of CCA/LBT for different compositing methods channel is accessed with WLBT but the subordinates may be released before the anchor carrier.
Figure 8A:
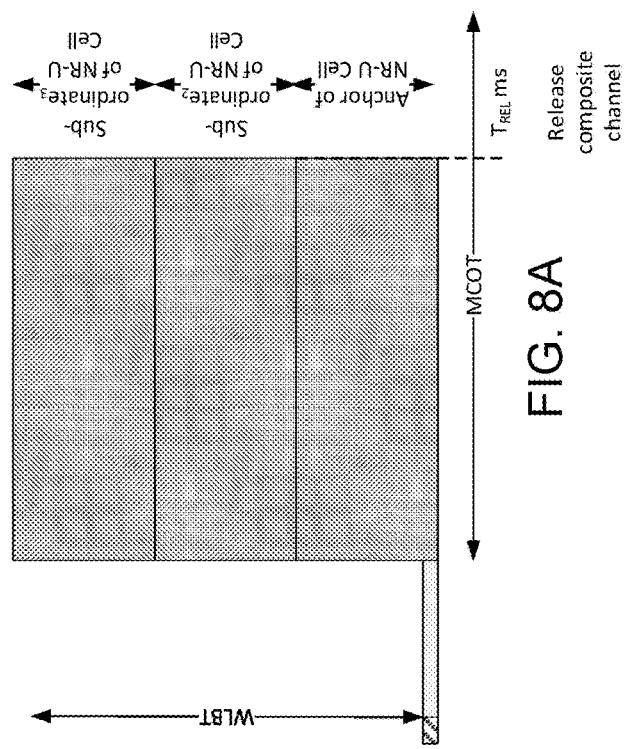
FIG. 8A exemplary illustration of CCA/LBT for different compositing methods—Channel is accessed when all composited carriers have successful CCA/LBT; WBLT may be used.
Figure 9:
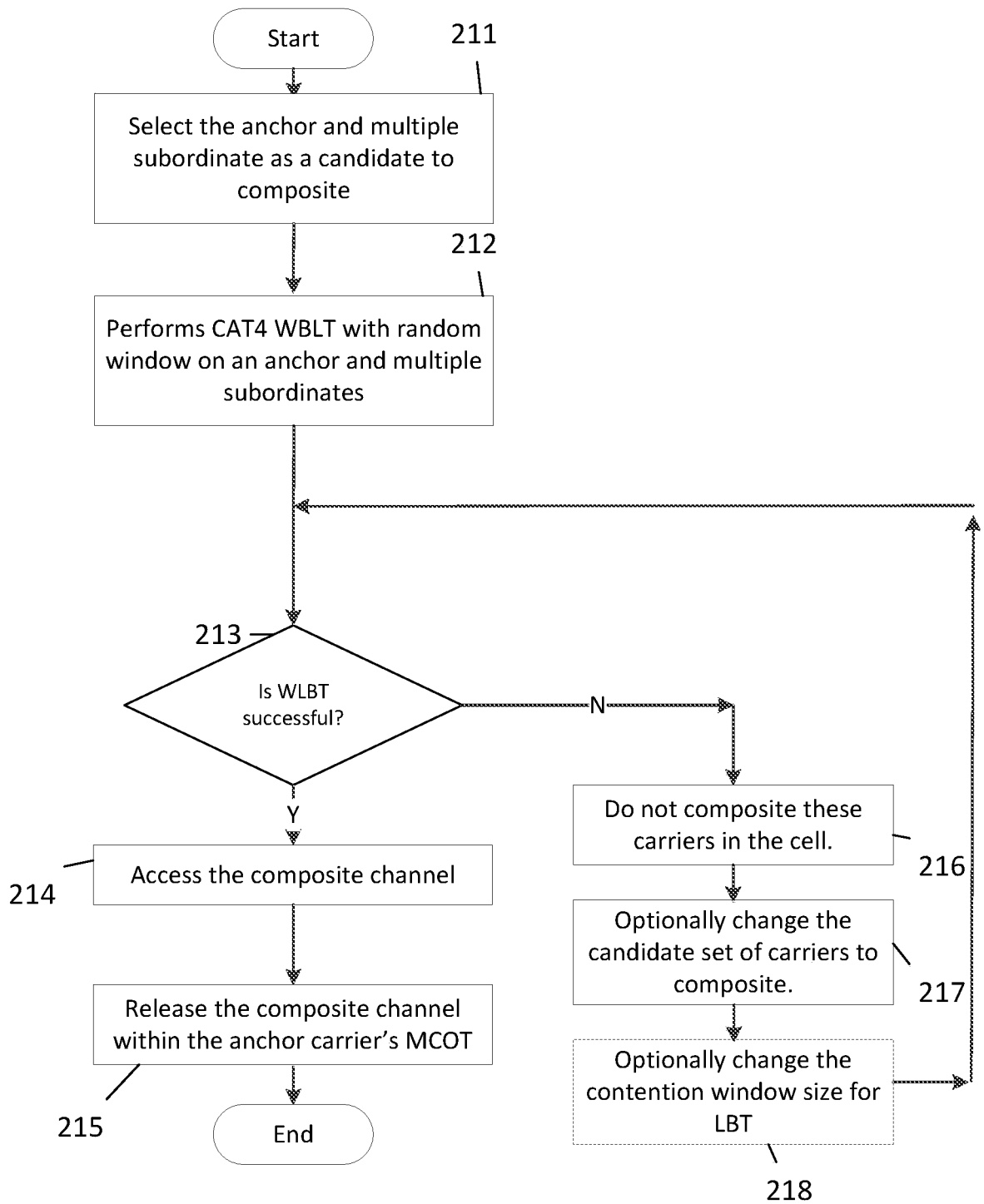
FIG. 9 exemplary illustration of Procedure for compositing. Composite channel is acquired and released together.
Figure 10:
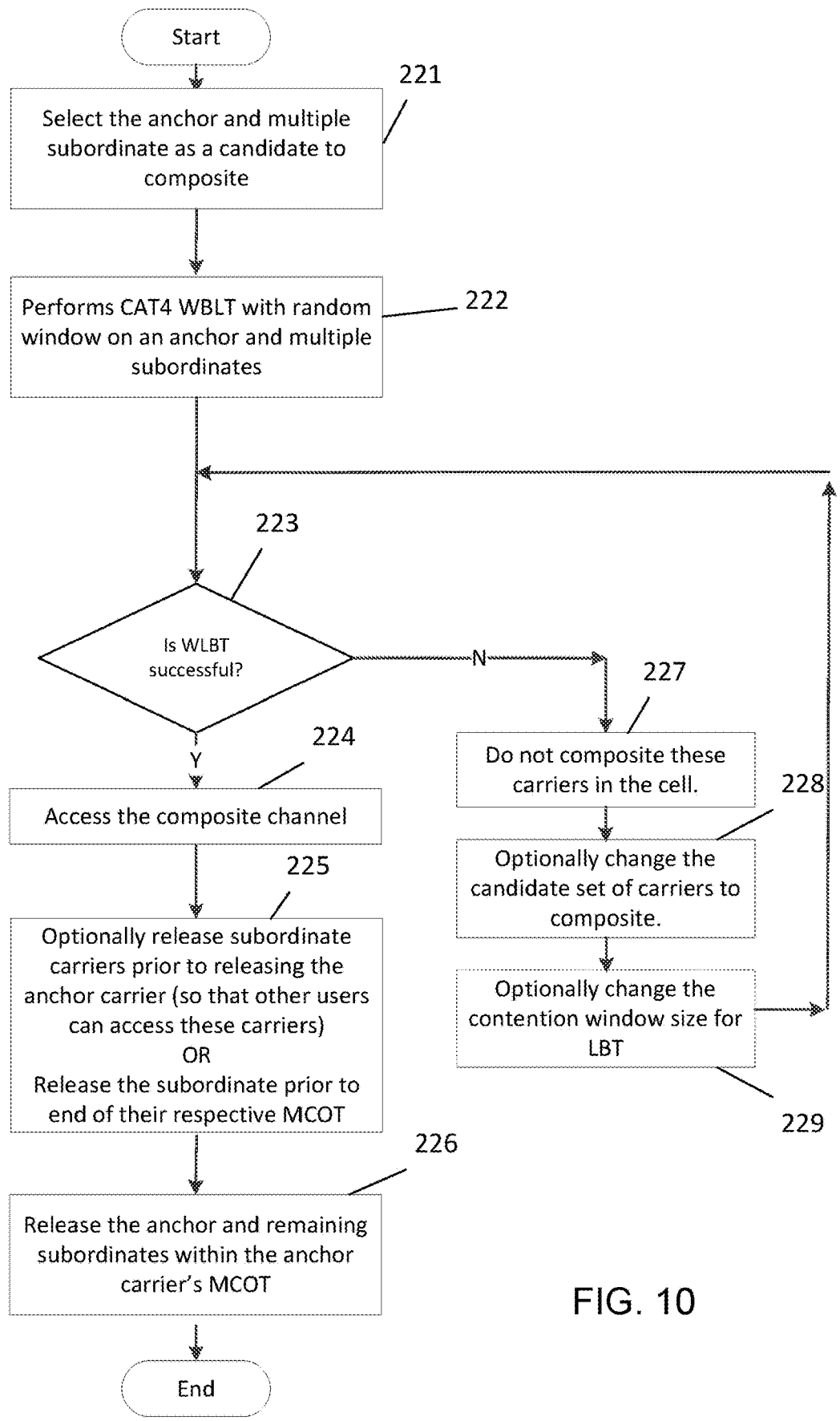
FIG. 10 exemplary illustration of Procedure for compositing. Composite channel is acquired all at once, but subordinates are released earlier than anchor.

The composite carrier may be formed in one of the following ways. The subordinates are selected at the time of channel access of the anchor. All the composited carriers have the same MCOT. Further, the subordinates may be released in one of the following ways: at the same time or sequential. The composite channel may be released as a whole in an instance, e.g., all carriers are released at the same time. In order for a change in the composite carrier, the node performs CCA/LBT again to access the channel. CCA may be a short duration sensing such as a 25 µs sensing used in eLAA for DRS. The composite carrier may remain unchanged up to the Maximum channel occupation time (MCOT) of the anchor. FIG. 7A shows an example where subordinate$_2$ and subordinate$_3$ are composited with the anchor for the entire MCOT. FIG. 8A shows an example case where LBT with a random backoff is performed. Channel access may be obtained for the anchor and subordinate$_2$ and subordinate$_3$ which are composited together. A wideband LBT (WLBT) may be performed to get channel access for the carriers (anchor or subordinates). Wideband may mean a configuration in which the channel is over 20 MHz, potentially spanning multiple 20 MHz bands. FIG. 9 shows an example procedure for compositing. The subordinates may be released earlier than the anchor. Once the compositing node is done using the subordinate it releases it so that other users can use it. This may ensure fair coexistence. FIG. 8B shows this case. FIG. 10 shows an example procedure for compositing. The composite carrier may change dynamically during the time of channel access of the anchor carrier. So the composite carrier may change during the MCOT but at least the anchor carrier must be available for the duration of the MCOT. FIG. 7B shows an example where availability of subordinate$_2$ and subordinate$_3$ varies through the MCOT of the anchor. The available bandwidth is different on different time occasions.

With reference to FIG. 9, at step 211, the anchor or multiple subordinate are selected as a candidate to composite. At step 212, CAT4 WLBT performs with random window on an anchor and the multiple subordinates. When WLBT is successful at step 213, then the composite channel may be accessed (step 214) and subsequently release the composite channel with in the anchor carrier's MCOT. When WLBT is not successful at step 213, then the carriers are not composited in the cell (at step 216). Further at step 217, the candidate set of carriers to composite may be changed or at step 218 the contention window size for LBT may be changed. Subsequently WLBT is checked again at step 213.

With reference to FIG. 10, at step 221, the anchor or multiple subordinate are selected as a candidate to composite. At step 222, CAT4 WLBT performs with random window on an anchor or the multiple subordinates. When WLBT is successful at step 223, then the composite channel may be accessed (step 224). Subsequently at step 225, there may be release of subordinate carriers prior to releasing the anchor carrier (so that other users may accesses these carriers). Alternatively, at step 225, the subordinate may be released prior to the end of their respective MCOT. At step 226, the anchor or the remaining subordinates may be released within the anchor carrier's MCOT. When WLBT is not successful at step 223, then the carriers are not composited in the cell (at step 227). Further at step 228, the candidate set of carriers to composite may be changed or at step 229 the contention window size for LBT may be changed. Subsequently WLBT is checked again at step 223.

Figure 11:
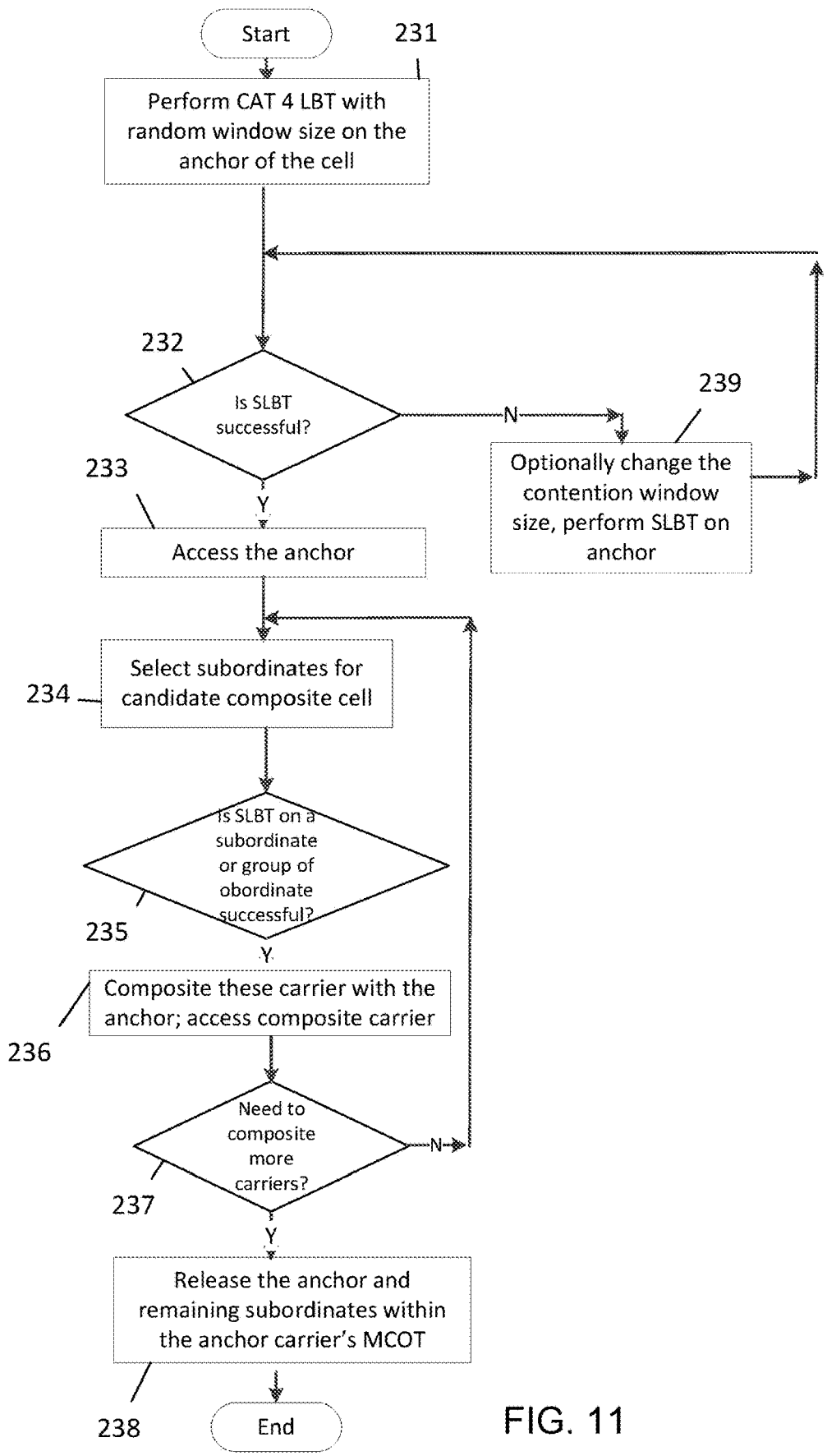
FIG. 11 exemplary illustration of Procedure for compositing. Subordinates are composited as they become available.
Figure 12:
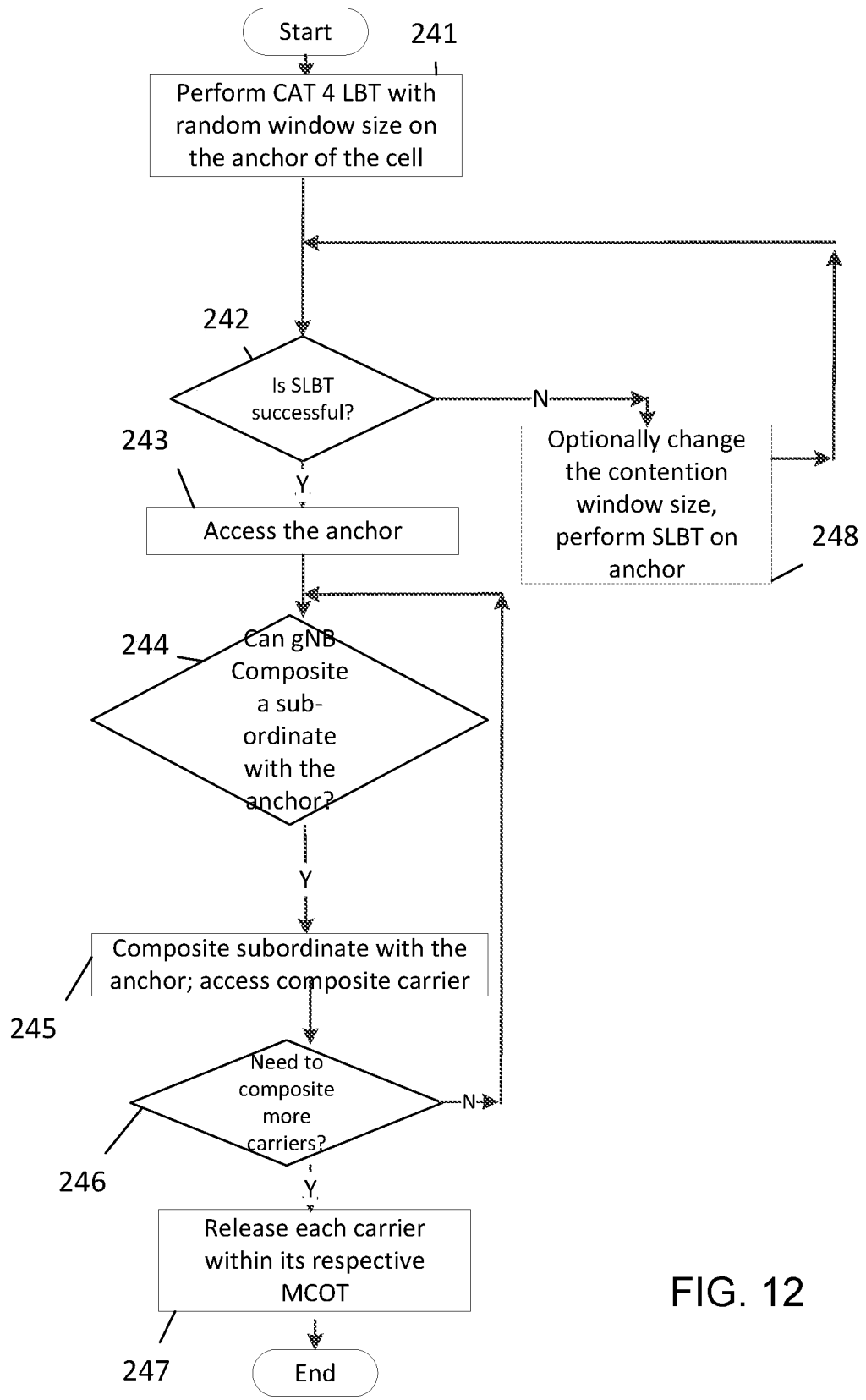
FIG. 12 exemplary illustration of Procedure for compositing. Subordinates are released when their MCOT expires.

Additional design considerations may apply to compositing the subordinates such as the following, such as not dropping during MCOT and dropping during MCOT. In an example, subordinates may only be added, they cannot be dropped during the MCOT of the anchor carrier. This provides flexibility to increase the available resources when they become available. FIG. 8C shows this case. Additional subordinates are added when they become available. LBT or at least CCA may be performed for the subordinates. FIG. 11 shows an example procedure for compositing. In an alternative, subordinates may only be dropped, e.g., subordinates stop channel access after their MCOT is complete but the anchor carrier's is still within its MCOT. This provides flexibility in leveraging carriers which became available prior to the anchor carrier (because of this, the subordinate's MCOT ends prior to that of anchor carrier). FIG. 8D shows this case. A gNB may perform this procedure if it does not have self-interference, e.g., it may listen and transmit at the same time. FIG. 12 shows an example procedure for compositing.

With reference to FIG. 11, at step 231, CAT4 LBT performs with random window size on an anchor of the cell. When SLBT is successful at step 232, then the anchor may be accessed (step 233). Subsequently at step 234, the subordinates for candidate composite cell may be selected. At step 235, if SLBT on a subordinate or a group of subordinates is successful, then at step 236, the anchor may be composited with these carriers and access allowed to the composited carrier. At step 237, if there is a need to composite more carriers, then, at step 238, the anchor or remaining subordinates within the anchor carriers MCOT may be released. At step 237, if no need to composite more carriers then there may be subordinates selected for candidate composite cell at step 234. Alternatively, at step 232, if SLBT is not successful, then the contention window size may be changed and SLBT may be performed on the anchor at step 239. Subsequently SLBT will be determined to be successful or not.

With reference to FIG. 12, at step 241, CAT4 LBT performs with random window size on an anchor of the cell. When SLBT is successful at step 242, then the anchor may be accessed (step 243). Subsequently at step 244, it is determined whether gNB can composite a subordinate with the anchor. If so, then at step 245, the anchor may be composited with these carriers and access allowed to the composited carrier. At step 246, if there is a need to composite more carriers, then, at step 247, there may be a release of each carrier with its respective MCOT. At step 246, if no need to composite more carriers then there it is another determination of whether gNB can composite a subordinate at step 244. Alternatively, at step 242, if SLBT is not successful, then the contention window size may be changed and SLBT may be performed on the anchor at step 248. Subsequently SLBT will be determined to be successful or not.

In this case (with regard to composite carrier changing during the MCOT) LBT may be performed on each U-SCBW carrier separately. We refer to this as subband LBT (SLBT).

In the procedures associated with FIG. 8 and FIG. 9 described for compositing the carriers, if an LBT fails, the node may try again by changing the contention window size to improve its chances of acquiring the channel. The procedures of FIG. 9-FIG. 12 may occur at the gNB or the UE.

As channel access is dynamic, the indication of information on the composite carrier should be dynamic. The indication may be provided by a PHY signal called the composite carrier indicator (CCI). The CCI may also provide the intended time of occupation.

Figure 13:
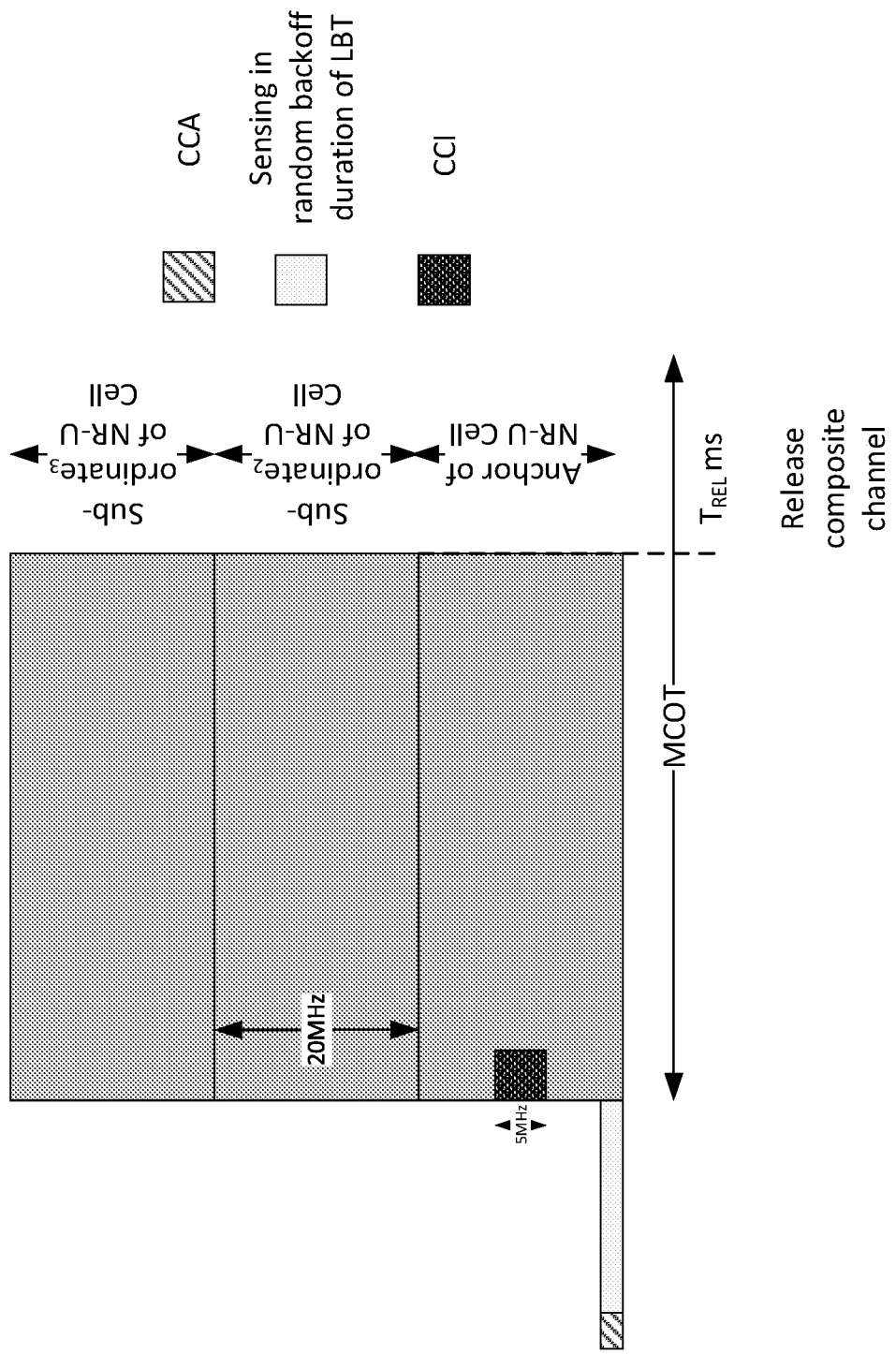
FIG. 13 exemplary illustration of CCI signaled in the anchor cell.

Disclosed below are transmission of CCI on DL. The gNB may indicate the CCI on the DL in one of the following ways. In a first way, there may be an indication of the CCI on the DL within the anchor carrier's resource so that UEs in that cell can receive it without ambiguity. The concept of transmitting this information is shown in FIG. 13 for FR1 (Frequency Range—1 (0.45 GHz to 6 GHZ)). The CCI is in the 20 MHz anchor carrier of the cell. It may be included within the smallest carrier size such as 5 MHz supported in NR. UEs in the initial BWP of the anchor carrier may monitor for the CCI without having to increase their BW. In a second way, there may be an indication of the CCI on the DL in an active BWP not overlapped with the anchor carrier. If a UE's BWP does not include the part of the anchor cell where the CCI may be transmitted, additional transmission may be required within the active BWP of the UE. In a third way, there may be an indication of the CCI on the DL if the NR-U carriers are carrier aggregated with a licensed PCell, the CCI may be sent on the PCell for the SCells.

CCI may be transmitted by the gNB in one of the following ways. In a first way, CCI may be broadcast through a downlink control information (DCI) scrambled with CCFI-RNTI (composite carrier format indicator) in a common search space such as Type0-PDCCH common search space so that UEs may find and decode the DCI. The CCFI-RNTI may be given in the spec so that UEs know its value a priori to receiving the DCI. In a second way, UEs in their initial BWP or default BWP may remain in the anchor carrier. UEs in the active BWP may require to be signaled about the composite carrier. In this case, a DCI scrambled with CCFI-RNTI may be transmitted as a group-common PDCCH. The CCFI-RNTI is configured to the UEs through higher layer signaling. In a third way, UE-specific DCI scrambled with C-RNTI or CS-RNTI (such as a DL or UL grant with formats 0_0, 0_, 1_1, 1_0) may provide information about the composite carrier. In a fourth way, CCI may be transmitted on a preamble such as Zadoff-Chu sequence (ZC) sequence or m-sequence in the anchor carrier immediately following the channel access. The preamble may be used as the reservation signal. It may be asynchronous to symbol boundary and may be detected by a UE through correlation in time. The preamble may be synchronous to the symbol boundary and be transmitted within the first slot following the channel access.

The UEs may be configured with the carrier information for a list of B candidate subordinates for the anchor carrier through SI. The DCI may carry the status of these subordinate cells in a B-bit bitmap. When the bit corresponding to a subordinate is set to 1, it implies that the subordinate is composited with the anchor carrier. A subordinate with bit set to zero is not part of the composite carrier. If the CCI uses a DCI, the B bits are part of its payload. If the CCI uses a preamble, the B bits may be the root of the Zadoff-Chu sequence (ZC) or initialize the sequence (m-sequence). For the example in FIG. 4A, the UE is configured with a 3 bit-bitmap corresponding to subordinate$_1$, subordinate$_2$, and subordinate$_3$.

Alternatively, a set of possible configurations for compositing may be configured to a node. The CCI may indicate an index into this set. If the number of possible configurations is small, the index may require fewer than B bits to indicate the configuration. This set may be configured to the UE through RRC signaling as seen in the following examples with regard to the set of configurations. In a first example, the set of configurations for compositing are broadcasted through the remaining minimum system information (RMSI) or other system information (OSI). In a second example, the set of configurations for compositing are configured to a UE through UE-specific RRC signaling; this alternative allows configurations based on the UE capabilities. If a UE does not have capability to receive a composited carrier exceeding X Hz (e.g., a predetermined threshold value of Hz), it should be configured with configurations for compositing not exceeding X Hz, although other UEs may receive transmissions on bandwidth exceeding X Hz depending on their capabilities. This approach may work for the case where the DL CCI is transmitted in UE specific DCI or a group common PDCCH.

The CCI may be signaled multiple times within the anchor carrier's channel occupation time, especially if the subordinates vary within that duration.

Disclosed below is transmission of CCI on UL. A UE may composite the channel in the following scenarios regarding the UE and gNB.

Figure 14:
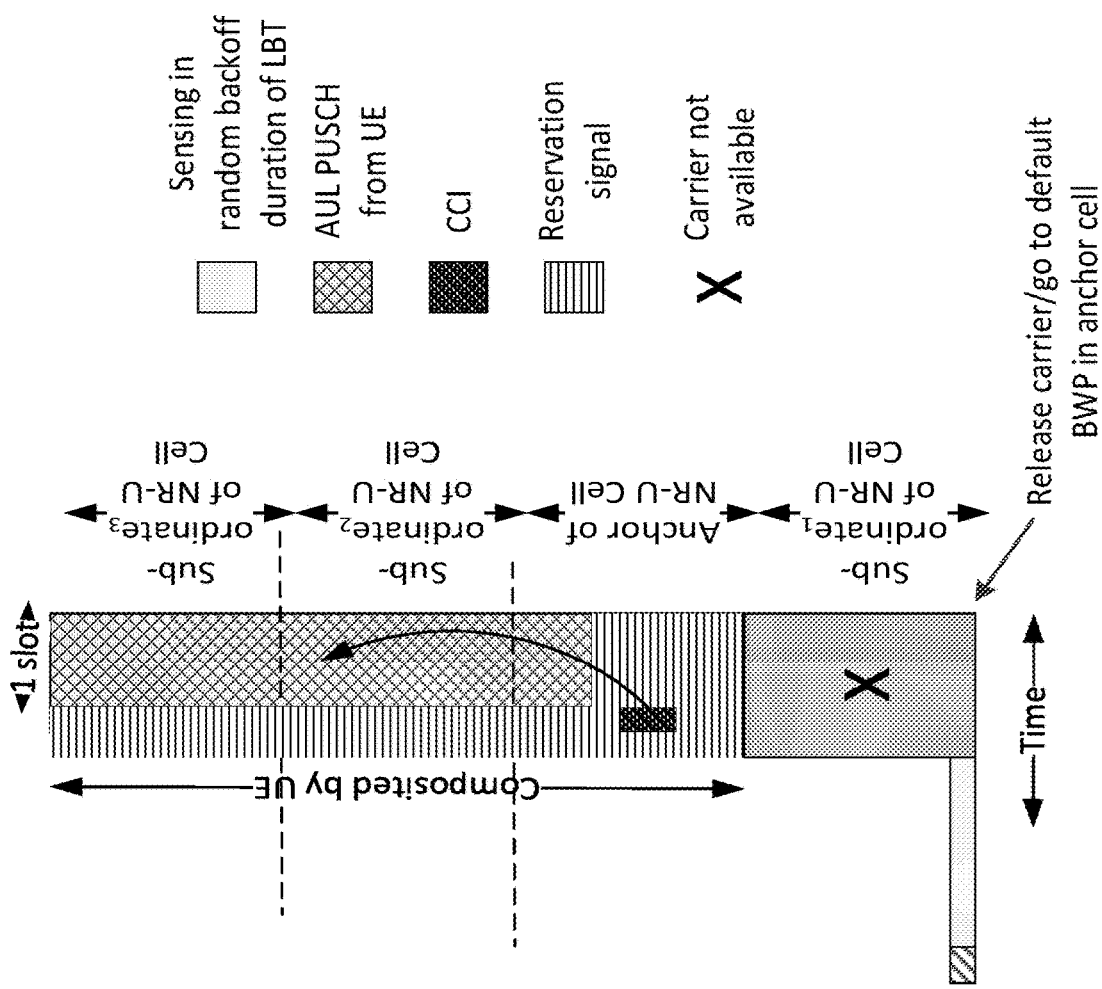
FIG. 14 exemplary illustration of here the UE composites the anchor and subordinate$_2$ and subordinate$_3$.

In a first scenario, UE is configured resources for autonomous uplink (AUL) on multiple candidate composite cells using anchor$_1$. Example of candidate composite carrier are—a) anchor carrier alone, b) anchor and subordinate$_1$, c) anchor, subordinate$_1$ and subordinate$_2$, etc. The UE may perform LBT to find the largest composite channel and transmit it AUL on it. The UE may also indicate the transmission through CCI transmitted on a resource in the anchor carrier. When gNB receives the CCI, it identifies the composite carrier and proceeds to detect the AUL. FIG. 14 shows an example where the UE composites the anchor and subordinate$_2$ and subordinate$_3$. It transmits a reservation signal across the composite channel until its resource of CCI occurs. It transmits the CCI in the anchor cell. Then it switches its bandwidth part to and transmits on the AUL resource for that composite cell. On completion of the AUL transmission, the UE may do one of the following: 1) UE returns to the default BWP which may be in the anchor cell, in which it monitors the DL; 2) UE may release the composite channel; or 3) UE may release only one or more of the subordinate carriers and continue to transmit PUCCH or SRS as required. Note CCI may indicate, as shown in FIG. 14, the U-SCBW bands composited by the UE. The UE may occupy these bands (partly or wholly) in a configured grant. So CCI may indicate the bands corresponding to the UE's grant.

In a second scenario, gNB provides the UE a new type of UL grant which may be called "opportunistic UL grant". This grant may provide resources for each candidate composite carrier. The UE may transmit on the composite carrier channel that is available and has the most resources. This may allow efficient resource usage as a UE may be able to empty its buffer faster when more spectrum is available.

Figure 15:
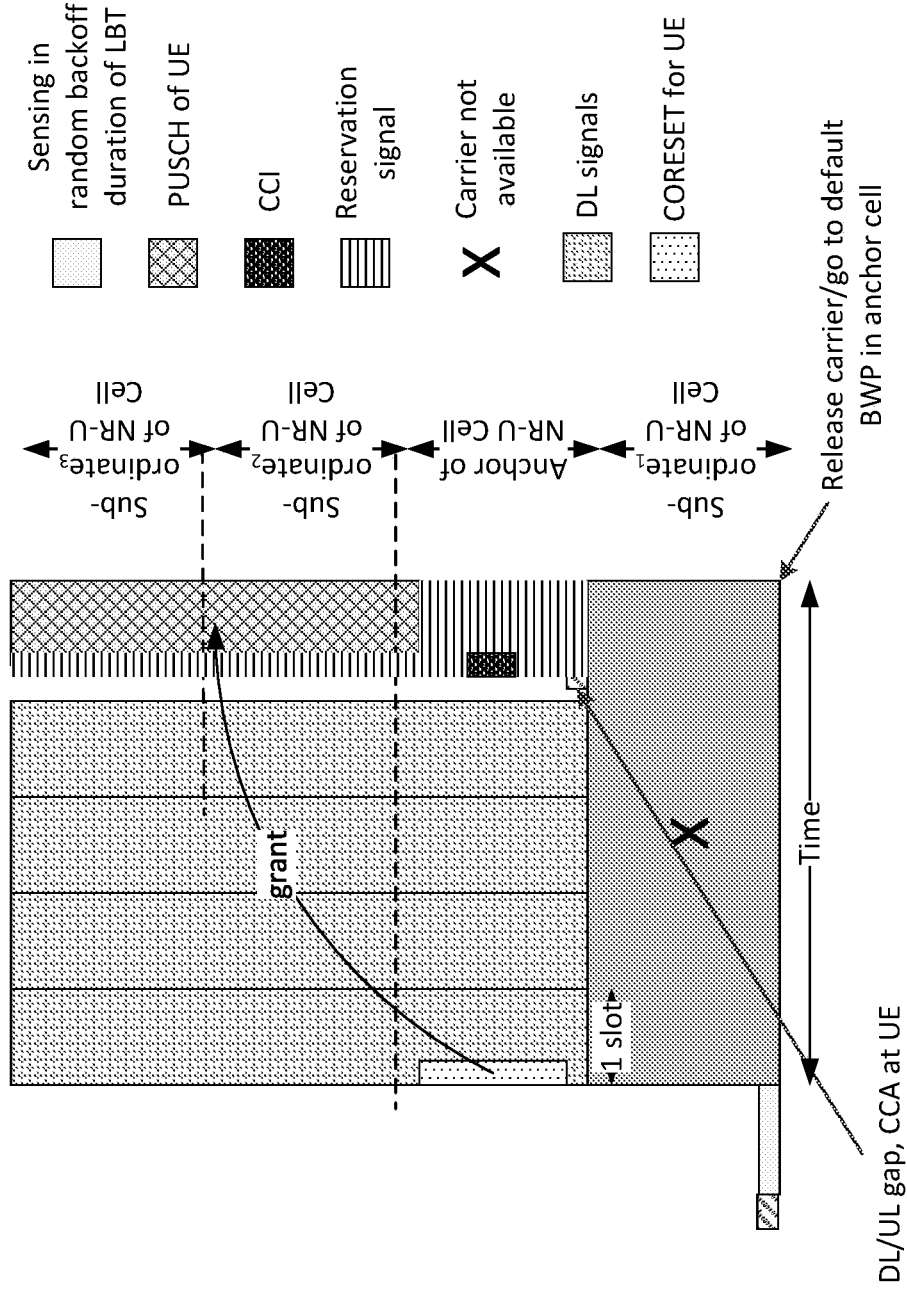
FIG. 15 exemplary illustration of where the gNB performs a CAT 4 LBT with random backoff and accesses the channel for a composite channel.

Besides hidden nodes in the UE's vicinity may impact certain U-SCBW carriers only. Opportunistically compositing on the UE side allows UL transmission while avoiding hidden nodes. A DCI format such as 0_1 may be modified to support the opportunistic UL grant-fields used for signaling to multiple component carriers may be reused for the candidate grants. FIG. 15 shows an example where the gNB performs a CAT 4 LBT with random backoff and accesses the channel for a composite channel including the anchor and subordinate$_2$ and subordinate$_3$. It sends an UL grant to the UE. UE may perform as short interval CCA such as 25 µs (if it is within the MCOT of the gNB, the gNB may indicate the type of CCA/LBT to be performed on the UL in the grant). It composites the carriers that are available to it and uses the grant for that composite carrier for the UL resources. The gNB reads the CCI from the anchor carrier. On completion of the AUL transmission, the UE may do one of the following: 1) UE returns to the default BWP which may be in the anchor cell, in which it monitors the DL; 2) UE may release the composite channel; 3) UE may release only one or more of the subordinate carriers and continue to transmit PUCCH or SRS as required. Note that, as shown in FIG. 15, CORESET carries DCI indicating the UL grant (PUSCH) to the UE. The DL/UL arrow indicates the gap (white region) where the UE does CCA.

The CCI may be transmitted on a short-PUCCH resource as the payload to indicate a bitmap of composited subordinates is small. The PUCCH resource may be in the anchor cell, and precede the UL transmission scheduled by the grant. Alternatively, the CCI may be transmitted on a RACH in a contention free manner. The RACH resources and preamble may be configured to the UE through higher layer signaling. Multiple preambles may be configured to a UE, with each preamble indicating one of the candidates for compositing.

Disclosed below is channel sensing for compositing. The sensing for the anchor and subordinates may be performed in the following ways: a random window, single random backoff, or different random backoff, all of which in described in more detail herein.

CAT 4 LBT with random window may be performed for the anchor carrier. Once the channel is obtained for the anchor, higher priority access may be used for a subordinate carrier so that the transmissions may occur synchronously on the composited cell. And self-interference is avoided by not sensing and transmitting at the same time. FIG. 16A shows an example for compositing the anchor and subordinates where high priority access for subordinates is obtained after LBT for anchor is successful.

A single random backoff is generated for the anchor carrier and the same backoff is applied to the subordinate cells in a CAT 4 LBT procedure. If successful, the carrier is composited. FIG. 16B shows an example for compositing the anchor and subordinates where same random back off is used for anchor and all subordinates.

Figure 16C:
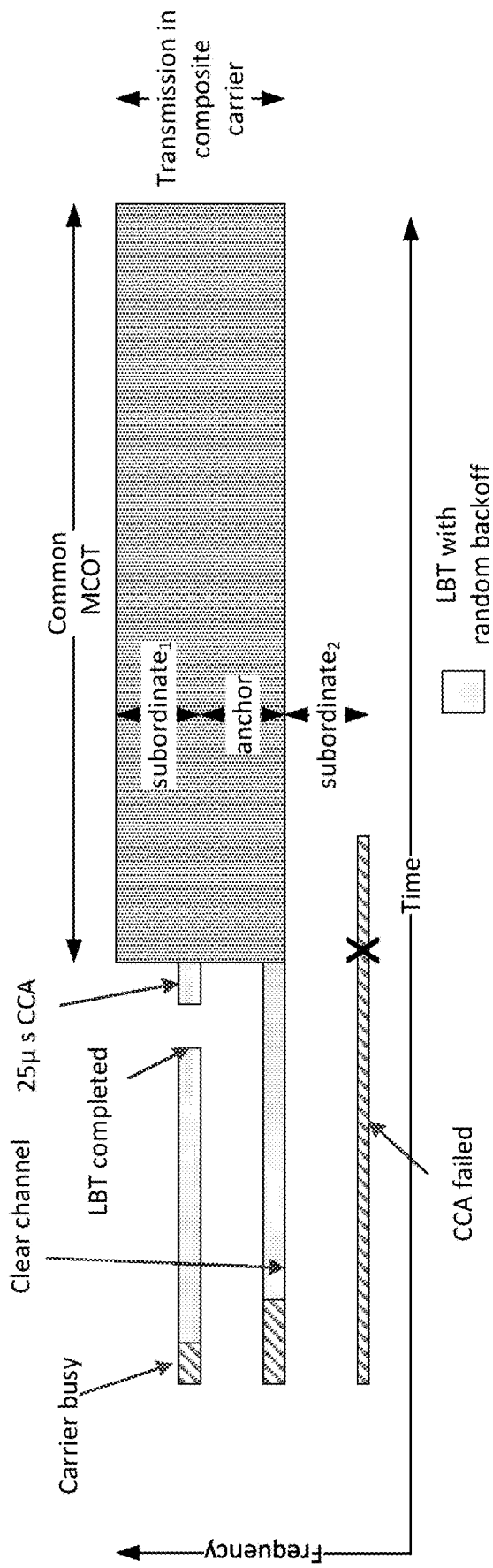
FIG. 16C exemplary illustration of LBT for compositing the anchor and subordinates—LBT for each carrier uses a different random backoff but channel access is aligned to the largest backoff.

Each U-SCBW may have a different random backoff. When the largest backoff timer expires, the U-SCBWs are composited if LBT is successful. A short CCA (example 25 µs) may be applied to U-SCBWs who finished their random backoff earlier. FIG. 16C shows an example for compositing the anchor and subordinates where LBT for each carrier uses a different random backoff but channel access is aligned to the largest backoff.

Discussed below is operation in a flexible wideband operation. Here the compositing node may not use an anchor carrier but may composite the available U-SCBW bands together in a carrier. The compositing may be done dynamically (e.g., each time the node gets channel access the composited U-SCBW may be different). An anchor U-SCBW is not required to be present in the composited carrier.

The node transmits CCI to a receiver about the composited U-SCBW bands through the methods described for anchor carrier-based compositing, such as through a preamble or PSS/SSS like signals or RS such as DMRS or DCI which may be UE-specific or common to all or multiple UEs.

The receiver may be configured to receive the CCI on certain resources. The receiver monitors these resources and on receiving the indication, recognizes the U-SCBWs obtained by the transmitter.

Figure 17:
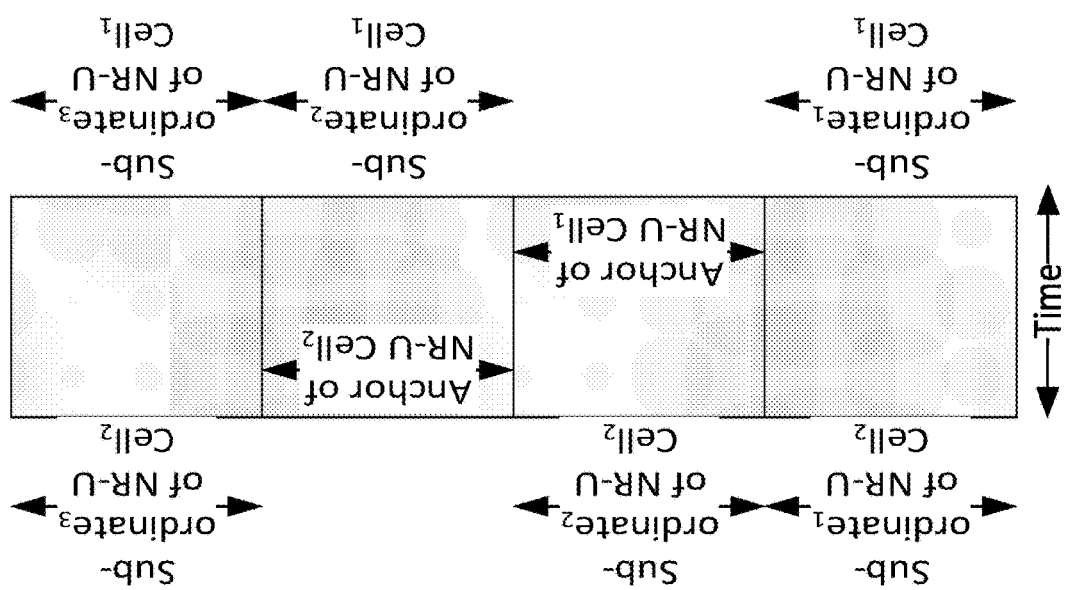
FIG. 17 exemplary illustration of carrier as an anchor for one cell and subordinate for another.

Discussed below is multiple composite cells in NR-U. A UE may support carrier aggregation of multiple NR-U Cells with a Licensed PCell. Or a UE may access an NR-U channel as a SA cell with which multiple other NR-U cells may be aggregated. In these cases, a UE may have multiple Rx chains to receive multiple carriers. It is configured with multiple anchor carriers and monitors each one with one Rx chain. When a UE has carrier aggregation, a subordinate in one cell may be an anchor for another cell. An example is shown in FIG. 17 where the anchor of $Cell_1$ is $subordinate_2$ of $Cell_2$. Similarly, a subordinate carrier may be a subordinate in more than one cell.

In the idle or connected state, a UE may monitor the anchor of a cell for synchronization, SI, paging, or RACH. When it receives a CCI on the anchor, it may obtain information on the composite carrier. Referring to FIG. 17, a UE is monitoring the $anchor_1$ of $Cell_1$ on one of it Rx chains. If a CCI from $Cell_1$ indicates to a UE that the cell includes $subordinate_2$ (which is the same carrier as $anchor_2$ of $cell_2$). the UE may follow one of the following procedures for accessing resources on a carrier. FIG. 18 illustrates the UE behavior when monitoring both $Cell_1$ and $Cell_2$. (Annotations t1, t2, and t3 show time instances in the procedure to compare the behavior across both cells).

Figures 18A, 18B:
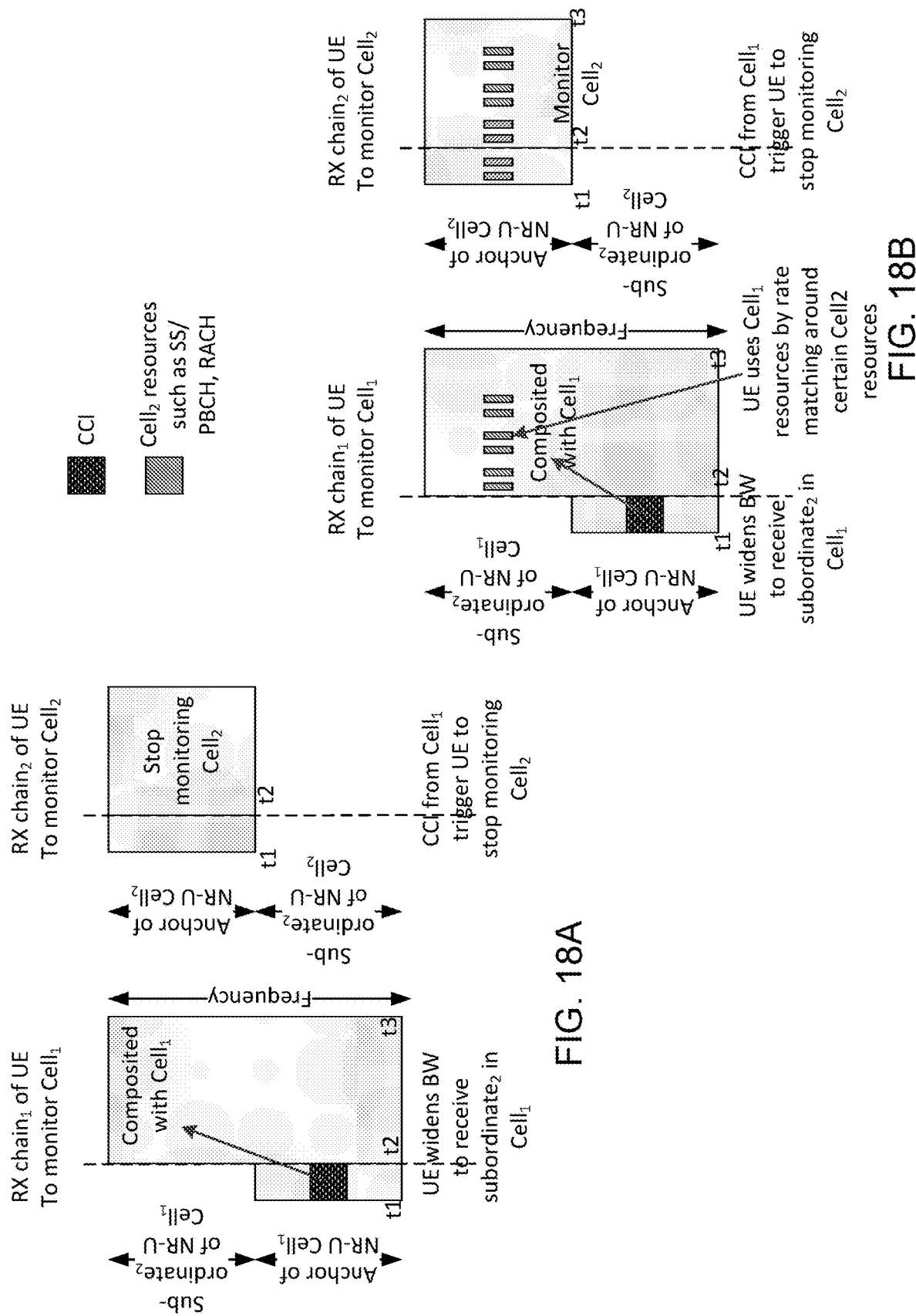
FIG. 18A exemplary illustration of UE Behavior when receiving both Cell1 and Cell2 (t1, t2, t3 denote the time instances of the procedure)—CCI from Cell1 deactivates Cell2 from the UE's perspective.
FIG. 18B exemplary illustration of UE Behavior when receiving both Cell1 and Cell2-Cell1 transmissions in subordinate2 rate match around some of Cell2 resources.

With regard to a first procedure for accessing resources, at a time, a given U-SCBW belongs only to one cell. In this case, the UE assumes that only $Cell_1$ is active, then from the UE's perspective, $Cell_2$ with $anchor_2$ is assumed to be deactivated. Even though the UE may have the Rx chain to receive $Cell_2$, it assumes $Cell_2$ is deactivated and does not perform monitoring on $Cell_2$ until its UL/DL grants on $Cell_1$ are complete or until $Cell_1$ releases $subordinate_2$. Cell1 may indicate channel occupancy time on CCI, so the UE may know when $Cell_1$ releases $subordinate_2$. The concept is shown in FIG. 18A and the procedure is shown in FIG. 19A. Note that, as shown in FIG. 18A-18B as applicable, CCI indicates that the subordinate is composited with anchor. As x-axis is time, in FIG. 18A on receiving CCI at t2, the UE starting monitoring composited cell after t2. Indication of composite carrier by CCI triggers this behavior. In FIG. 18B, CCI on $cell_1$ indicates that the subordinate was composited into cell1. So $cell_2$ is deactivated. When composited into $Cell_1$, UE rate matches around critical resources of $Cell_2$ so that $Cell_2$ can still transmit some important signals such as SSB for discovery.

With reference to FIG. 19A, at step 251, UE monitors NR-U $anchor_1$ and $anchor_2$ for CCI. If CCI is received at step 252, then at step 253 based on receiving on $anchor_1$, increase BW on $RX chain_1$, if required to receive $Cell_1$ with $subordinate_2$. At step 254, Do not monitor $Cell_2$ on the other $RX chain_2$ until $Cell_1$ grant is complete or $Cell_1$ releases $subordinate_2$.

With regard to a second procedure for accessing resources, UE may monitor multiple NR-U anchor cells simultaneously using different Rx chains even if the cells are configured with some common subordinates. When the UE receives a grant from $Cell_1$ using resources on $subordinate_2$, it may follow these procedures. UE rate matches around certain resources such SSB/DRS and RACH of the $anchor_2$ in $Cell_2$ for its grant on $Cell_1$. The concept is shown in FIG. 18B. The general procedure is shown in FIG. 19B. UE assumes that SFI of $Cell_1$ overrides the SFI of $Cell_2$ (in $subordinate_2$) for the duration of the grant.

With reference to FIG. 19B, at step 261, UE monitors NR-U $anchor_1$ and $anchor_2$ for CCI. If CCI is received at step 262, then at step 263 based on receiving on $anchor_1$, increase BW on $RX chain_1$, if required to receive $Cell_1$ with $subordinate_2$. Also rate match around critical resources of $Cell_2$. At step 264, continue to monitor $Cell_2$ on the other $RX chain_2$.

The UE may decide how to use the resources on a carrier (as part of $Cell_1$ or $Cell_2$) based on the most recent CCI, most recent grant, or from cells that collide, as described in more detail herein. In a first example, the most recent CCI takes priority. The UE uses the composite channel from the cell transmitting the most recent CCI. If a subordinate from $Cell_2$ is composited into $Cell_1$, the UE returns to monitoring the anchor of $Cell_2$ from monitoring the composite $Cell_2$. In a second example, the most recent grant takes priority. If the UE is monitoring the anchor cell of $Cell_2$, it may receive a grant after the CCI on $Cell_1$. In this case, the UE follows the grant of $Cell_2$ as it is the most recent. In a third example, if grants from $Cell_1$ and $Cell_2$ collide in terms of the resources on anchor of $Cell_2$ which is the same as subordinate of $Cell_1$, the UE may ignore the grants.

Discussed below are procedures for BWP operation of the UE. In NR the UE may be configured with 4 BWPs per carrier. For composite cells in NR-U, ways to configure the BWP may include $W_i$ BWPs or W BWPs, as described in more detail herein.

The UE may be configured with $W_i$ BWPs per for the $i^{th}$ composite configuration of a cell, e.g., if a cell has P candidate configurations (examples—a) anchor only, b) anchor with $subordinate_2$, c) anchor with $subordinate_1$, d) anchor with $subordinate_1$ and $subordinate_2$, c) anchor with $subordinate_1$, $subordinate_2$ and $subordinate_3$, etc.), each candidate supports certain number of BWPs. Higher layer signaling configures the UE with the P composite cell configurations, $W_i$ for i=1 . . . P. i=1 may be designated to represent the anchor. For i>2, a single BWP may be sufficient, e.g., $W_i$=1 for i>2.

The UE may be configured with W BWPs for a cell. The gNB ensures that the UE uses the appropriate BWP for a given composite cell.

Figures 20A, 20B:
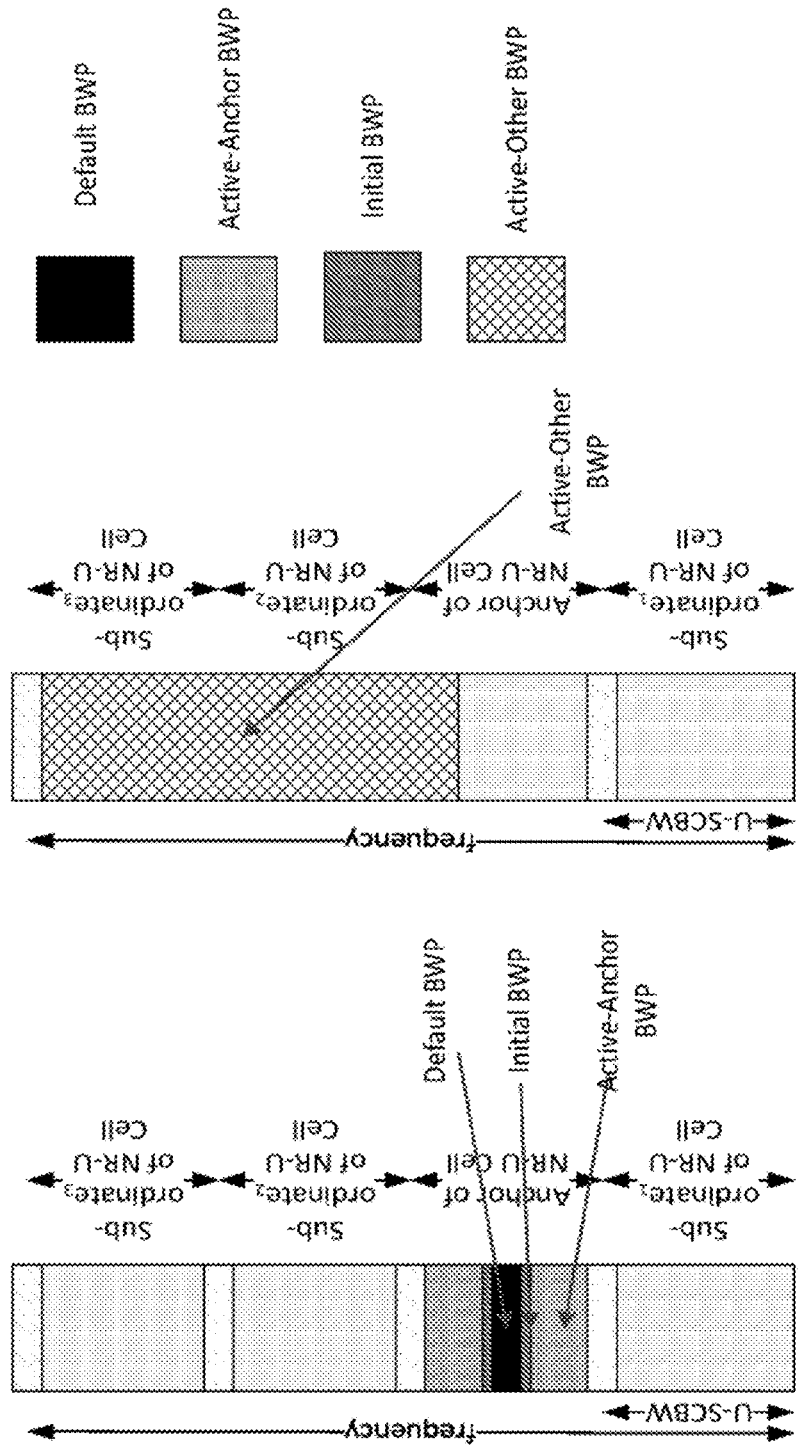
FIG. 20A exemplary illustration of BWPs for the composite cell—Initial, Default, Anchor-active BWP.
FIG. 20B exemplary illustration of BWPs for the composite cell—One example of Active-Other-BWP.

The UE may have one or more following BWPs defined. Example BWPs are illustrated in FIG. 20. Initial BWP (especially for SA and DC) to perform synchronization, RACH transmission, received paging, etc. Active-Anchor BWP—this is the active BWP within the anchor cell. UE monitors control information in this BWP and transmits PUSCH and receives PDSCH. This is similar to the "active BWP" in NR. Default BWP—this BWP is within the anchor cell's resources. The RRC connected UE may stay in the default BWP and monitor the control signaling. Active-Other-BWP—this is the active BWP including resources within subordinates. It may also include resources within the anchor. Typically, Active-Other-BWPs are larger than Active-Anchor BWP and are expected to provide more frequency resources to a UE.

Figures 21A, 21B:
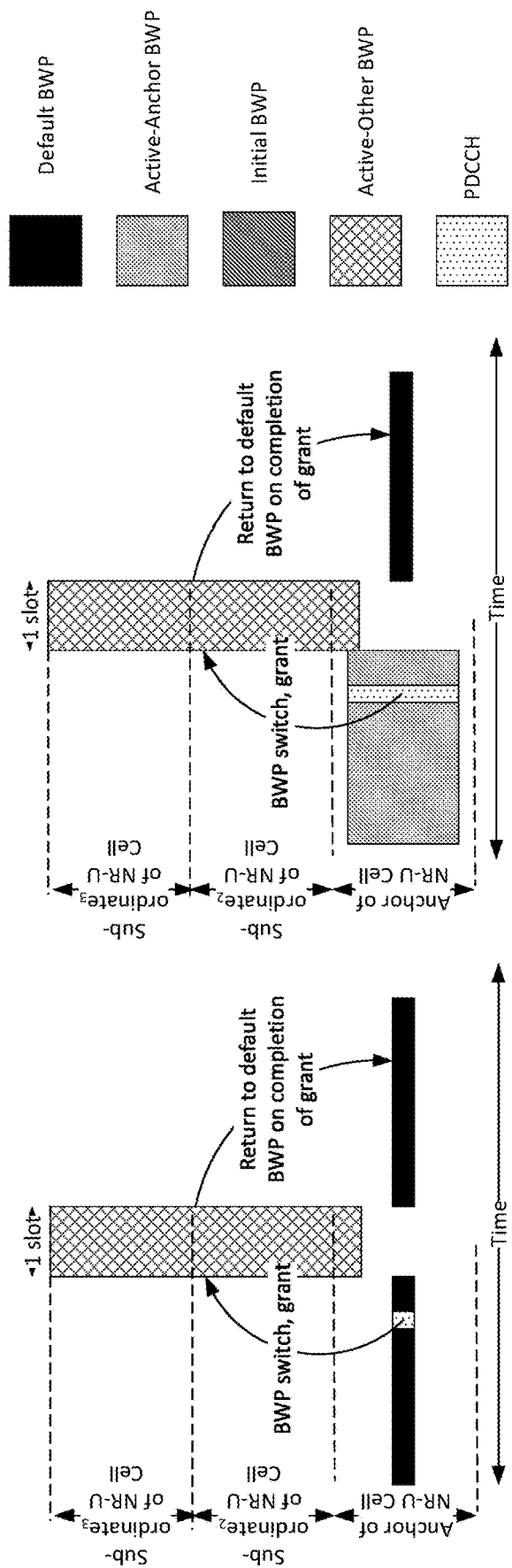
FIG. 21A exemplary illustration of UE behavior in the Active-Other-BWP—UE monitors grants in default BWP, switches to active-other BWP for PDSCH transmission, returns to default BWP on completion of grant.
FIG. 21B exemplary illustration of UE behavior in the Active-Other-BWP—UE monitors grants in active-anchor BWP, switches to active-other BWP for PDSCH transmission, returns to default BWP on completion of grant.
Figure 21D:
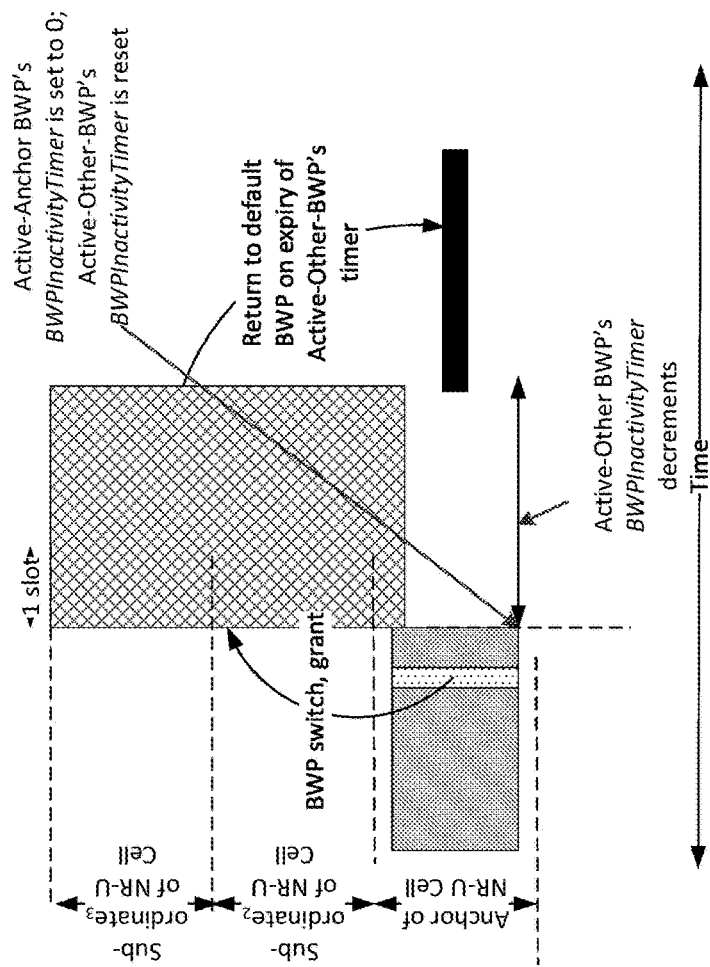
FIG. 21D exemplary illustration of UE behavior in the Active-Other-BWP—UE monitors control signal in the active-other BWP.
Figure 21C:
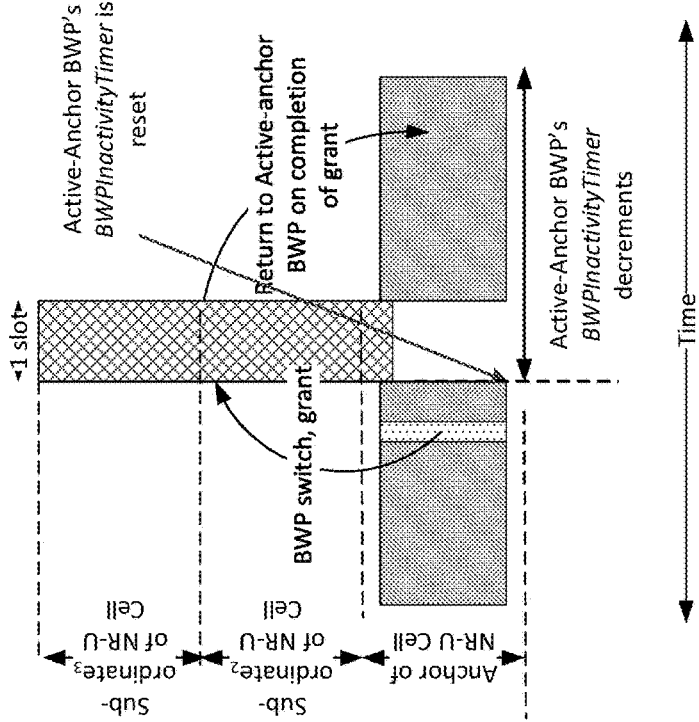
FIG. 21C exemplary illustration of UE behavior in the Active-Other-BWP—UE monitors grants in default active-anchor BWP, swtiches to active-other BWP for PDSCH transmission, returns to active-anchor BWP on completion of grant.

One of the following procedures may be used to design the Active-Other-BWP. For a first procedure, no control monitoring occurs in the Active-Other-BWP. Control signal monitoring occurs in the Active-Anchor BWP or default BWP for grants. The grant may switch the UE to active-other-BWP where UE receives or transmits PDSCH or PUSCH. On completion, the UE may return to the prior BWP or the default BWP. The prior BWP may be the one which activated it to operate in the Active-Other-BWP. An example is shown in FIG. 21A and FIG. 21C. FIG. 21B illustrates an example default BWP. If the Active-Anchor BWP triggered the UE to switch to Active-Other-BWP, the Active-Anchor BWP's BWPInactivity Timer is reset and continues to decrement as if the UE were in the Active-Anchor BWP. For a second procedure, control signaling may be monitored on the Active-Other-BWP similar to that in the Active-Anchor BWP. Similar to the active-anchor BWP's BWPInactivityTimer, an active-other-BWP BWPInactivity-Timer may be used once a UE enter the Active-Other-BWP. Upon expiry of the active-other-BWP BWPInactivityTimer, the UE returns to the default BWP. An example is shown in FIG. 21D. Alternatively, a DCI may trigger the UE to switch to another BWP such as the default BWP or active-anchor BWP or another active-other-BWP. Note that, as shown in FIG. 21A, the PDCCH provides a command to switch BWP from default to active along with a grant. On processing the grant, the UE returns to the default BWP. FIG. 21B has similar behavior as FIG. 21A, but UE starts from the active BWP on anchor. With regard to FIG. 21C, similar to FIG. 21B, but return to active BWP on anchor. FIG. 21D is similar to FIG. 21C, but return to default BWP in anchor on completion of BWP timer.

BWP management during channel access failure. NR-U BWP operation may be impacted by uncertainty in the channel access. If default behavior in NR is followed, UE may stay in the active BWP even after the gNB loses channel access and decrement the BWPInactivtyTimer. However, the value of BWPInactivtyTimer may be fixed through RRC and cannot be changed based on channel availability. A 'Valid-BWP' may be defined as a BWP that is activated to the UE and for which the gNB or the UE has channel access. An 'invalid-BWP' may be defined as a BWP that is activated to the UE but to which gNB or UE does not have channel access.

Figure 23A:
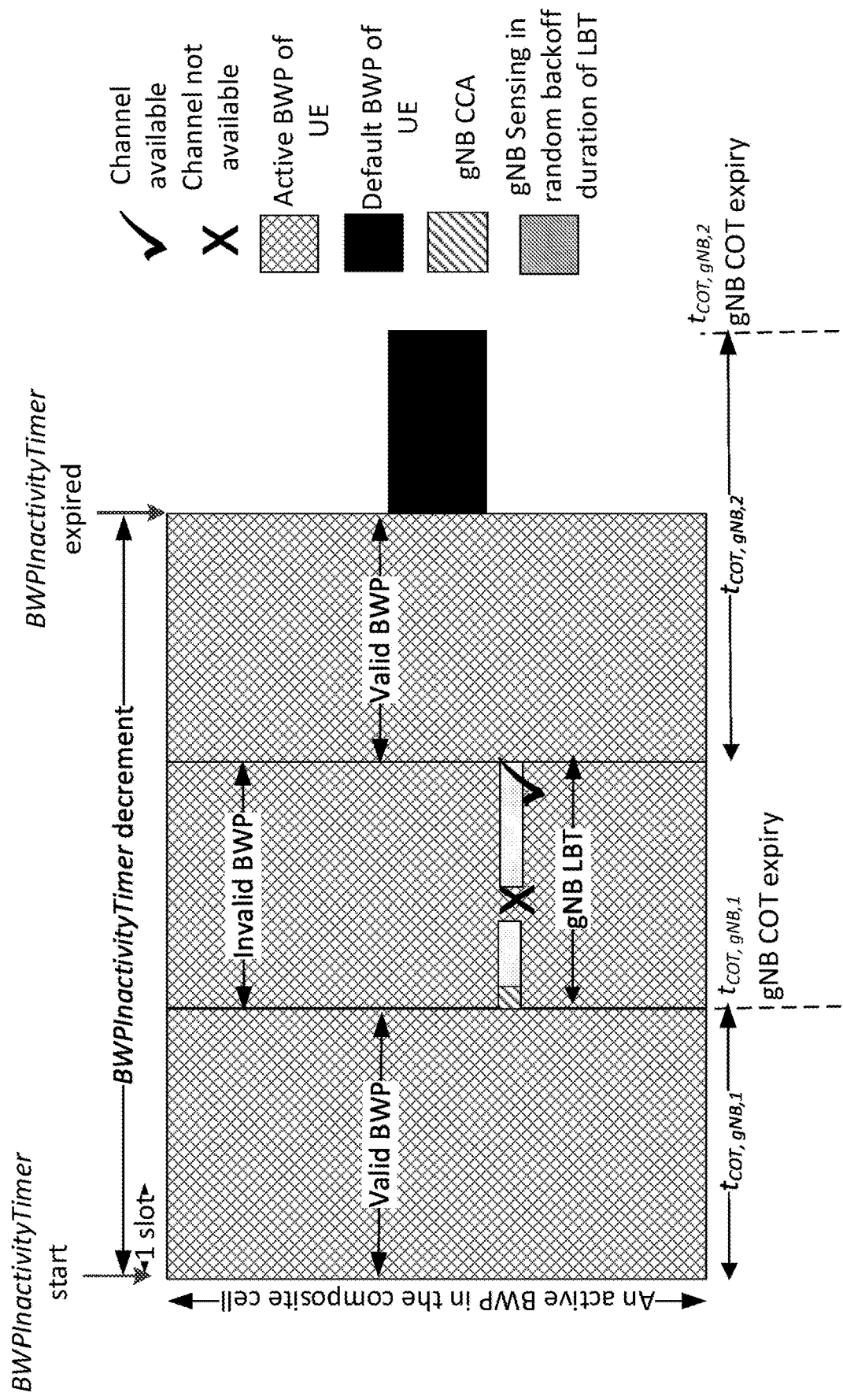
FIG. 23A illustrates exemplary BWP operation during channel access non-availability in NR, in which BWPInactivityTimer decrements when COT is not available.

If the BWPInactivtyTimer is set to a large value at the start, the UE may stay long enough on the active BWP until the gNB regains access to the channel. But during the time when the channel is not available, the UE may experience significant power drain as it operates on the invalid BWP. FIG. 23A shows an example where the gNB initially has $t_{COT,gNB,1}$ ms of channel access, followed by an LBT attempt and channel access for $t_{COT,gNB,2}$ ms. The UE's BWPInactivtyTimer may be started within $t_{COT,gNB,1}$. The UE does not have knowledge of the loss of channel access and continues to monitor during the LBT duration of the gNB (e.g., it monitors an invalid BWP and decrements its BWPInactivtyTimer during the invalid-BWP).

Figure 23B:
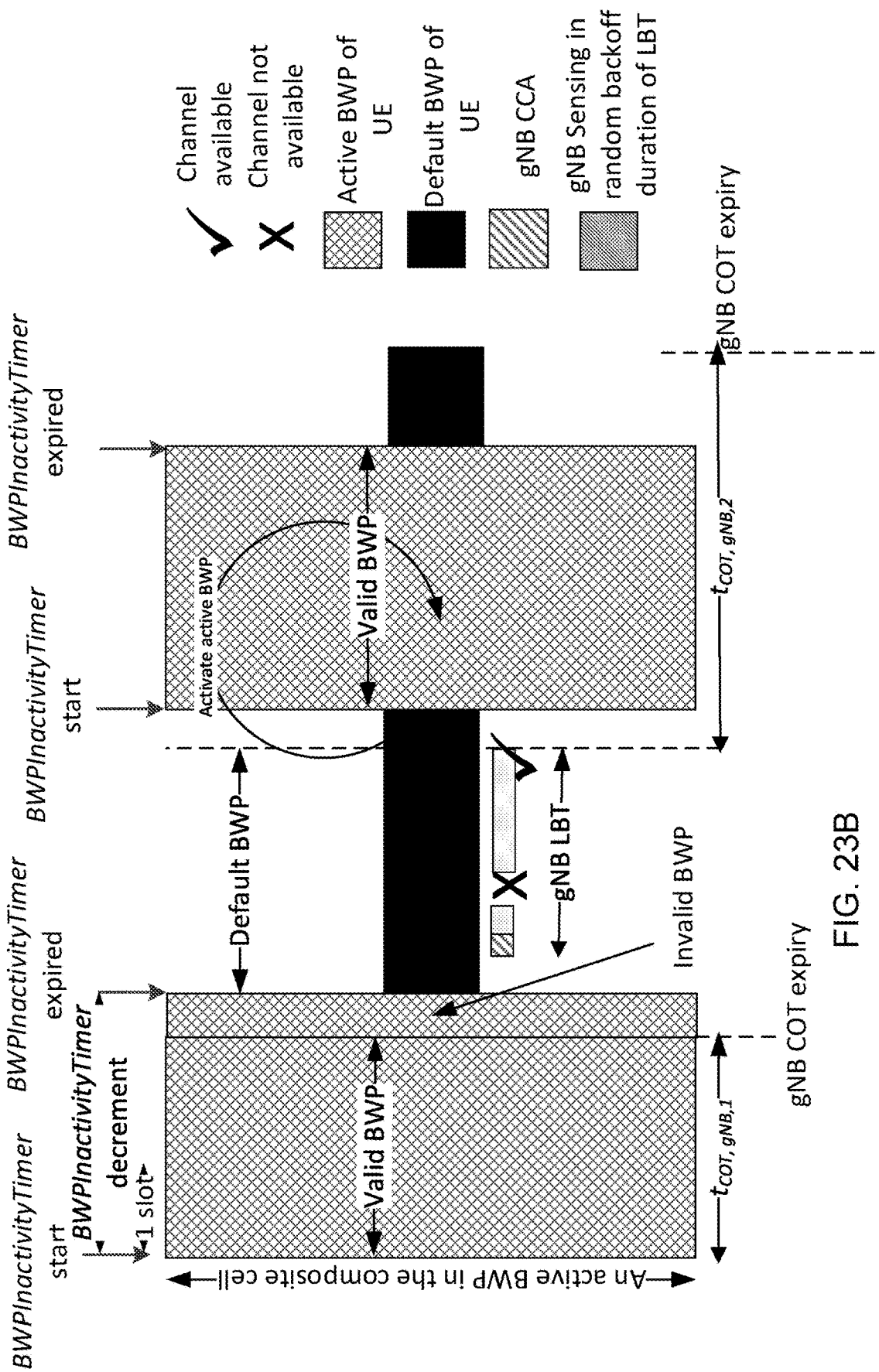
FIG. 23B illustrates exemplary BWP operation during channel access non-availability in NR, in which BWP is deactivated due to BWPInactivityTimer expiry.

If the BWPInactivtyTimer is set to a small value at the start, the UE may deactivate the active BWP sooner and save power; however, the UE should be triggered to switch back to the active BWP every time the gNB receives channel access. As shown in FIG. 23B, the UE's BWPInactivty-Timer expires shortly after $t_{COT,gNB,1}$. It does not waste much power monitoring during the invalid BWP as it's BWP gets deactivated, but it must receive a BWP activation DCI to switch back to the active BWP once the gNB gets channel access. This UE-specific DCI is transmitted on the default BWP. This process may cause significant signaling overhead especially because BWPs for multiple UEs may need to be reconfigured every time channel access is regained.

FIG. 23A-FIG. 23B illustrates exemplary BWP operation during channel access non-availability in NR in which BWPInactivityTimer decrements when COT is not available (FIG. 23A) or BWP is deactivated due to BWPInactivity-Timer expiry (FIG. 23B). The following methods may enable a UE to reduce excessive monitoring on an invalid BWP: 1) UE suspends BWPInactivityTimer in durations without channel access; or 2) gNB indicates the value for BWPInactivityTimer dynamically to manage durations without channel access.

The UE may suspend the BWPInactivityTimer during invalid-BWP duration. If the UE has knowledge of the channel access time, it may suspend the BWPInactivity-Timer for this duration, e.g., the BWPInactivity Timer's value is held and the timer is not decremented when suspended. The timer may be resumed when the UE identifies the valid-BWP state, e.g., the BWPInactivityTimer starts decrementing again.

As disclosed, the gNB may indicate information from which UE may infer a valid-BWP through a CCI when it gets channel access. When a UE receives the CCI, it may identify that the BWP is a valid-BWP at that time and begins or continues to monitor the BWP for a grant.

The gNB may transmit the CCI on the active BWP. The CCI may be transmitted in a broadcast mode in the form of a sequence, such as the PSS. The CCI may have the same sequence, such as the PSS, to keep the detection simple at the UE. The CCI may be sent periodically so that the UE may detect it with high reliability as shown in FIG. 24A.

Figure 24B:
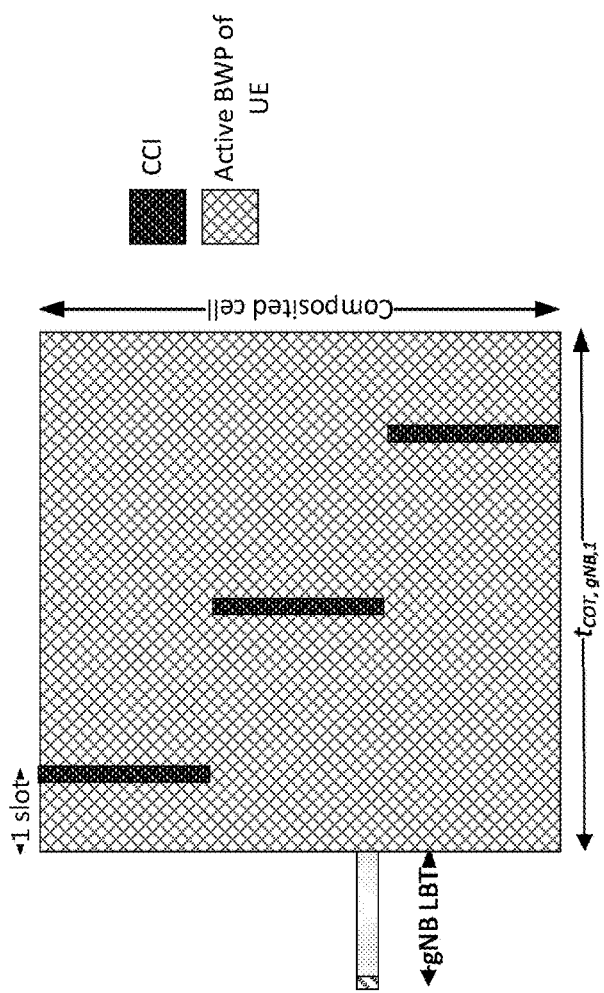
FIG. 24B illustrates an exemplary Periodic CCI transmission in active BWP indicating that node has channel access (valid-BWP), wherein periodic with different frequency resources.

Alternatively, the CCIs may be transmitted on multiple U-SCBWs in off-raster locations so that the UE does not confuse it with a PSS of the SS/PBCH block as shown in FIG. 24B. Multiple frequency resources ensure that UEs with different BWPs may detect at least one CCI.

The sequence, periodicity and resources for CCI may be configured to the UE through RRC signaling. It may be configured in UE-specific manner per BWP.

Figure 24A:
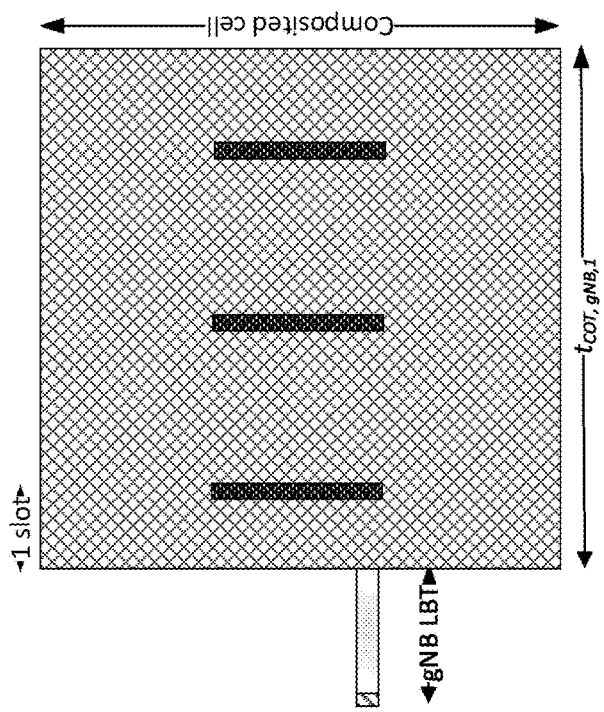
FIG. 24A illustrates an exemplary Periodic CCI transmission in active BWP indicating that node has channel access (valid-BWP), wherein Periodic with same frequency resources.

FIG. 24A-FIG. 24B illustrate exemplary periodic CCI transmission in active BWP indicating that node has channel access (valid-BWP) wherein periodic with same frequency resources (e.g., FIG. 24A) or periodic with different frequency resources (e.g., FIG. 24B). Disclosed herein is that the UE maintains a timer called the ValidBWPWindow-Timer. When a UE receives a CCI in an active BWP, it knows that the gNB has channel access and it is on a valid-BWP. It starts the ValidBWPWindowTimer and sets it to a value ValidBWPWindowTimerRRCValue which may be configured through RRC signaling and decrements it over time. ValidBWPWindowTimerRRCValue is greater than the periodicity of the CCI. On receiving a CCI, the UE may perform one or more of the following: 1) Restart the ValidBWPWindowTimer by setting it to ValidBWPWindowTimerRRCValue; 2) Unsuspend the BWPInactivity-Timer if it was suspended before and start decrementing on the active BWP; or 3) Restart the BWPInactivityTimer if it was not suspended before. The ValidBWPWindowTimer may expire as a new CCI is not received. Then the UE may assume that an invalid-BWP state has occurred and it may perform one or more of the following: 1) suspend the BWPInactivityTimer; 2) deactivate the active BWP; or 3) perform channel access, as described in more detail herein. Firstly, the UE may assume that an invalid-BWP state has occurred and it may suspend the BWPInactivityTimer but monitor the CCI. The CCI may be monitored in a low power state, unlike full-fledged BWP monitoring as the CCI could be relatively narrowband, and the UE may adjust its filter to only monitor within the narrowband bandwidth of the CCI. Secondly, the UE may assume that an invalid-BWP state has occurred and it may deactivate the active BWP and return to a default BWP. Thirdly, the UE may assume that an invalid-BWP state has occurred and it may perform channel access for UL transmission in the BWP.

In the valid-BWP operation, when the UE receives a grant it may restart the ValidBWPWindow Timer.

Figure 25:
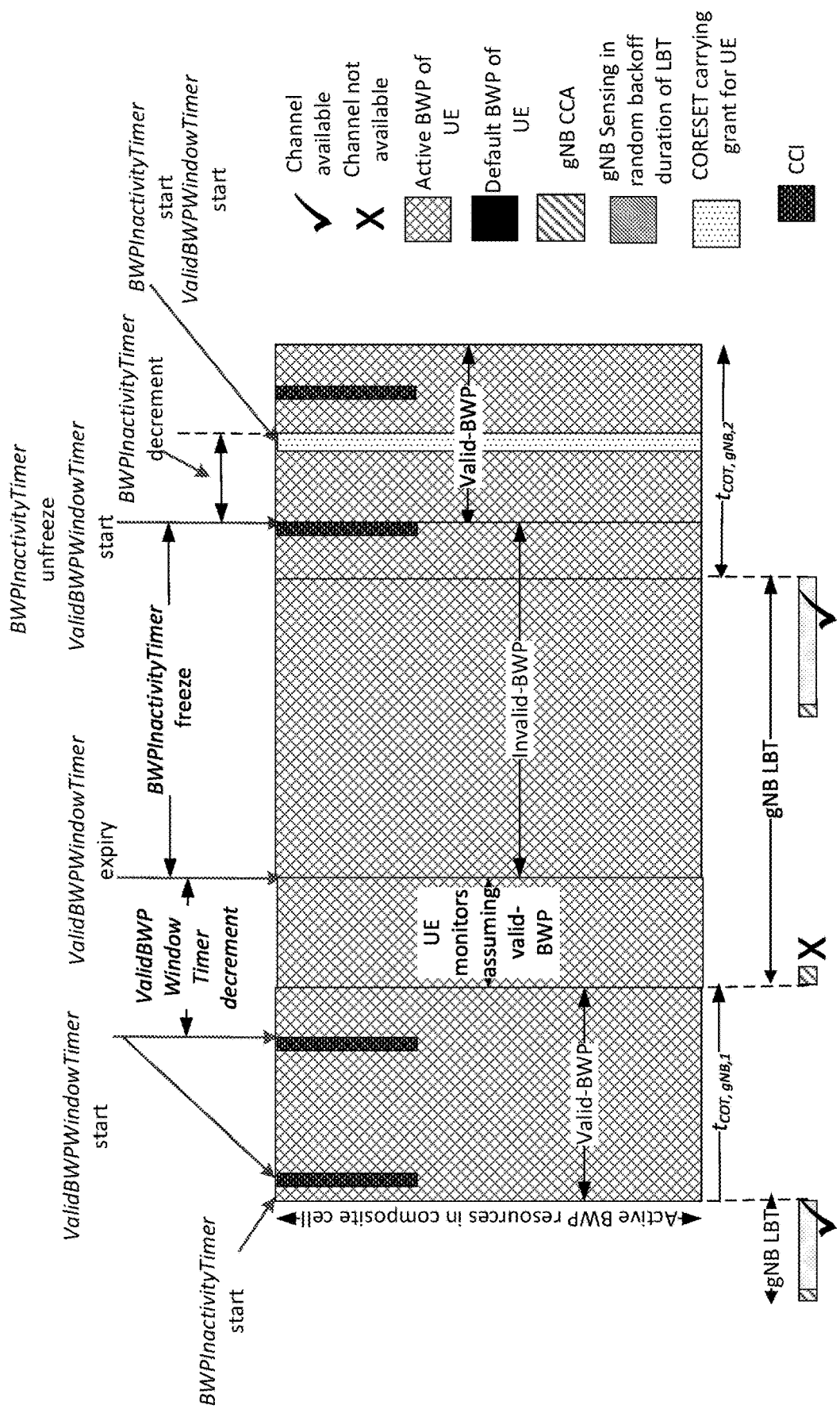
FIG. 25 illustrates an exemplary Operation using a ValidBWPWindowTimer to identify valid-BWP and invalid-BWP states.

FIG. 25 illustrates an exemplary operation using a ValidBWPWindowTimer to identify valid-BWP and invalid-BWP states. The gNB initially may acquire channel access for duration $t_{COT,gNB,1}$ ms. The UE operates in an active BWP within the corresponding composite cell. The UE starts the BWPInactivityTimer on activating the BWP. The UE receives CCI twice in this COT and each time it starts the ValidBWPWindowTimer. ValidBWPWindowTimer continues to decrement beyond $t_{COT,gNB,1}$. But the gNB lost channel access, and consequently UE does not receive the CCI. So, the ValidBWPWindowTimer expires. The UE recognizes at this time that invalid-BWP period has started and suspends the BWPInactivityTimer.

However, the UE may continue to monitor the CCI during the invalid-BWP, potentially in a low-power state. Subsequently, the gNB obtains access to the carrier for $t_{COT,gNB,2}$ ms. The UE may receive the CCI and may identify at this time that it is entering a valid-BWP state. It unsuspends the BWPInactivityTimer which starts decrementing. The UE also recognizes this as a valid-BWP and begins to monitor the active BWP for grants. Subsequently, the UE receives a grant which resets the BWPInactivityTimer and the ValidBWPWindowTimer.

This method may be considered to focus on indicating the valid-BWP to the UE through the CCI. Note that the UE may recognize the expiry of valid-BWP state when the ValidBWPWindowTimer expires; so there may be a lag between when the gNB loses the MCOT and UE recognizes valid-BWP expiry. Similarly, there may be a lag between when channel access is available but when the UE identifies that invalid-BWP has ended.

Figure 26:
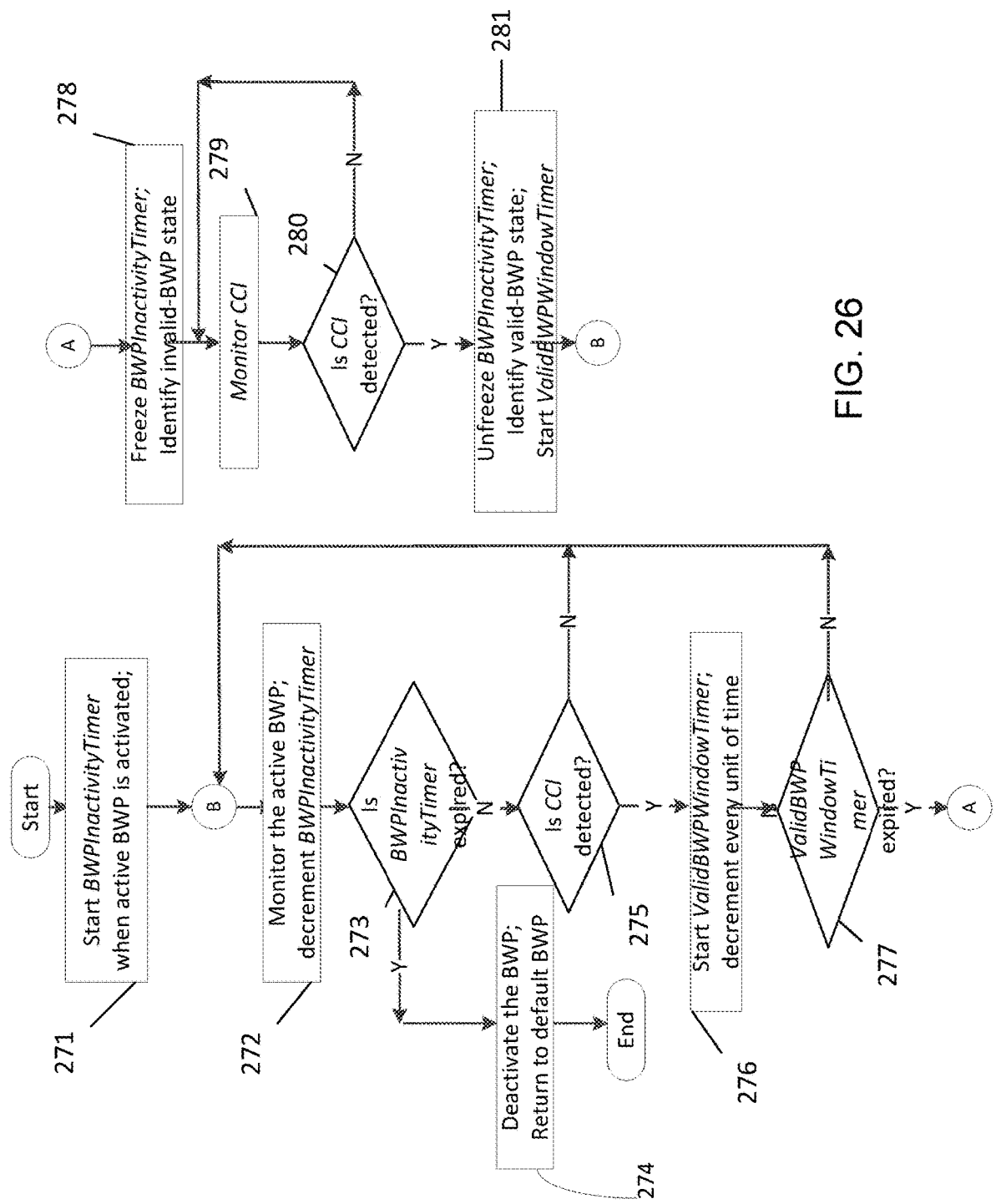
FIG. 26 illustrates an exemplary Procedure for entering and exiting valid-BWP and invalid-BWP states using the validBWPWindowTimer.

A sample procedure is shown in FIG. 26. Here the ValidBWPWindowTimer is set on receiving the CCI. On expiration of ValidBWPWindowTimer, the UE suspends the BWPInactivity Timer but monitors CCI in a low-power state. On receiving a CCI, the UE restarts the ValidBWP-WindowTimer and resumes the BWPInactivityTimer.

With reference to FIG. 26, at step 271, BWPInactivity Timer is started when active BWP is activated. At step 272, the active BWP is monitored and BWPInactivityTimer is decremented. If, at step 273, it is determined that the BWPInactivityTimer is expired, then, at step 274, deactivate the BWP and return the default BWP. If, at step 273, it is determined that the BWPInactivityTimer is not expired, then, at step 275, there is a determination if CCI is detected. Based on CCI being detected, start, at step 276, ValidBWP-WindowTimer and decrement every unit of time. If at step 277 it is determined that ValidBWPWindowTimer is expired, then freeze, at step 278, BWPInactivityTimer and identify invalid-BWP state. At step 279, monitor CCI and if, at step 280, CCI is detected, then unfreeze BWPInactivity-Timer, at step 281, identify valid BWP state, and start ValidBWPWindowTimer.

Figure 27A:
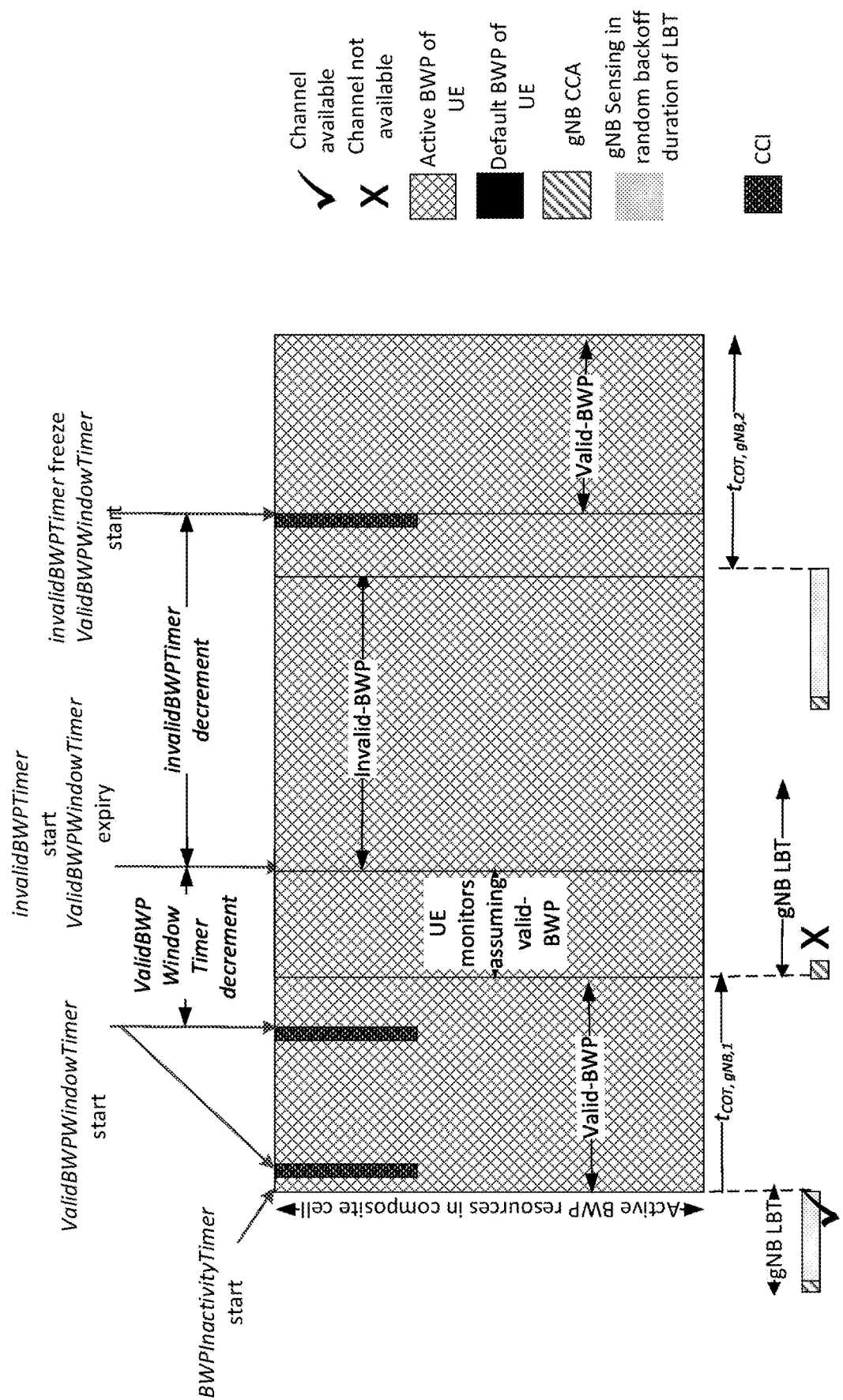
FIG. 27A illustrates an example for Using the invalidBWPTimer to Transition to valid-BWP prior to invalidBWPTimer expiry.

Deactivation of active BWP during inactive-BWP state. When a UE enters an invalid-BWP state, it may run a timer referred to as invalidBWPTimer. This timer may be set to an RRC configured value 'invalidBWPTimerRRCValue' when the UE identifies the invalid-BWP state and the UE may continue to monitor for CCI. The timer decrements as long as the UE does not identify a valid-BWP state. If the UE detects a CCI, it transitions into the valid-BWP state and suspends the invalidBWPTimer. FIG. 27A illustrates this. The arrow near the top of that points to the first default BWP indicates that ValidBWPWindowTimer starts when CCI received.

Figure 27B:
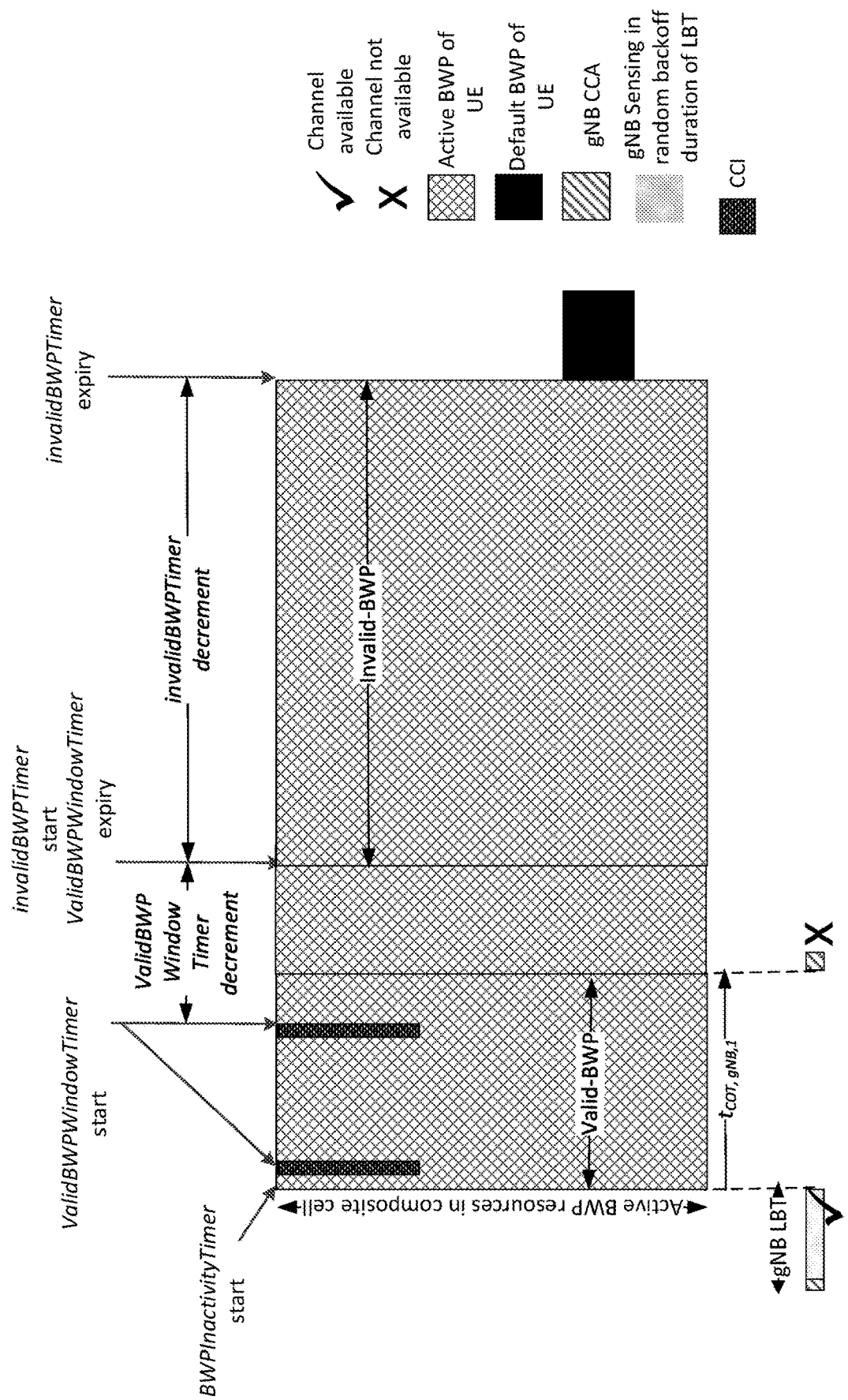
FIG. 27B illustrates an example for Using the invalidBWPTimer to Deactivate active BWP after prolonged period of invalid-BWP (invalidBWPTimer expired)

If the invalidBWPTimer expires, the UE may switch to a different BWP such as the default BWP. FIG. 27B shows this operation. This invalidBWPTimer procedure may help ensure that channel access failure for a composite carrier does not force the UE to remain in the invalid-BWP state for a prolonged duration. Instead, the UE may be able to gain access to a different composite carrier configuration and continue communicating there. On expiration of invalidBWPTimer, a UE may go to the initial BWP or a default BWP.

Figure 28:
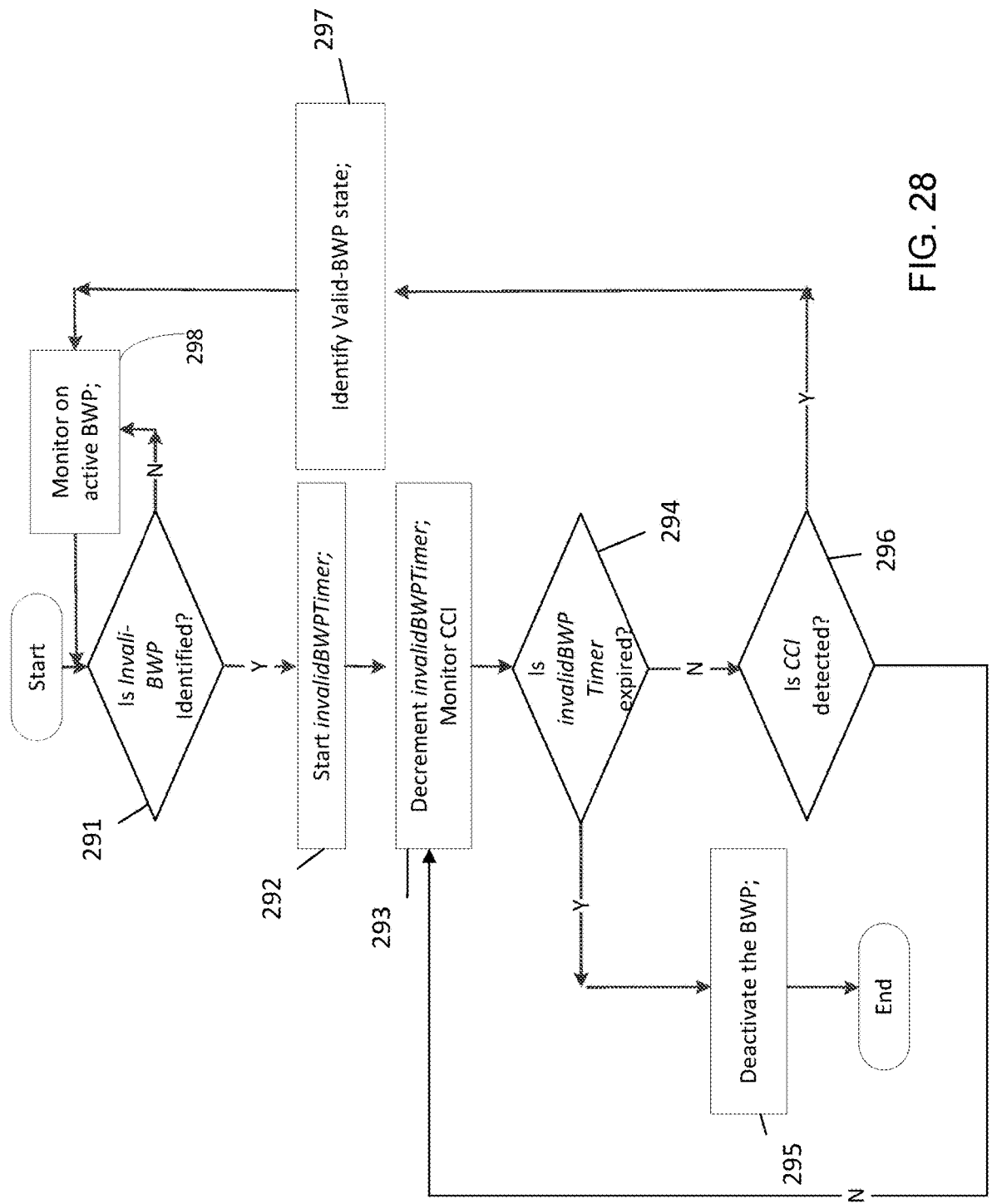
FIG. 28 illustrates an exemplary Procedure for deactivating active BWP when UE experience prolonged invalid-BWP state.

FIG. 28 shows the procedure for re-entering a valid-BWP state on receiving a CCI and deactivating the BWP upon expiration of the invalidBWPTimer. At step 291, there is a determination of whether an invalid BWP is identified. If identified, then at step 292, start invalidBWPTimer and at step 293, decrement invalidBWPTimer and monitor CCI. At step 294, if it is determined that invalidBWPTimer is expired then deactivate the BWP at step 295. If, at step 294, it is determined that invalidBWPTimer is not expired, then determine if CCI is detected at step 296. If CCI is detected, then identify, at step 297, valid-BWO state and monitor on active BWP at step 298. This is summary of the procedure, but also review FIG. 28 for further consideration of flow.

Figure 29:
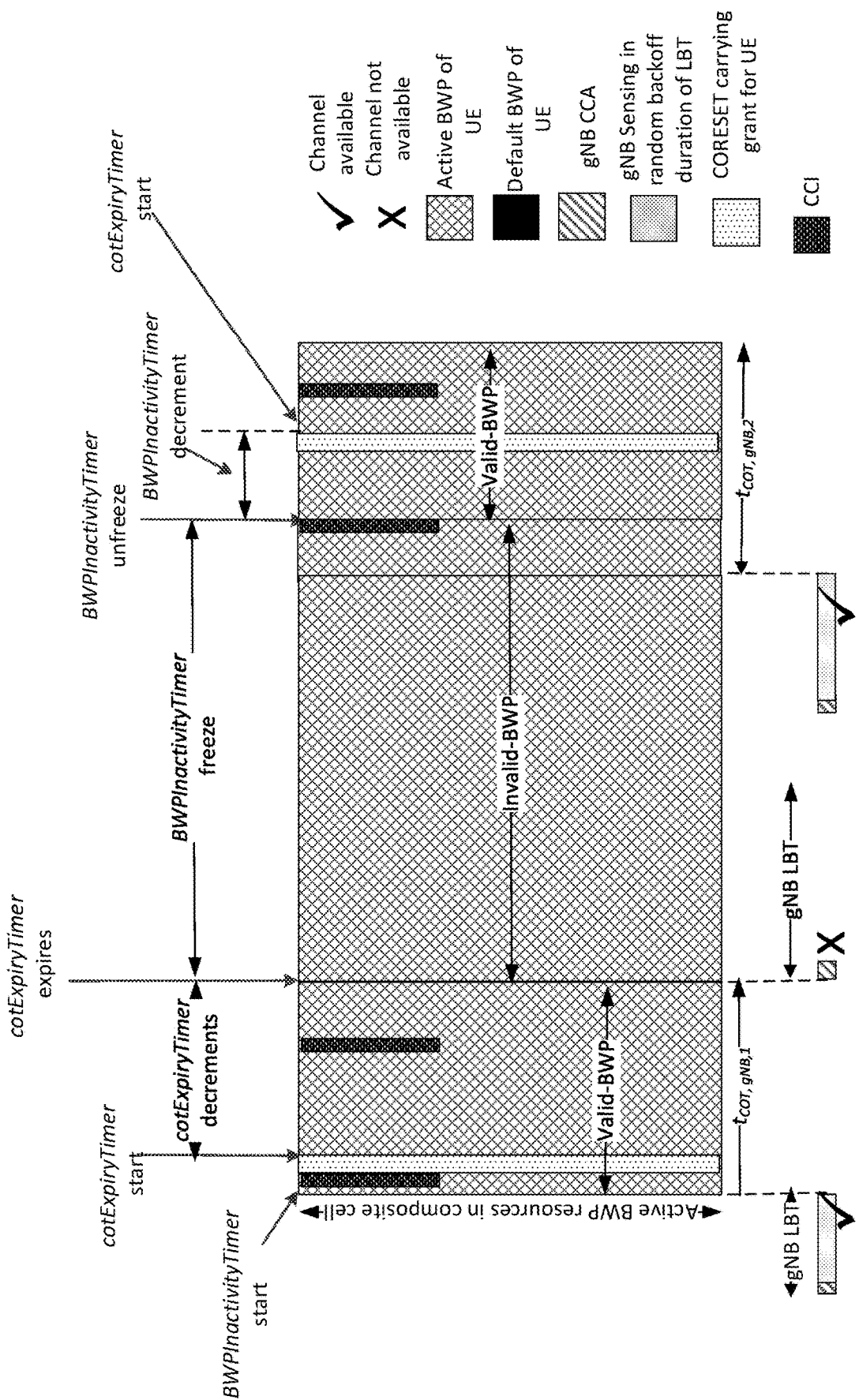
FIG. 29 illustrates an example for Freezing the BWPInactivityTimer based on cotExpiryTimer expiration.
Figure 30:
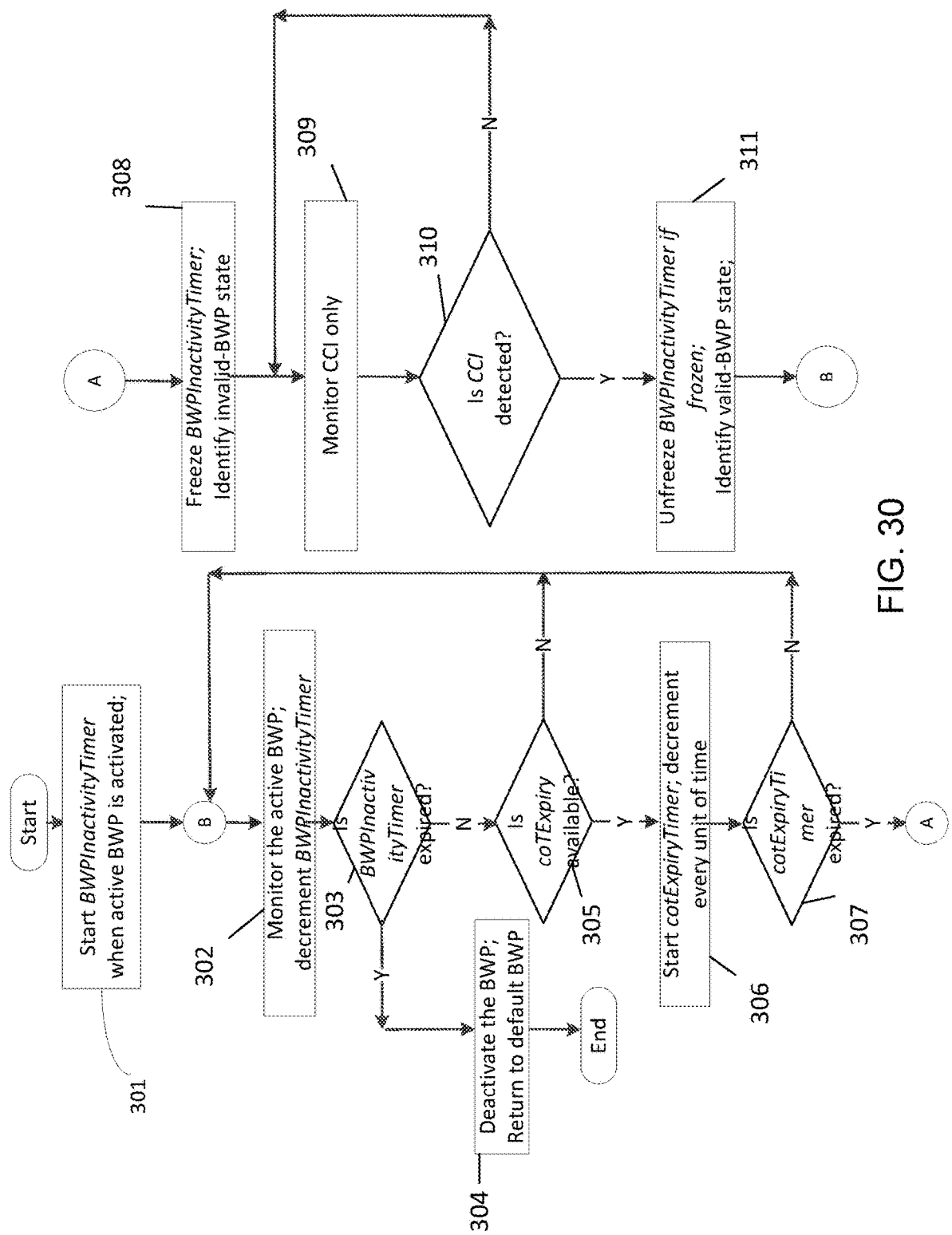
FIG. 30 illustrates an exemplary Procedure for using the cotExpiryTimer to identify the invalid-BWP and suspend the BWPInactivityTimer.

COT (channel occupation time) based invalid-BWP determination. Disclosed herein is a method to manage the BWP using indication of the COT expiration of a node. For example, the gNB may indicate its COT to the UE. The COT may be indicated through a UE specific DCI, such Format 0_0 or Format 0_1 or Format 1_0 or Format 1_1. Alternatively, a CCI may be indicated in a multicast mode through a GC-PDCCH using a CCI-RNTI. When the channel access of the gNB ends, the UE may suspend the BWPInactivity-Timer or deactivate the BWP. This provides the advantage that the UE can go to a low power state as soon as the valid-BWP state ends; the invalid-BWP starts immediately upon COT expiry. This is shown in FIG. 29. Here, the UE uses a cotExpiryTimer when it obtains the cotExpiry time from the gNB. It sets the cotExpiryTimer and decrements it such that it expires when the gNB loses channel access. This timer may override the ValidBWPWindowTimer, e.g., if the ValidBWPWindow Timer has not expired, but the cotExpiryTimer has expired, the UE identifies the invalid-BWP state suspends the BWPInactivity Timer and may monitor only CCI in a low power state without full-fledges BWP monitoring. Unlike FIG. 25 where the UE may still monitor some the early part of the invalid-BWP until the ValidBWPWindowTimer expires, the UE resumes the BWPInactivity Timer on detecting a CCI and identifies valid-BWP state. FIG. 30 shows the procedure for freezing the BWPInactivity Timer on expiration of cotExpiryTimer.

With reference to FIG. 30, at step 301, BWPInactivity Timer is started when active BWP is activated. At step 302, the active BWP is monitored and BWPInactivityTimer is decremented. If, at step 303, it is determined that the BWPInactivityTimer is expired, then, at step 304, deactivate the BWP and return the default BWP. If, at step 303, it is determined that the BWPInactivityTimer is not expired, then, at step 305, there is a determination if cotExpiry is available. Based on cotExpiry being available, start, at step 306, cotExpiryTimer and decrement every unit of time. If at step 277 it is determined that cotExpiryTimer is expired, then freeze, at step 308, BWPInactivityTimer and identify invalid-BWP state. At step 309, monitor CCI and if, at step 310, CCI is detected, then unfreeze BWPInactivityTimerI if frozen, at step 311, and identify valid BWP state.

Figure 31:
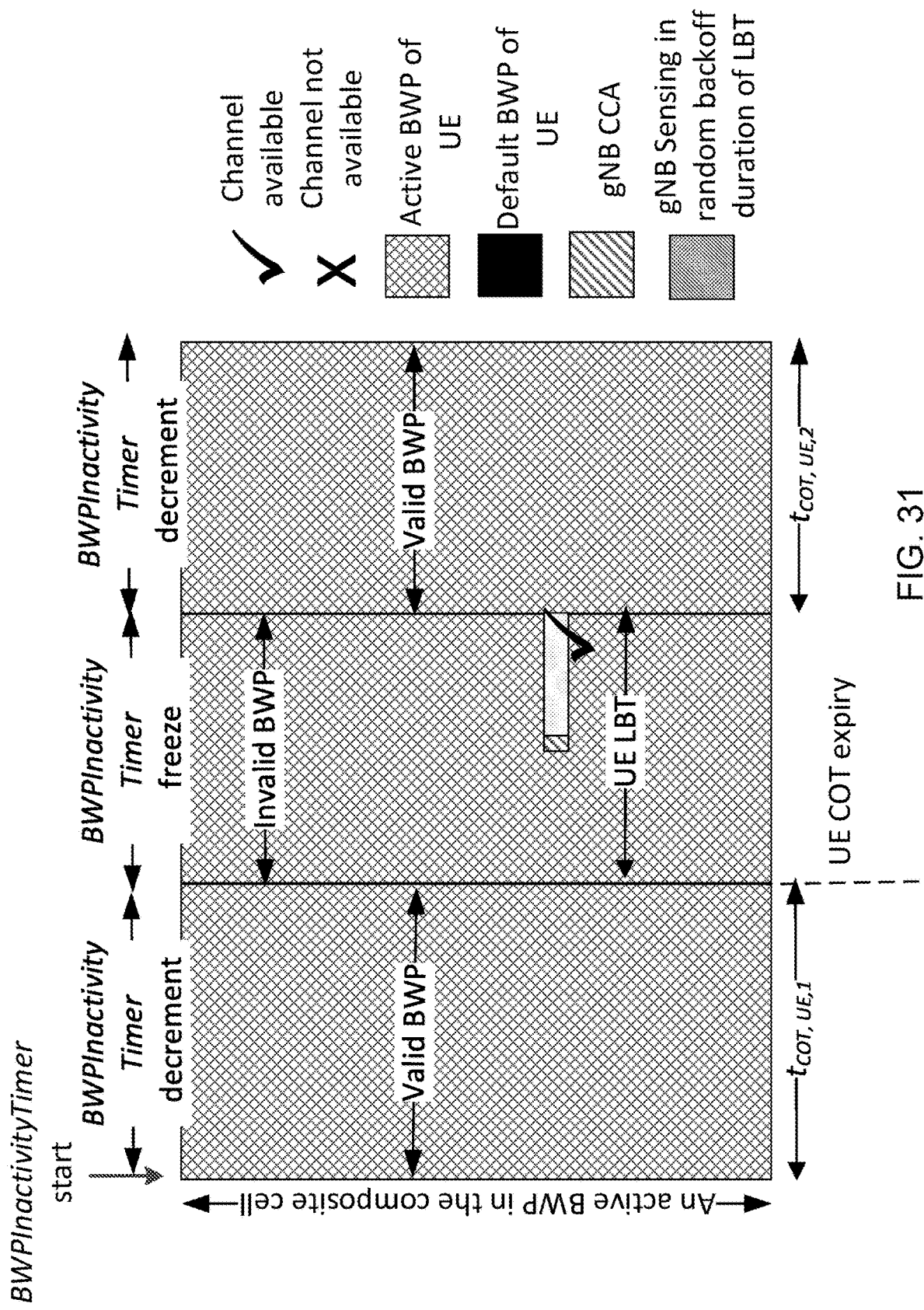
FIG. 31 illustrates an example for Freezing the BWPInactivityTimer during UE's channel access.

Freezing the BWPInactivityTimer based on UE's COT—For UL BWP operation in unpaired spectrum, the UE knows its COT duration $t_{COT,UE}$ when it obtains channel access to an active BWP. The UE suspends its BWPInactivityTimer upon expiry of its COT so that it is not decremented until the UE obtains the next channel access. FIG. 31 shows an example where the UE obtains UL BWP channel access in $t_{COT,UE,1}$ followed by LBT from UE and channel access in $t_{COT,UE,2}$. As the UE knows the time of expiration of $t_{COT,UE,1}$ and the time of start of channel access for $t_{COT,UE,2}$ channel access, it may suspend the BWPInactivityTimer between the channel access opportunities. The UE may also not monitor the active BWP during this time as it is an invalid-BWP.

Figure 32:
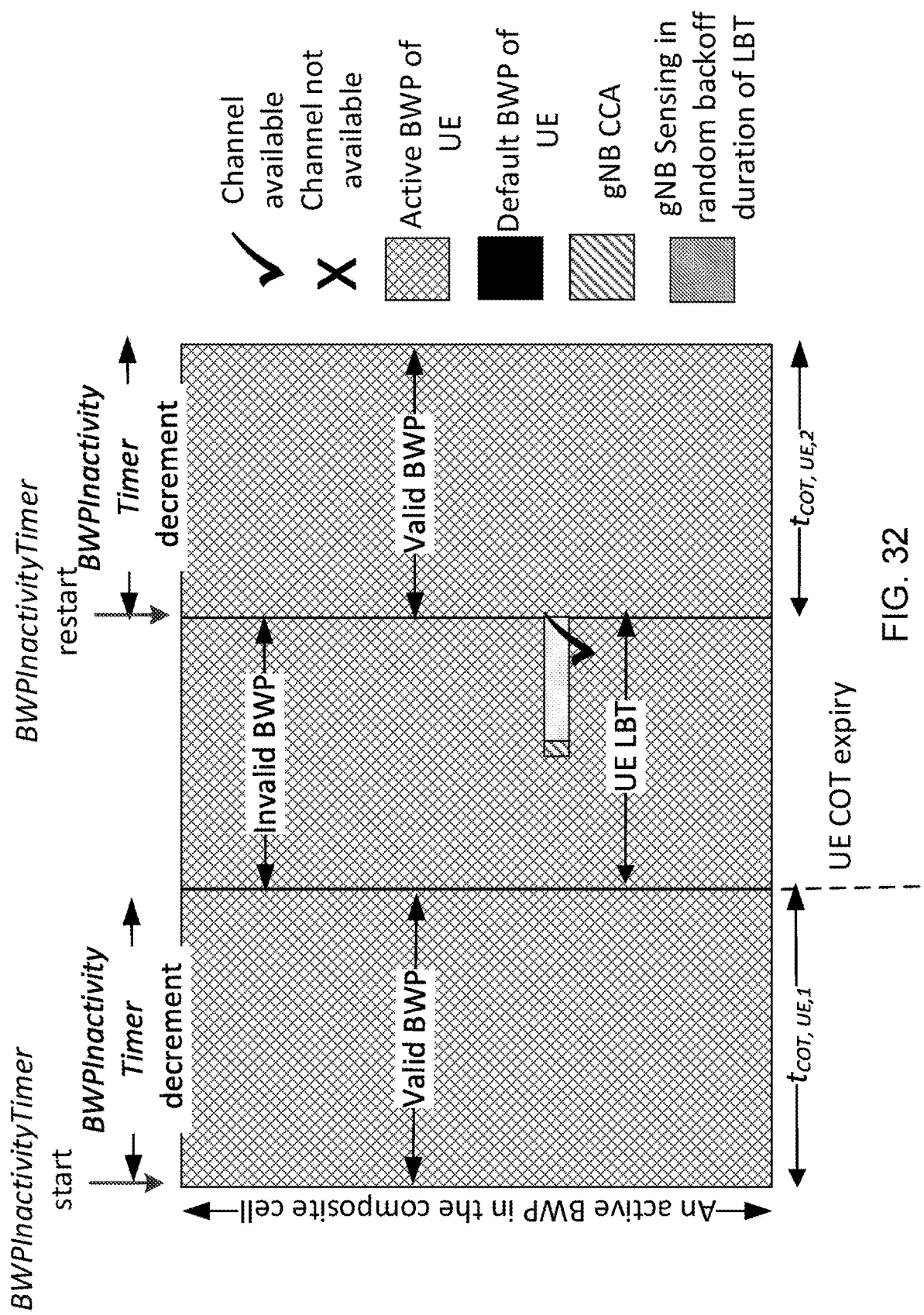
FIG. 32 illustrates an example in which UE restarts BWPInactivityTimer upon successful LBT.

FIG. 32 shows another example where the UE may also restart the BWPInactivity Timer upon acquiring channel access. During the invalid-BWP duration, the UE may be in "zero-BWP" state, where it may perform channel sensing/LBT at the most but does not monitor PDCCH or transmit UL signals.

gNB indicates the value for BWPInactivityTimer dynamically. Another scheme is described here for efficient management of the BWPInactivityTimer. The gNB may indicate the value BWPInactivityTimerDCIValue for the BWPInactivity Timer dynamically through a UE-specific DCI such as grant carrying DCI (Formats 0_0, 0_1, 1_0, 1_1) or a GC-PDCCH scrambled with CCI-RNTI. Upon receiving this DCI, the UE may reset the value of the BWPInactivity Timer to one of the following values: 1) BWPInactivityTimerDCIValue; or 2) min(BWPInactivityTimerDCIValue, BWPInactivityTimerRRCValue). The BWPInactivity TimerDCIValue may be computed based on the COT of the gNB. The UE may enter a low-power state in an invalid-BWP following the expiry of the COT or the UE may deactivate the active BWP when the COT expires.

Figure 33A:
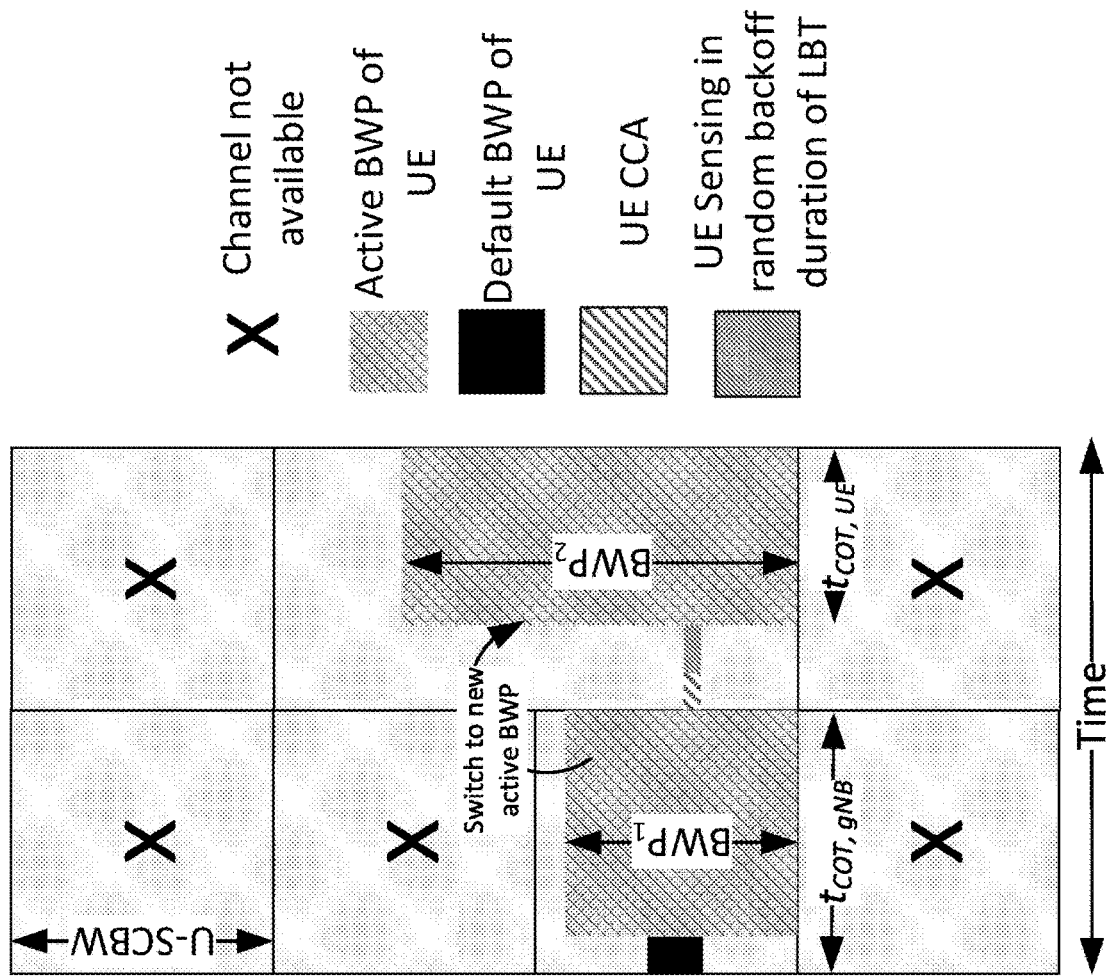
FIG. 33A illustrates an example in which BWP changes in each ChAxOp: BWP2 is activated through CCI on a default BWP.
Figure 33B:
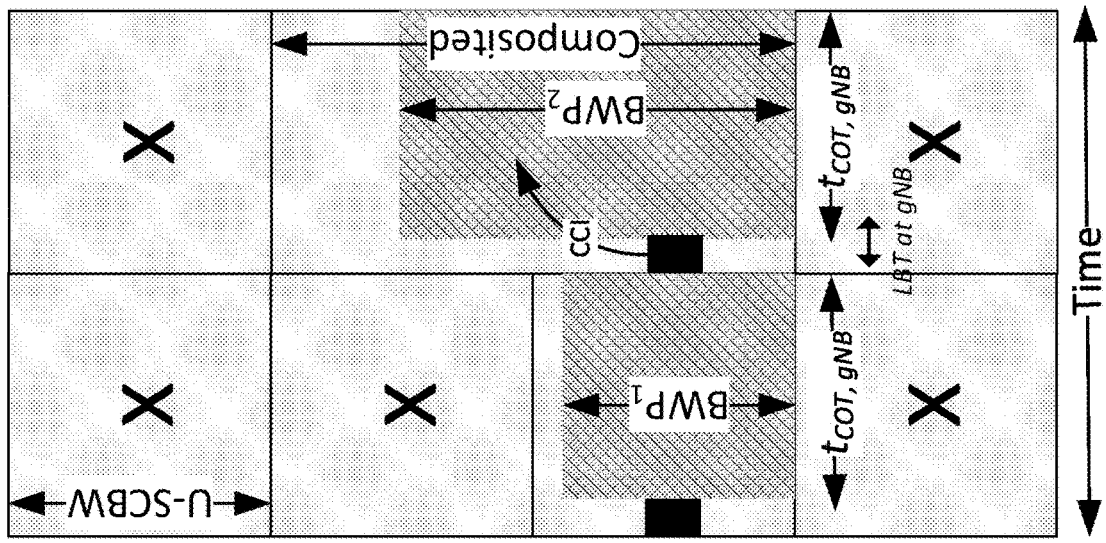
FIG. 33B illustrates an example in which BWP changes in each ChAxOp: $BWP_2$ is activated by $BWP_1$.

Active BWP management in a flexible wideband operation. If flexible wideband operation is supported in NR-U, an active BWP available to the UE in a given channel access opportunity may not be available in the next because the gNB may not have channel access to the same 20 MHz bands during the two channel access opportunities; so, a new active BWP may be obtained depending on the composited carrier configuration. The concept is shown in FIG. 33A-FIG. 33B where the bandwidth and spectrum of the composited carrier may be different in different channel access opportunities (ChAxOp). The CCI, as shown, may indicate the composite carrier BW. In FIG. 33A the gNB may obtain channel access to a composite channel for $t_{COT,gNB,1}$ time in ChAxOp1. The UE may operate in $BWP_1$ during this time. Subsequently the gNB may obtain a composite carrier access for $t_{COT,gNB,2}$ in ChAxOp2 and the UE may operate on $BWP_2$. In FIG. 33B the gNB may obtain channel access to a composite channel for $t_{COT,gNB,1}$ time duration. It provides a UL grant to the UE in $BWP_2$, after the expiry of the gNB's COT. The UE may perform LBT and gains access to $BWP_2$. If the UE does not get channel access to $BWP_2$ for transmitting PUSCH, the UE may return to a default BWP or active $BWP_1$.

Figure 34:
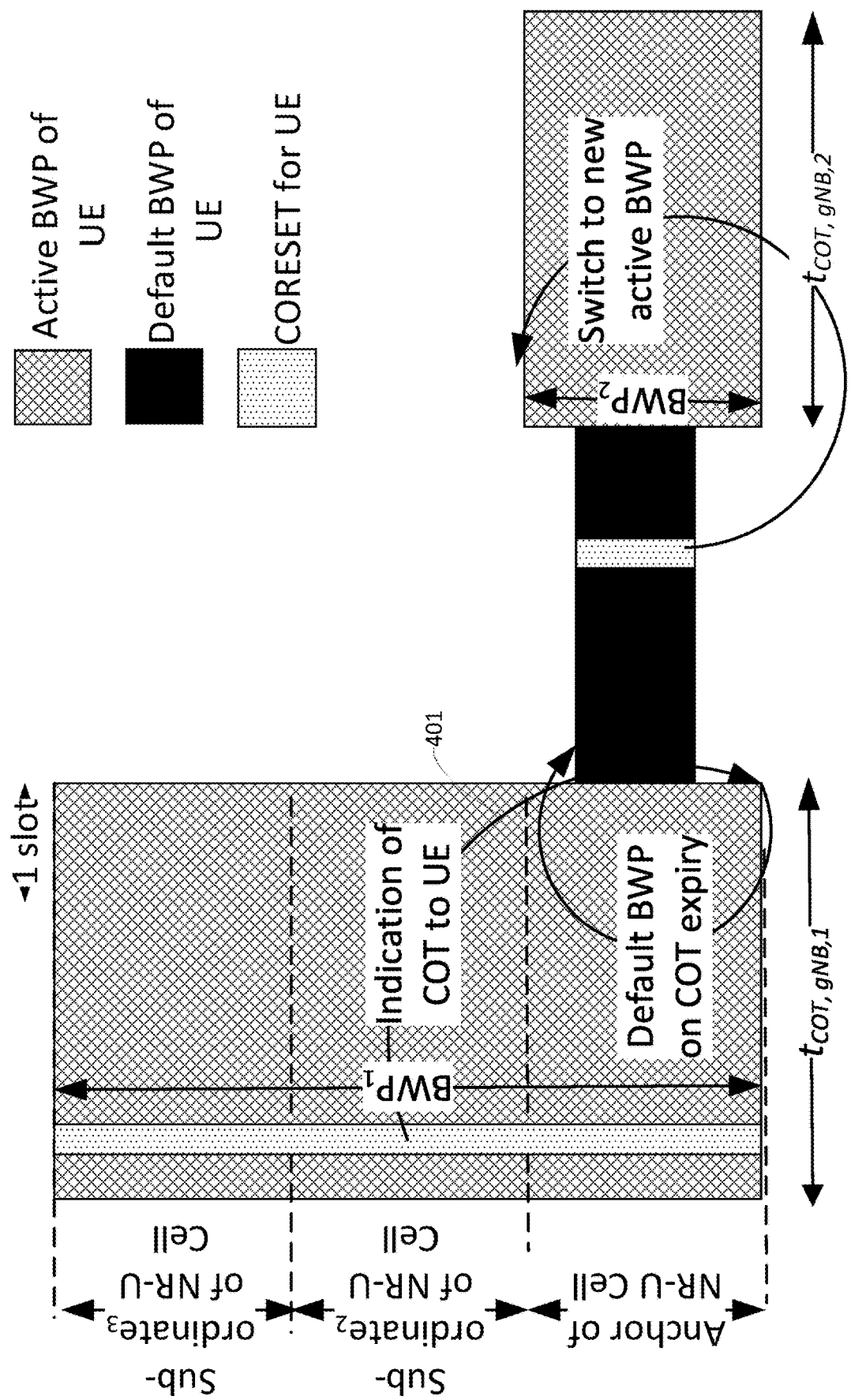
FIG. 34 illustrates an exemplary Switching from $BWP_1$ to default BWP on COT expiry and activating $BWP_2$ through CCI.

The BWP may be different between different channel access opportunities. Therefore, as disclosed, the UE may deactivate the active BWP when the COT of the gNB or UE expires. Subsequently, the UE may perform the following procedures to determine a new active BWP. In a first procedure, upon deactivating the $BWP_1$ on expiry of the COT, the UE may switch to a BWP such as a default BWP configured for the UE. The UE may monitor this BWP for a DCI than may activate active $BWP_2$ based on the composite carrier in the next channel access opportunity. The deactivation of the active BWP may use the cotExpiryTimer procedure in FIG. 30. The concept is shown in FIG. 34. A COT itself may be obtained from the CCI transmitted in active $BWP_1$. In a second procedure, upon deactivating the $BWP_1$ on expiry of the COT, the UE may not have a default BWP. Instead, it may search for CCI in candidate BWPs. Up to $BWP_{max}$ candidate BWPs (for CCI monitoring) may be RRC-configured to the UE on potential composite carriers. The configuration may include the duration of time $t_{CCImonitor,i}$ ms to monitor the $i^{th}$ candidate BWP referred to as $BWP_i$. The UE may switch to the $i^{th}$ candidate BWP and monitor $BWP_i$ for CCI for $t_{CCImonitor,i}$ ms. If the UE does not receive the CCI corresponding to $BWP_i$ within $t_{CCImonitor,i}$ ms, it may switch to $BWP_{i+1}$ and begins monitoring the CCI. If the UE receives a CCI in the $i^{th}$ candidate $BWP_i$, it may not monitor CCI in $BWP_j$ where j>i. If UE does not receive CCI in any of the candidate BWPs, it may return to monitor $BWP_1$ and may cycle through the candidate BWPs. If a CCI is not received on $BWP_i$, the UE may consider that it is in the invalid-BWP state. Note, as shown in FIG. 34, arrow 401 from the CORESET shows that a PDCCH indicates the expiration time for the gNB's COT. So UE can switch to default BWP on gNB's COT expiry. On receiving PDCCH in COREEST on default BWP indicating the new gNB COT, in another channel access opportunity, UE switches to the new BWP depending on the BW of composite carrier. When the COT of the gNB expires, the UE transitions to the default BWP and monitors it for the next CCI. If the next CCI on the default BWP indicates that it must switch to BWP2, UE switches and monitors BWP2.

Figure 35:
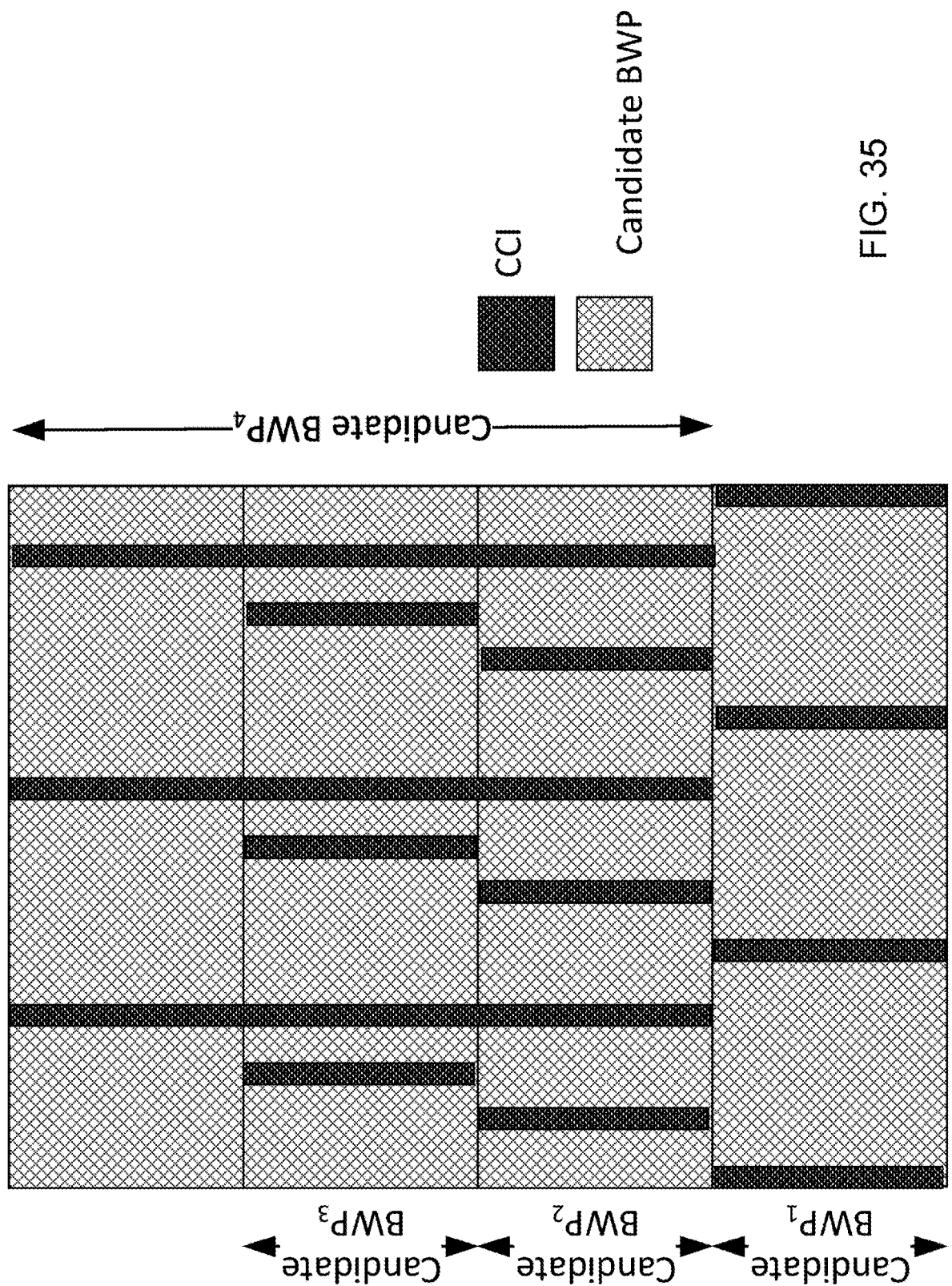
FIG. 35 illustrates an exemplary Periodic transmission of CCI on multiple candidate BWPs of the UE.

FIG. 35 shows the concept of candidate BWPs to search for CCI. The CCIs may be transmitted on the BWPs such that the UE has enough time to tune to the new BWP before attempting to receive the CCI.

Figure 36:
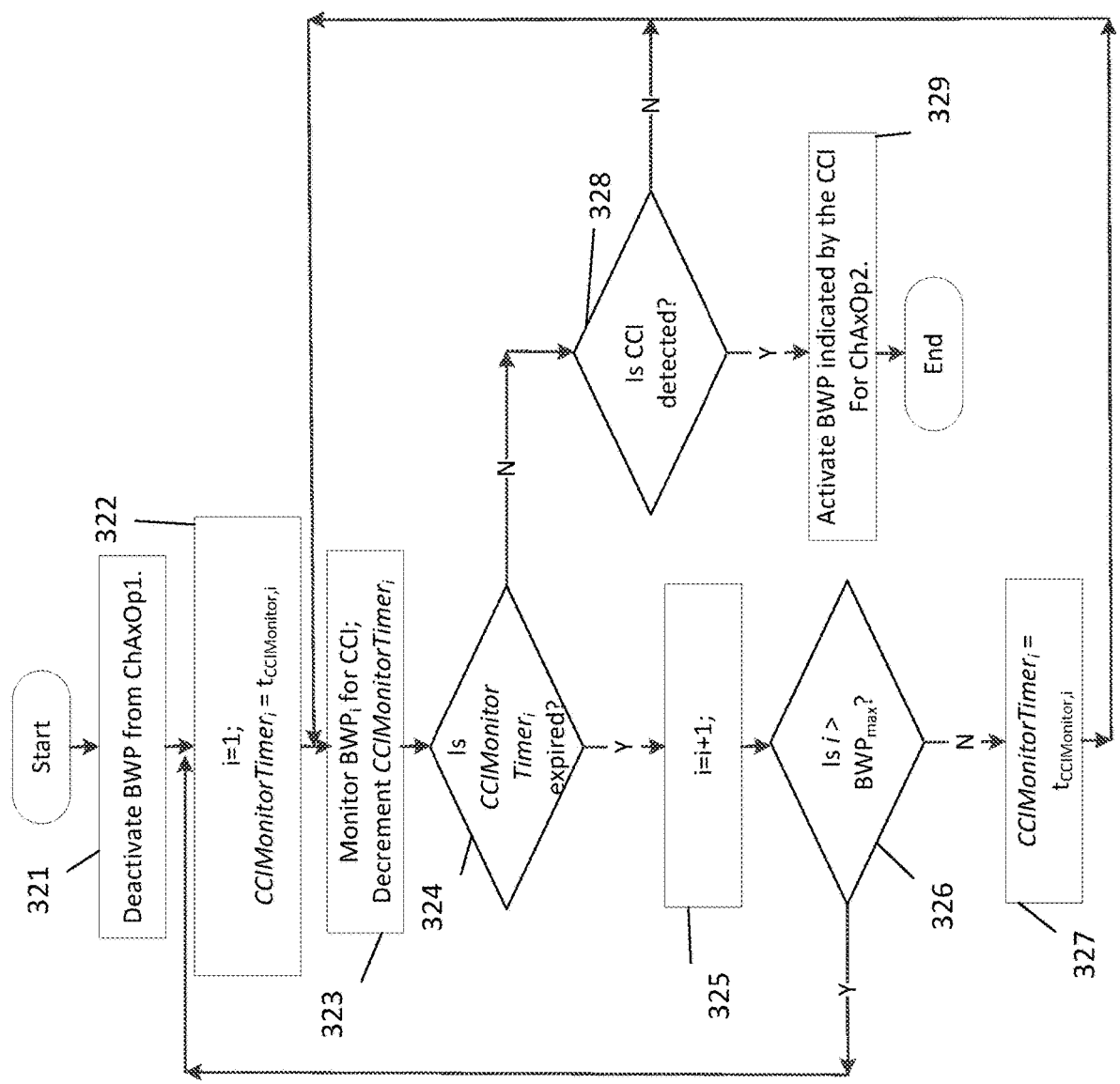
FIG. 36 illustrates an exemplary Procedure to obtain CCI by searching through multiple BWP candidates.

FIG. 36 shows the procedure of finding the active BWP in a channel access opportunity. Here the UE may activate the BWP in ChAxOp1 and may activate an active BWP in ChAxOp2 by searching the CCIs in candidate BWPs.

With reference to FIG. 36, at step 321, deactivate BWP from ChAxOp1. At step 322, i=1 and $CCIMonitorTimer_i = t_{CCImonitor,i}$. At step 323, monitor $BWP_i$ for CCI and decrement $CCIMonitorTimer_i$. At step 324, it is determined whether $CCIMonitorTimer_i$ is expired. If yes, then i=i+1 and there is a determination, at step 326, if I. $BWP_{max}$. If no for step 326, then at step 327, $CCIMonitorTimer_i = t_{CCImonitor,i}$. At step 324, if it is determined that $CCIMonitorTimer_i$ is expired, then there is a subsequent determination whether CCI is detected at step 328. If CCI is detected, then activate, at step 329, BWP indicated by the CCI for ChAxOp2. This is a summary of some of the flow of FIG. 36.

The CCI may be indicated through a UE-specific DCI on $BWP_i$. The DCI may provide a grant to the UE in $BWP_{Active}$. The UE may switch to $BWP_{Active}$ to process the grant. Multiple UEs may be impacted when the gNB obtains channel access to a new composite carrier configuration. The gNB may want to configure a BWP on the newly obtained composite carrier multiple UEs; so, BWP switching may be triggered in a multicast or broadcast mode using the CCI. The BWP activation trigger may move multiple UEs to the new active BWP at once. A GC-PDCCH scrambled using CCI-RNTI may be used to indicate the $BWP_{Active}$ to the UEs; the GC-PDCCH carries the index of the $BWP_{Active}$. Referring to FIG. 35, the CCI may be CORESETs (Control Resource Sets) including common search space for GC-PDCCH that the UEs are configured to monitor. When a UE receives a CCI, it may identify the BWP to activate.

Alternatively, the GC-PDCCH may carry only information on the composite carrier, e.g. the composited U-SCBWs. The UE may be configured through RRC to switch to BWPk for that composite carrier configuration. To enable the UE to monitor CCI in a low power mode, the CCI may be a PSS/SSS-like signal based on a sequence. Besides, it may be narrowband so that the UE can operate on a smaller bandwidth during the CCI detection stage. The CCI may also indicate the COT of the gNB so that the UEs may deactivate $BWP_{Active}$ upon expiry of the COT.

Currently, NR supports the case where a UE has a single active BWP. The subject matter herein discloses that when a UE has multiple Tx-Rx chains, it may monitor more than one candidate at the same time, using one Tx-Rx chain used for each candidate BWP. For such UEs, the gNB may schedule the CCIs on different candidates at the same time. This may allow for minimal latency in obtaining the CCI. Upon receiving the CCI in $BWP_j$, the UE may switch to the indicated $BWP_{Active}$ and may deactivate the candidate BWPs. NR-U may use this procedure on a composited carrier using an anchor cell. In addition, disclosed herein is NR-U support carrier compositing based on channel availability without an anchor cell. The procedure for obtaining the BWP based on searching CCIs in candidate BWPs may be applied in this case. In flexible operation without an anchor, a cell may potentially occupy up to N*U-SCBW Hz subject to channel availability. A node may composite adjacent available U-SCBWs into one ChAxOp. The set of frequency resources available in one ChAxOp may be different or not adjacent to the set of frequency resources available in another ChAxOp as the presence of an anchor in each ChAxOp is not required.

Figure 37B:
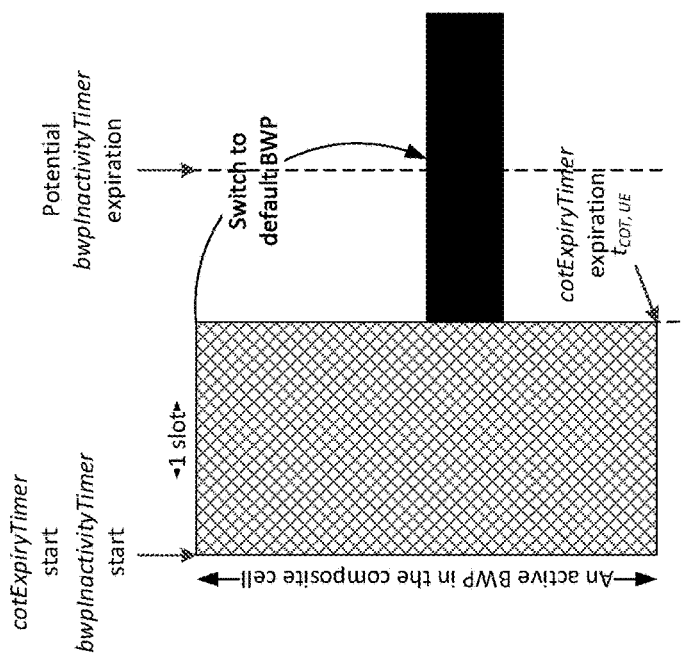
FIG. 37B illustrates an exemplary BWP deactivation due to cotExpiryTimer expiry: UE knowns it COT.
Figure 37A:
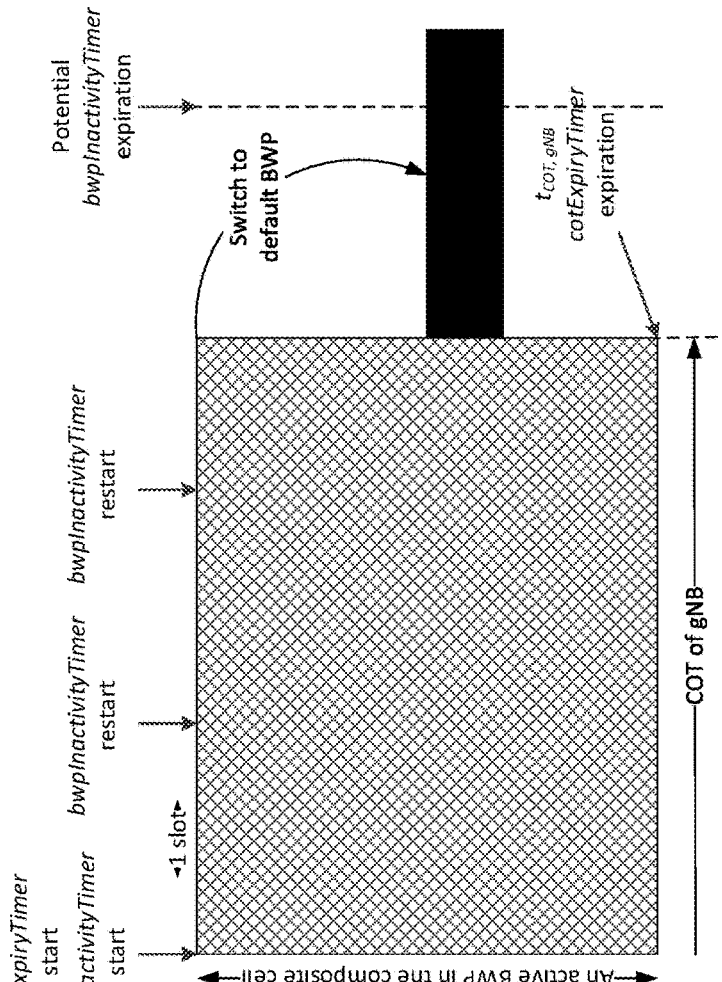
FIG. 37A illustrates an exemplary BWP deactivation due to cotExpiryTimer expiry: gNB indicates the COT to UE.

Procedures relating to deactivation of an active BWP when triggered by expiration of COT are given here. The active BWP's deactivation may be performed in one of the following ways. A timer 'cotExpiryTimer' is used to determine when to deactivate the BWP. The timer is set to a value cotExpiry which may be the remaining duration within MCOT. The counter decrements in a unit of time such as ms or slot or symbols. When the counter expires (reaches zero), the BWP is deactivated. The deactivation may occur even if the BWPInactivity Timer has not expired. FIG. 37A shows deactivating the BWP when the channel is obtained by gNB. Here, the UE starts the BWPInactivityTimer and cotExpiryTimer when its BWP is activated. The BWPInactivity Timer may restart every time there is grant. When the cotExpiryTimer expires, even though the BWPInactivityTimer has not expired, the UE deactivates the active BWP. FIG. 37B shows deactivating the BWP when the channel is obtained by the UE. Here, the cotExpiryTimer is set to $t_{COT,UE}$.

Figure 38:
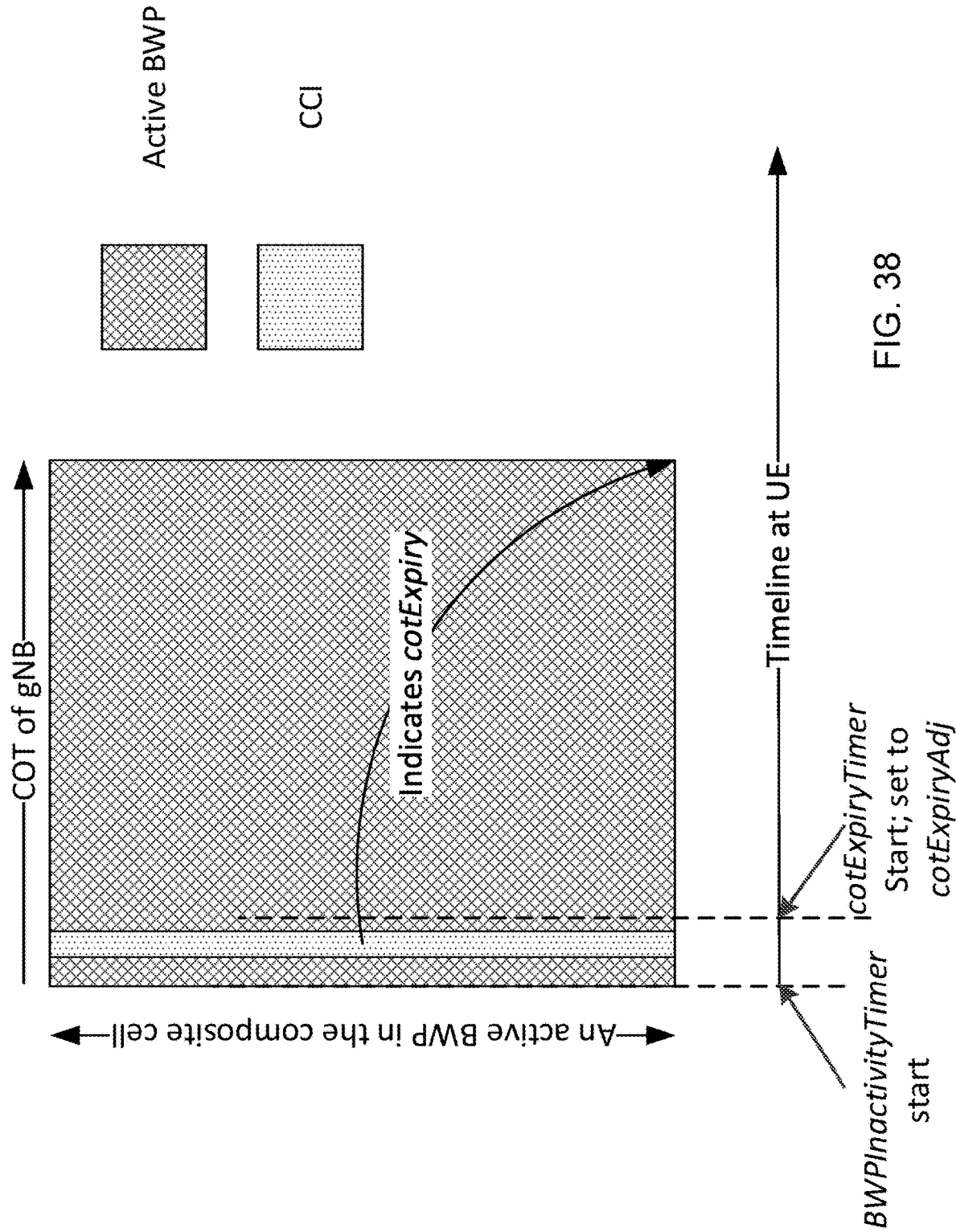
FIG. 38 illustrates an example in which gNB indicates COT to UE using the CCI.

The cotExpiryTimer may be started once the UE receives the cotExpiry; the UE may receive this on the active BWP, so there may be a lag in setting the cotExpiryTimer with respect to starting the BWPInactivityTimer. The UE may adjust the cotExpiry value to cotExpiryAdj based on its processing delay prior to setting the cotExpiryTimer. This is shown in FIG. 38 where the CCI indicates the gNB's COT from the time of start of the CORESET carrying the CCI. The arrow as shown in FIG. 38 provides that CCI indicates the time when COT expires.

Figure 39:
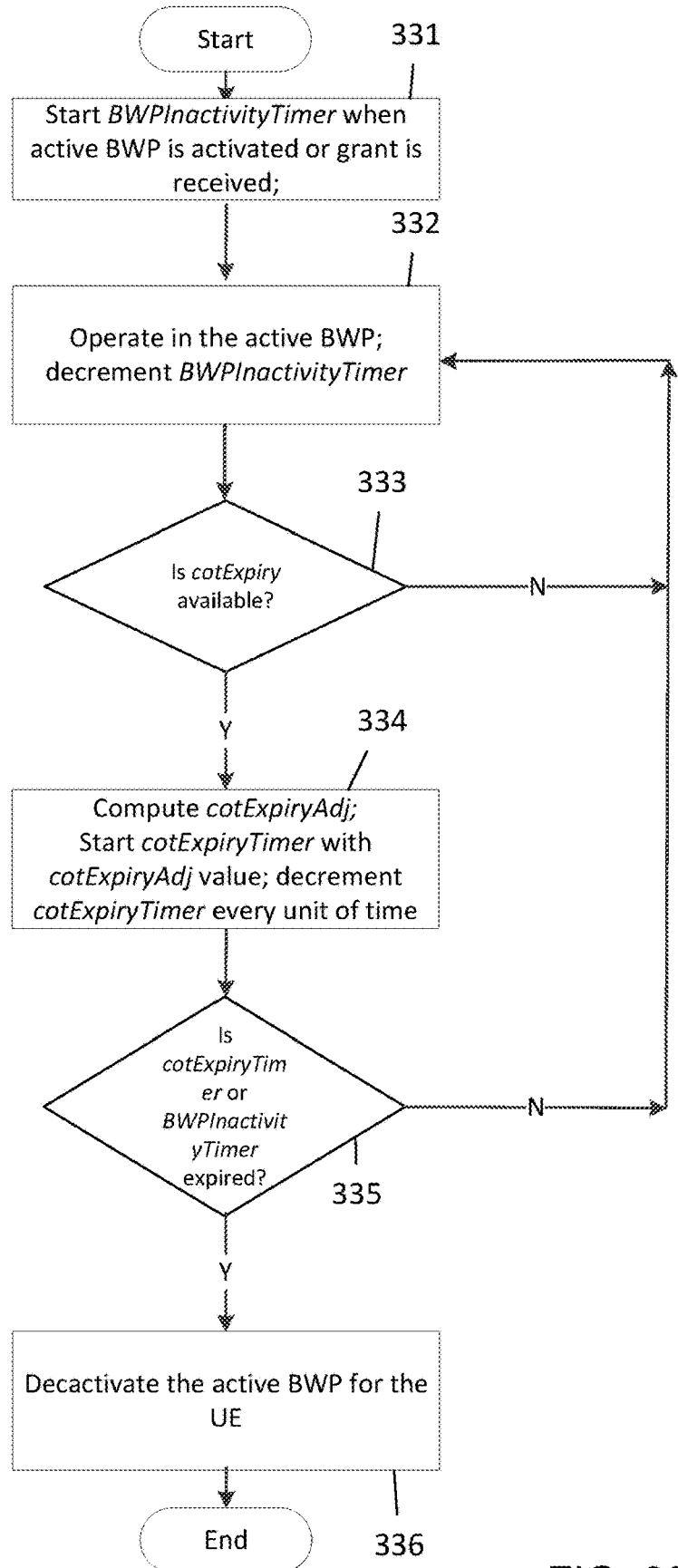
FIG. 39 illustrates an exemplary Procedure to deactivate BWP upon expiry of cotExpiryTimer.

FIG. 39 shows the procedure for deactivating the BWP using the cotExpiryTimer. Here the UE may operate in the active BWP until the cotExpiryTimer expires or the BWPInactivityTimer expires. The value of the BWPInactivityTimer is a function of the channel availability such as the remaining duration within the COT which is referred to as cotExpiry. For example, the BWPInactivity Timer is set according to Equation 1. Here, BWPInactivity TimerRRCValue is the value configured for the timer through RRC.

$$BWPInactivityTimer=min(BWPInactivityTimerRRCValue, cotExpiry) \quad \text{Equation 1}$$

With reference to FIG. 39, at step 331, BWPInactivityTimer is started when active BWP is activated or grant is received. At step 332, UE may operate in the active BWP and decrement BWPInactivityTimer. At step 333, if cotExpiry is available, then compute, at step 334, cotExpiryAdj and start cotExpiryTimer with cotExpiryAdj value, as well as decrement cotExpirTimer every unit of time. It is determined at step 335 if cotExpiryTimer or BWPInactivity Timer is expired. At step 336, if expired, then deactivate the active BWP for the UE. This is just a summary of some of the flow of FIG. 39. Note that generally the descriptions of the flows herein are examples and summaries and the flows may include more information than the summaries herein.

Figure 40B:
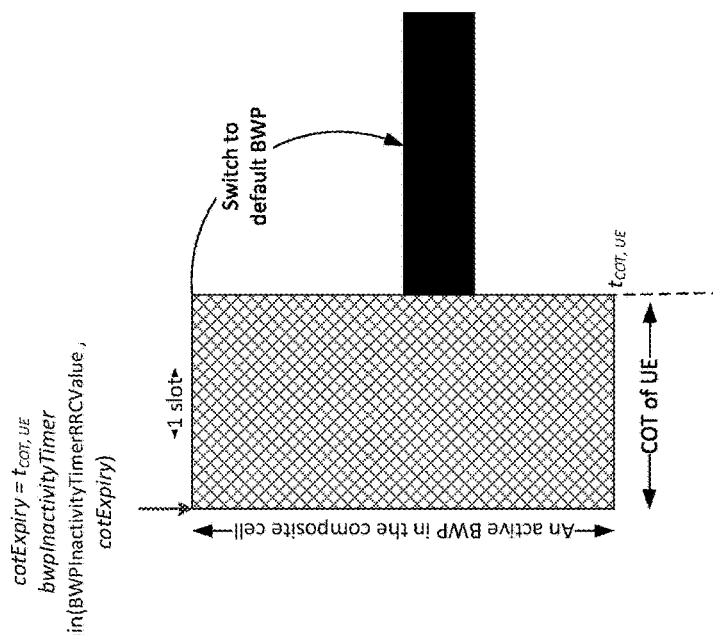
FIG. 40B illustrates an exemplary operation in which BWPActivityTimer value is updated based on cotExpiry: When UE has channel access and knows its COT.
Figure 40A:
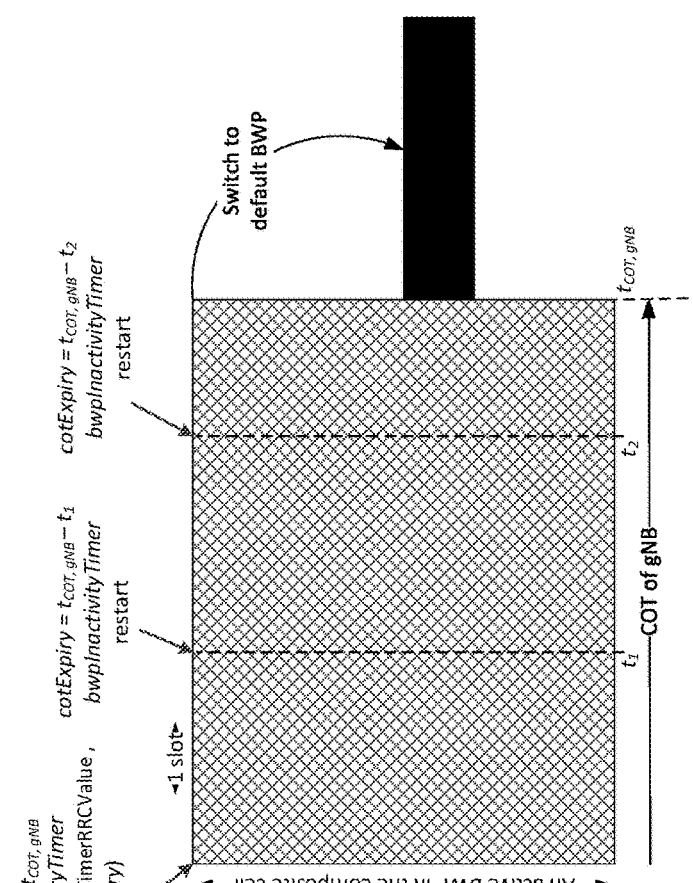
FIG. 40A illustrates an exemplary operation in which BWPActivityTimer value is updated based on cotExpiry: When gNB obtains channel access and indicates the COT.
Figure 41:
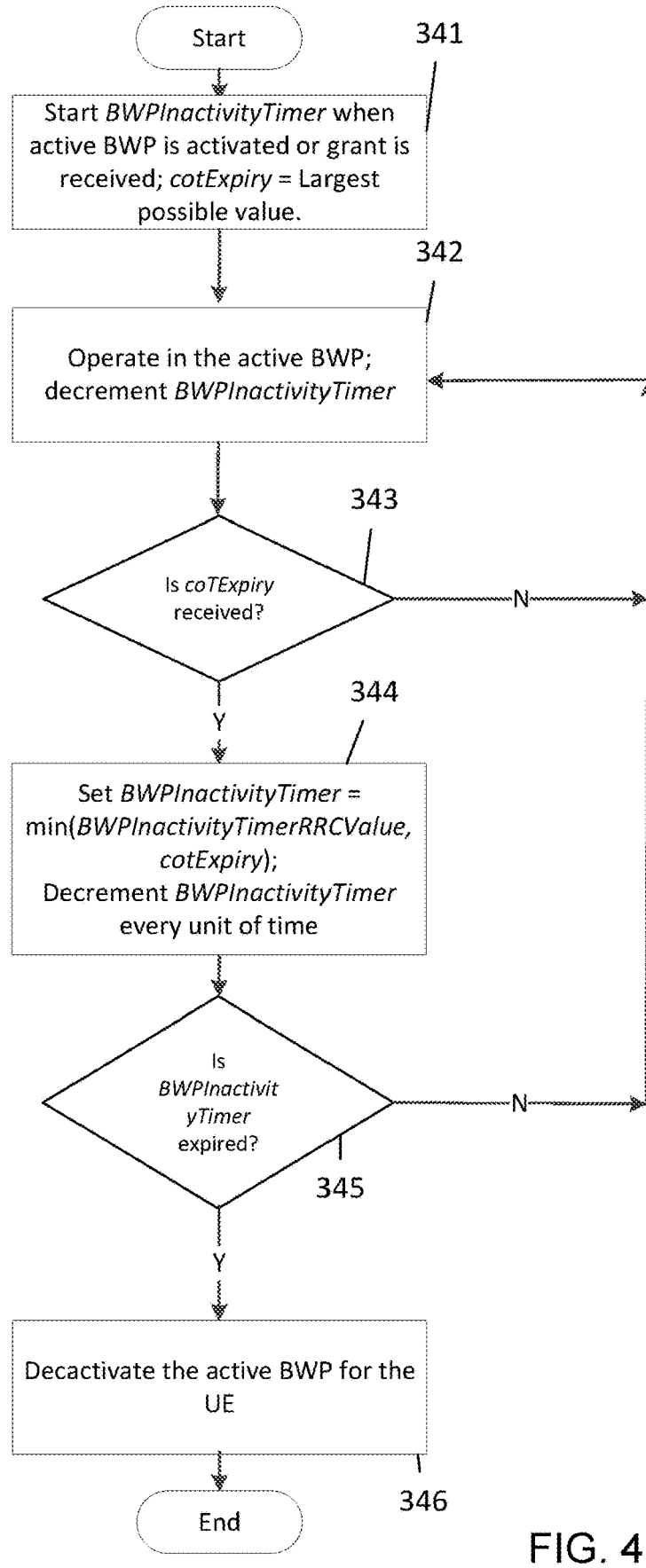
FIG. 41 illustrates an exemplary Procedure to update the BWPInactivityTimer with the cotExpiryAdj value.

FIG. 40A shows the concept of deactivating the BWP when the channel access is obtained by the gNB. Here, the UE may update the value of cotExpiry based on the remaining time of channel access $t_{COT,gNB} - t_i$ where $t_i$ is the time instance when the $cotExpiry_i$ is computed. Upon receiving a grant at $t_j$, the UE may restart its BWPInactivityTimer using the value for $cotExpiry_j$ at $t_j$. When BWPInactivityTimer expires, the UE may deactivate the BWP. FIG. 40B shows an example where the cotExpiry is the function of the UE's COT time $t_{COT,UE}$. FIG. 41 shows the procedure to deactivate the BWP using the BWPInactivity Timer. At step 341, start BWPInactivityTimer when active BWP is activated or grant is received. Note that cotExpiry=largest possible value. At step 342, operate in the active BWP and decrement BWPInactivity Timer. At step 343, it is determined if cotExpiry is received. If received at step 343, then set BWPInactivityTimer=min (BWPInactivityTimerRRCValue, cotExpiry) and decrement BWPInactivity Timer every unit of time. If, at step 345, BWPInactivityTimer is expired, then deactivate, at step 346, the active BWP for the UE. If cotExpiry is not received at step 343 or BWPInactivityTimer is not expired at step 345 then go to step 342.

The value for cotExpiry may be obtained by the UE in the following ways. In a first way, when the gNB gets the channel access, cotExpiry is set based on the COT of the gNB. The cotExpiry may be provided to the UE through a UE-specific DCI, such as an UL or DL grant. Alternatively, the cotExpiry may be transmitted in a multicast or broadcast manner, through a signal such as the CCI; the CCI may carry the channel access duration of the gNB from which the UE computes cotExpiry. In a second way, when the UE obtains channel access, cotExpiry may be set based on the COT of the UE. Depending on the LBT access and priority type cotExpiry may be set to the MCOT of the UE or for the duration of the grant received by the UE.

BWP deactivation based on channel access may be a configurable mode of operation. If configured, the UE may deactivate the active BWP using procedure described here.

If it is not configured, the UE may continue to operate in the default manner in NR, e.g., based on the setting the BWPInactivityTimer through an RRC signaling/parameter. The configuration of BWP deactivation based on channel access may be done through RRC and may be UE-specific. Each BWP may be configured with a parameter indicating whether the UE may use BWP deactivation based on channel access duration.

Alternatively, a bit in the grant to the UE may indicate if UE must do BWP deactivation based on channel access time. If the cotExpiry is not available to the UE (e.g., if the gNB does not transmit its channel occupation duration or UE did not receive it), the UE may operate under the default procedure in NR.

The UE may perform LBT on a bandwidth equal or smaller than the BWP it accesses so that it does not need to increase the Rx bandwidth for channel sensing. The minimum bandwidth for sensing may be equal to smallest Carrier Band Width (CBW) supported in NR. For example, in FR1 (frequency range—implies below 7 GHZ), for UL RACH transmission in NR-U initial access for FR1, the UE may do LBT on a band as small as 5 MHz.

Figure 22D:
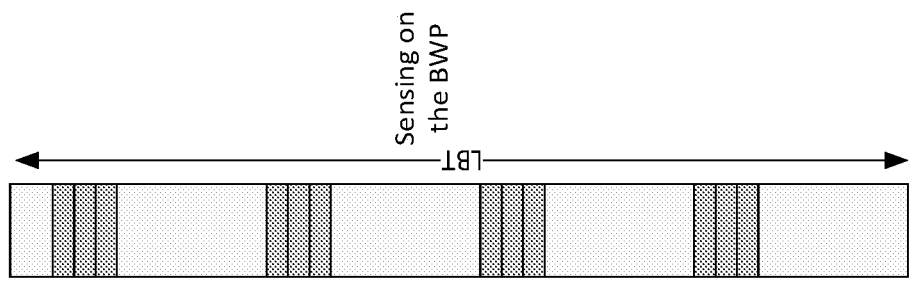
FIG. 22D exemplary illustration of Sensing on the entire BWP.
Figure 22C:
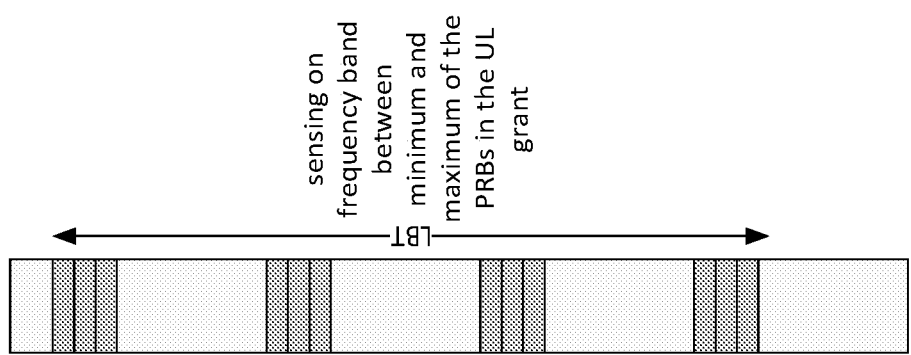
FIG. 22C exemplary illustration of Sensing in the frequency band between maximum and minimum PRBs in the grant.
Figure 22B:
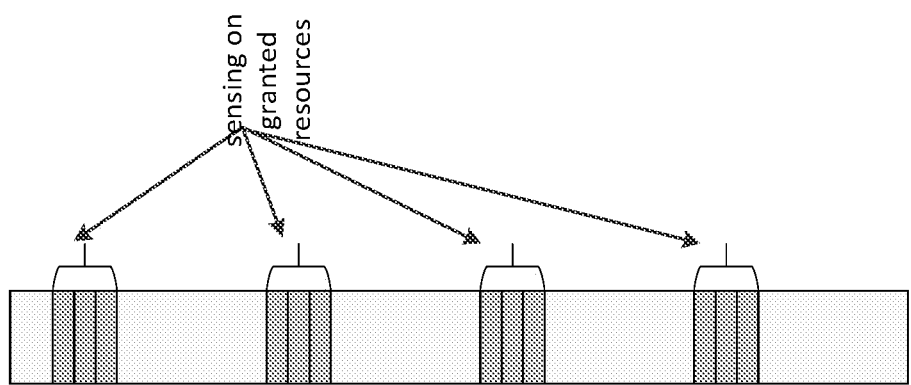
FIG. 22B exemplary illustration of Sensing on granted UL resources.
Figure 22A:
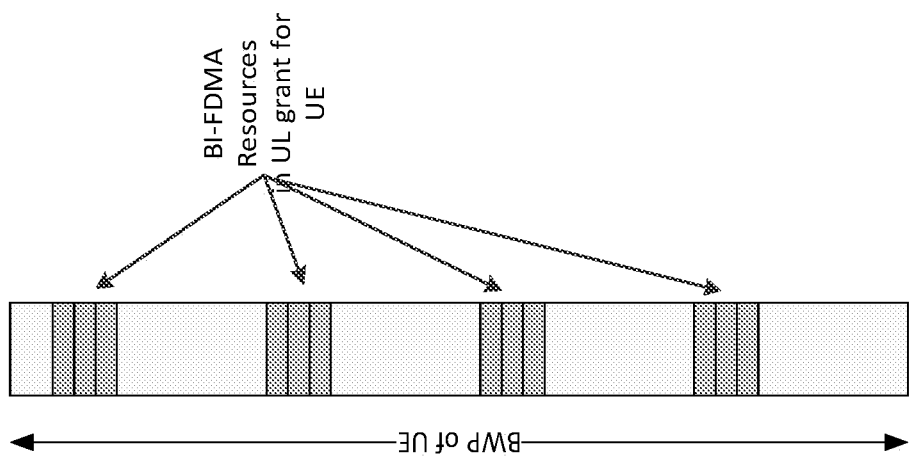
FIG. 22A exemplary illustration of UL grant to UE.

As shown in FIG. 22A, if a UE uses Block Interleaved Frequency Division Multiple Access (BIFDMA) transmission on its UL BWP such as PUCCH or PUSCH, it may perform LBT as described in the following options. In a first option, UE does LBT only on the frequency blocks for which it has a grant. In this case, the energy detection is conducted in frequency domain, e.g., after Fast Fourier Transformation (FFT) operation at the UE receiver, so that only the frequency blocks granted to UE's UL transmission are used for the energy measurement. If the energy detection (ED) exceeds a threshold, the UE may not access the channel for transmission on the UL. FIG. 22B shows this example. In a second option, UE may perform energy detection (ED) on contiguous spectrum between the lowest and highest blocks in the grant, e.g., the energy is measured in time domain after a filter with smaller bandwidth than its active UL BWP. An example is illustrated in FIG. 22C. In wideband operation, this may mean that the UE may perform channel access over the U-SCBW bands on which the PUSCH resources are provided in the grant. In a third option, UE does LBT on the entire BWP, e.g., the energy is measured in time domain after a filter with the bandwidth the same as its active UL BWP, even if its bands of operation constitute only a part of the BWP, for example, when the UE's UL grant spans only a subset of U-SCBWs in the BWP. If the ED exceeds a threshold, the UE does not access the channel. FIG. 22D illustrates this example.

With reference to the second and third option, the UE may be multiplexed with other UEs and may sense energy from the other UE. Depending on the number of UEs, multiplexed resources, the threshold may be different. The gNB may indicate the resources for channel sensing and the threshold to the UE. This information may come as part of the UL grant. In the Option 2 and Option 3 above, the UE may sense energy from the other UEs' multiplexed blocks in frequency. Depending on the number of UEs and multiplexed blocks, the threshold may be different. The gNB may indicate the channel sensing option(s) and the related threshold(s) to the UE. This information may be carried on the UL grant DCI as exemplified in Table 2.

TABLE 2

UL Grant DCI/BWP activation (DCI 0_1) Extended with LBT fields

| Field | Bits | Description |
|---|---|---|
| thresholdEnergyDetection | T (1-4 bits) | Provide the threshold for ED during CCA or LBT; The value may be an index into a table of threshold values that may be configured to the UE through higher layers |
| typeSensing | L (1-2 bits) | This indicates the type of LBT to be performed by the UE; if set to 0, UE may not perform sensing before transmitting. Other values may indicate CCA/LBT procedures like short interval sensing or priority class for CAT4 LBT |

Some of the below examples may be related to FIG. 22 (e.g., how the UE does LBT across the 20 MHz bands with respect to its allocated grant). A following example illustrates how a UE may perform LBT for a PUSCH transmission in a wideband operation. Assume that gNB acquires COT to a wideband carrier consisting of a set of T subbands $S_{gNB}=\{S_t\}$, where t=0, 1, . . . , T−1. The gNB may share this COT with the UE for either dynamic PUSCH transmission or configured grant (CG) PUSCH transmission. The UE's active BWP spans $B_{UE}$ U-SCBW $S_{BWP}=\{S_b\}$, where b=0, 1, . . . $B_{UE}$-1. The UE receives an UL grant that spans U-SCBW bands $S_{UE}=\{S_j\}$, where j=0, 1, . . . , J−1.

If an UL grant is outside the gNB's COT, the UE does a CAT4 LBT to acquire the channel in one of the following ways. In a first way, $S_{UE} \subseteq S_{BWP}$, UE performs CAT4 LBT only on bands in $S_{UE}$ in the UE's grant. This is shown in FIG. 44A. In a second way, $S_{UE} \subseteq S_{BWP}$, UE performs LBT on bands in $S_{BWP}$ in the UE's grant. This is shown in FIG. 44B. Note that the BWP may not fully span an integer number G of U-SCBWs. In this case, the node performs LBT over the entire U-SCBWs if it includes at least some BWP resources.

Figures 45A, 45B:
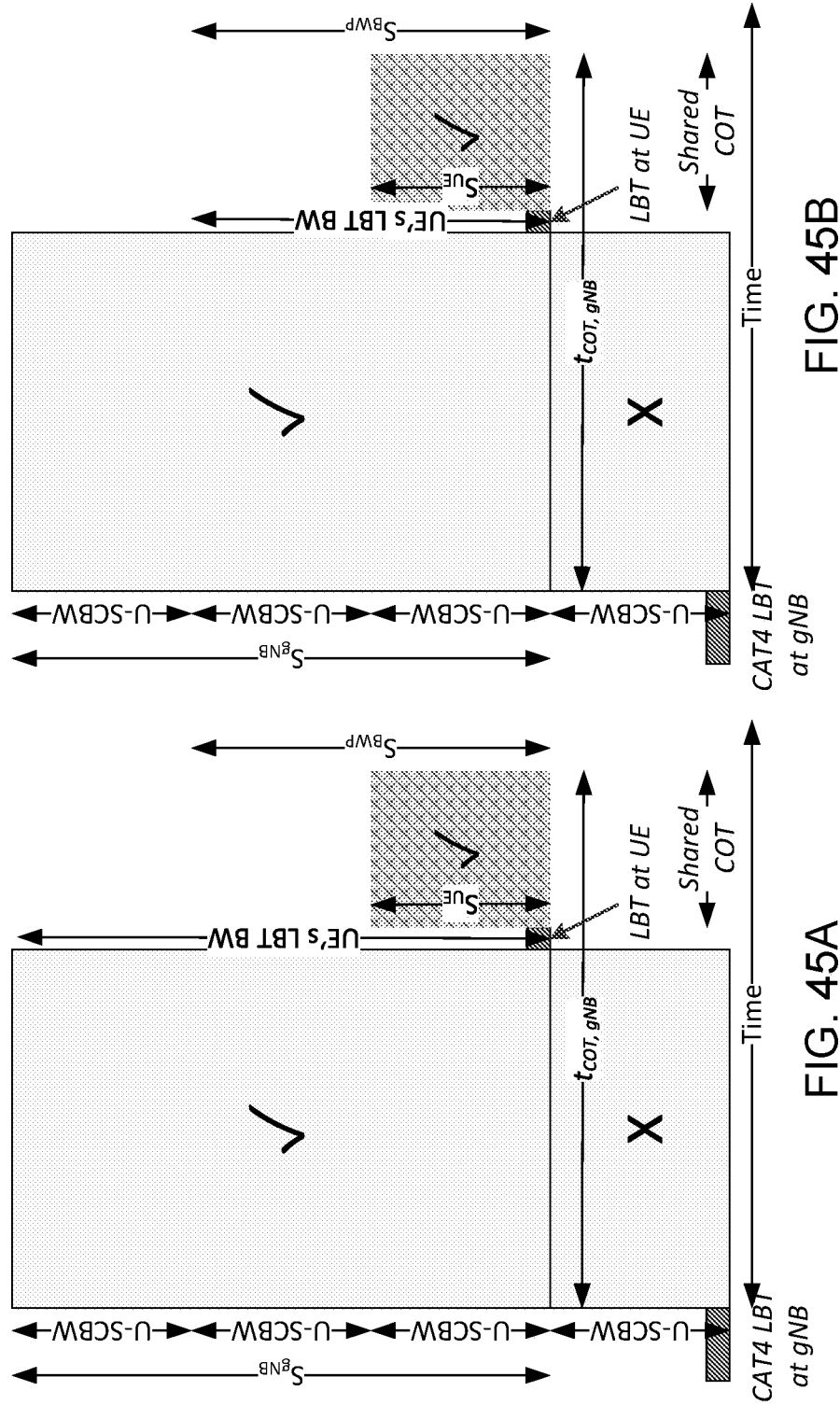
FIG. 45A illustrates an example in which UE performs CAT2 LBT in gNB acquired COT when its BWP is less than or equal to bandwidth of gNB acquired COT—UE performs LBT on U-SCBWs corresponding to gNB acquired COT.
FIG. 45B illustrates an example in which UE performs CAT2 LBT in gNB acquired COT when its BWP is less than or equal to bandwidth of gNB acquired COT—UE performs LBT on U-SCBWs spanning its active BWP.
Figure 45C:
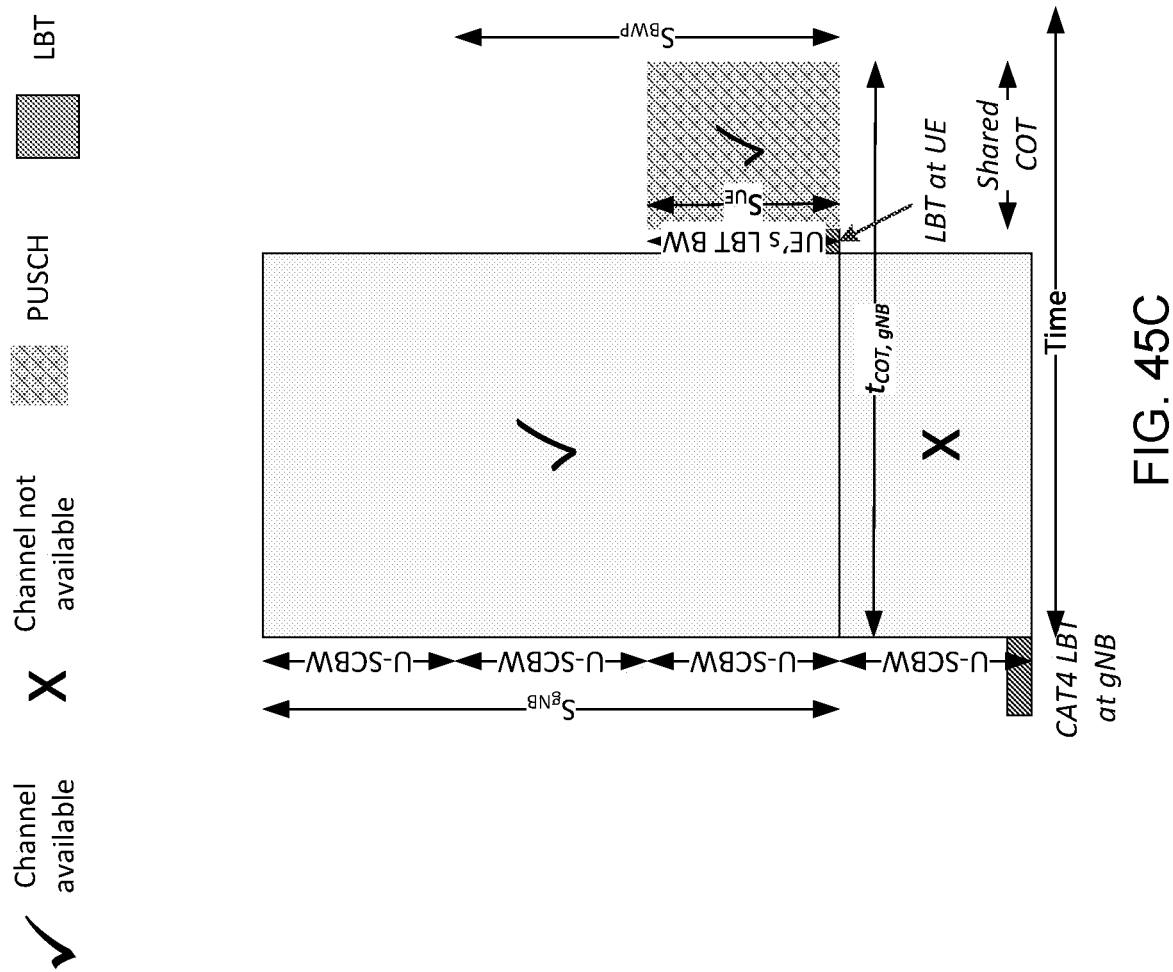
FIG. 45C illustrates an example in which UE performs CAT2 LBT in gNB acquired COT when its BWP is less than or equal to bandwidth of gNB acquired COT—UE performs LBT on U-SCBWs spanning its UL grant.

For the case of gNB acquired COT sharing with the UE, the following scenarios are possible and are illustrated in FIG. 45A-FIG. 47. In a first scenario, bandwidth of the set $S_{gNB}$ may cover the UE's BWP. It may also exceed the UE's active BWP. In this case, to access the shared-COT, the UE performs CAT2 LBT in one of the following ways. In a first way, $S_{BWP} \subseteq S_{gNB}$, UE performs LBT on $S_{gNB}$. This is shown in FIG. 45A. In a second way, $S_{BWP} \subseteq S_{gNB}$, UE performs LBT on bands including $S_{BWP}$ in the UE's BWP. This is shown in FIG. 45B. In a third way, $S_{UE} \subseteq S_{BWP}$, UE performs LBT only on U-SCBW bands including $S_{UE}$ in the UE's grant. This is shown in FIG. 45C.

Figure 46A:
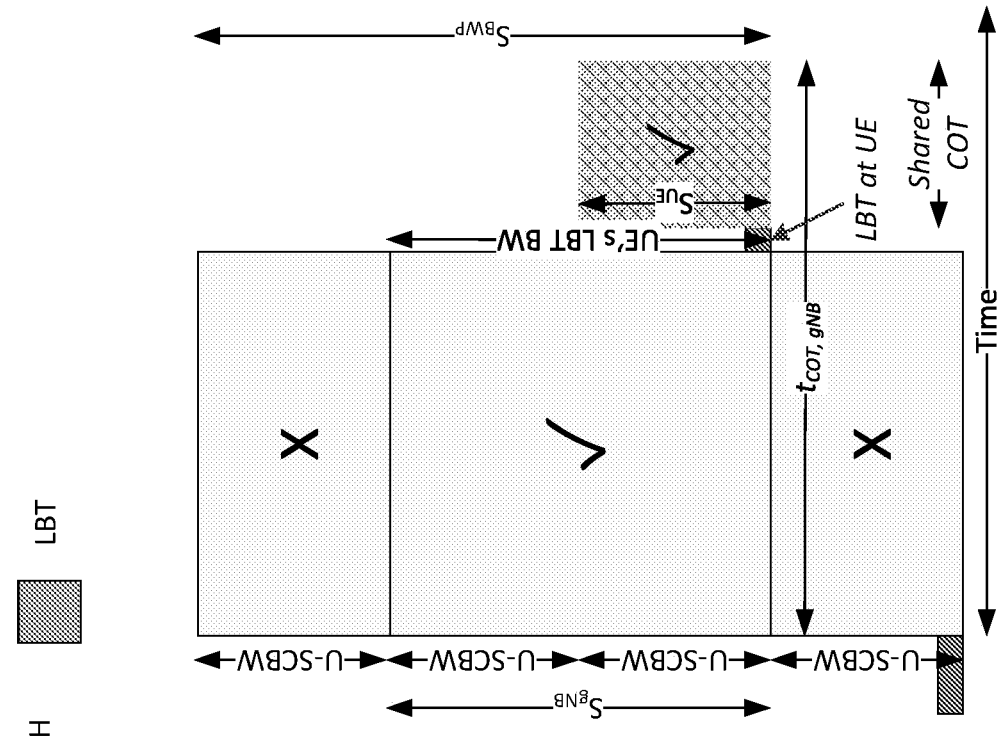
FIG. 46A illustrates an example in which UE performs CAT2 LBT in gNB acquired COT when its BWP is greater than the bandwidth of gNB acquired COT—UE performs LBT on U-SCBWs spanning its active BWP.
Figure 46B:
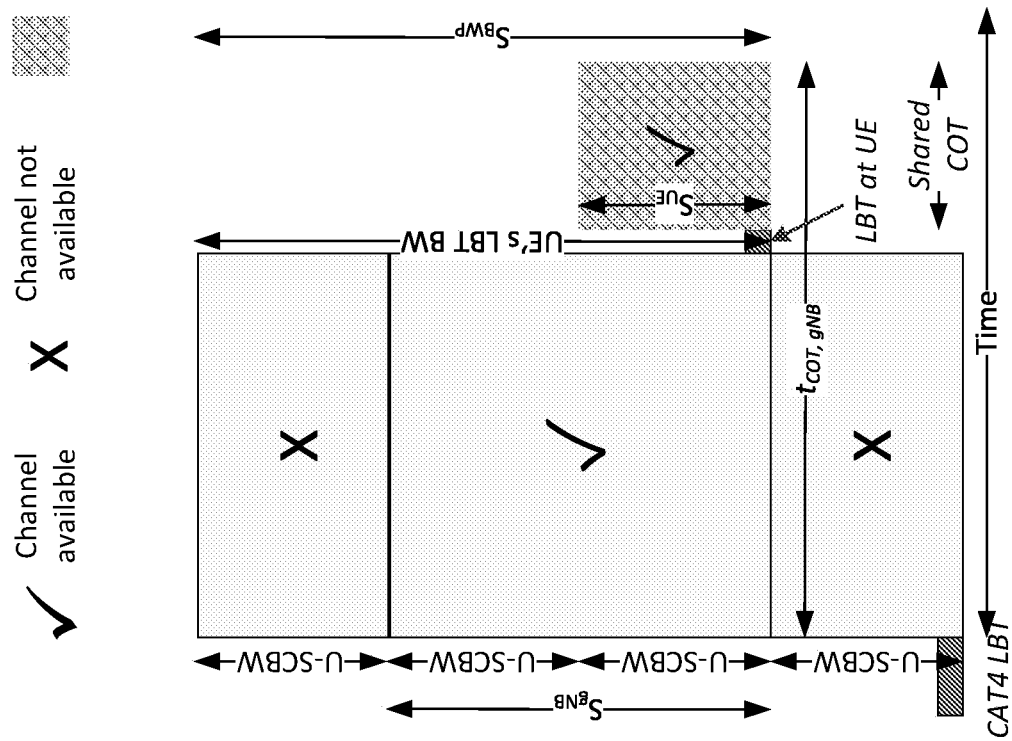
FIG. 46B illustrates an example in which UE performs CAT2 LBT in gNB acquired COT when its BWP is greater than the bandwidth of gNB acquired COT—UE performs LBT on U-SCBWs corresponding to gNB acquired COT.
Figure 46C:
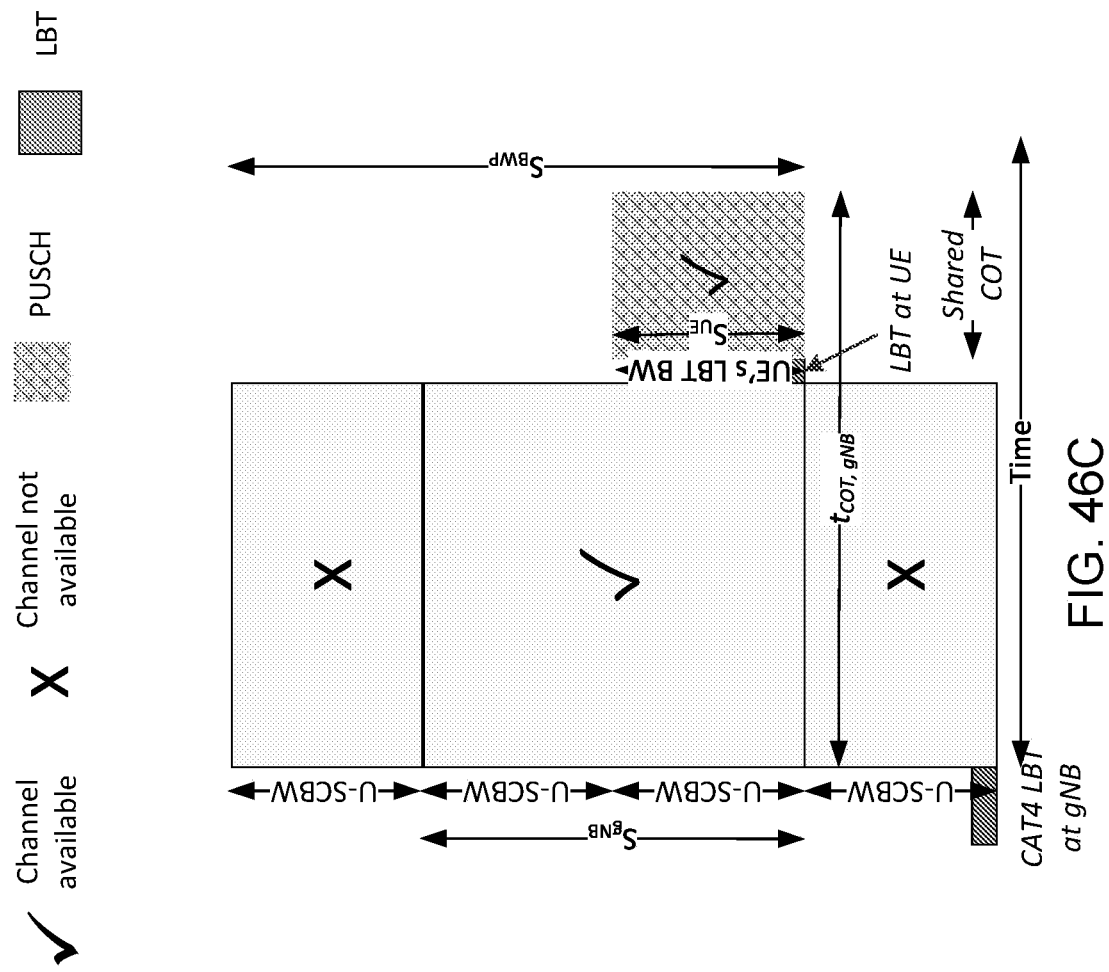
FIG. 46C illustrates an example in which UE performs CAT2 LBT in gNB acquired COT when its BWP is greater than the bandwidth of gNB acquired COT—UE performs LBT on U-SCBWs spanning its UL grant.

In a second scenario, bandwidth of the set $S_{gNB}$ does not span the UE's entire active BWP. In this case, to access the shared-COT, the UE performs CAT2 LBT in one of the following ways when $S_{UE} \subseteq S_{gNB}$, e.g., the UE's granted resources are within the gNB's COT bandwidth. In a first way, UE performs LBT on all U-SCBWs including the $S_{BWP}$ resources. This is shown in FIG. 46A. In a second way, UE performs LBT on all the U-SCBWs in $S_{gNB}$. This is shown in FIG. 46B. In a third way, UE performs LBT only on U-SCBW including $S_{UE}$ in the UE's grant. This is shown in FIG. 46C.

Figure 47:
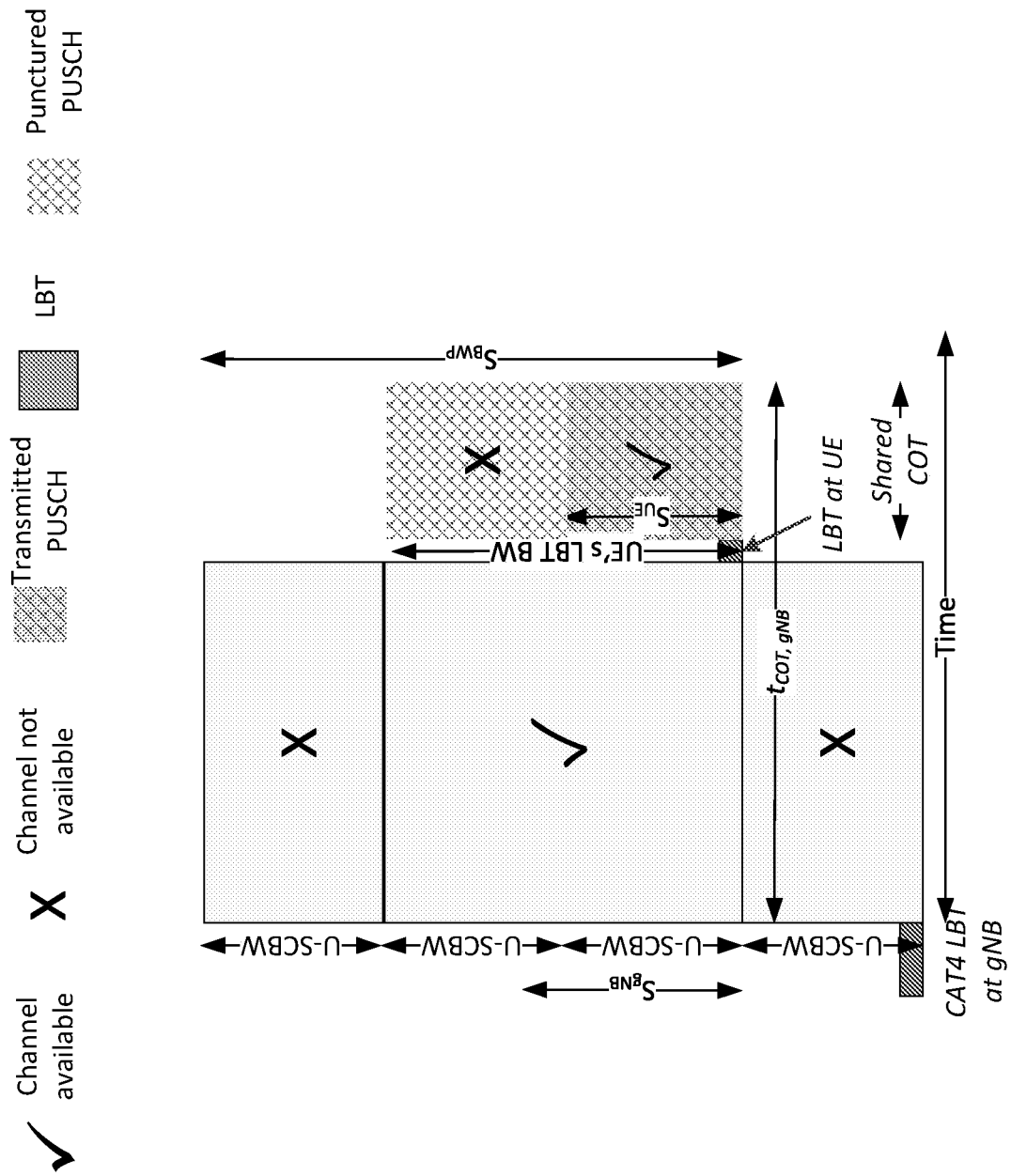
FIG. 47 illustrates an example in which UE punctures PUSCH in shared COT when its grant resources exceed bandwidth of gNB's COT.

In a third scenario, in the case where $S_{UE} \not\subset S_{gNB}$, e.g., the UE's granted resources are not within the subbands of the gNB's channel access (this can happen in the case of CG PUSCH where the resources exceed the bandwidth of the gNB's current COT), then the UE may act on the grant in one of the following ways. In a first way, UE does not transmit the grant. In a second way, UE docs CAT2 LBT on U-SCBW including $S_{gNB}$ and transmits its PUSCH by puncturing or rate matching to the granted resources within $S_{gNB}$ to ensure that the channel is occupied and not lost to another node. This is shown in FIG. 47 where the UE can access the channel only on one U-SCBW while its CG PUSCH resources span two U-SCBWs. As gNB has access only to one band, the UE transmits on that band on successful CAT2 LBT but does not transmit on the other U-SCBW band on the gNB does not have COT.

Figure 52A:
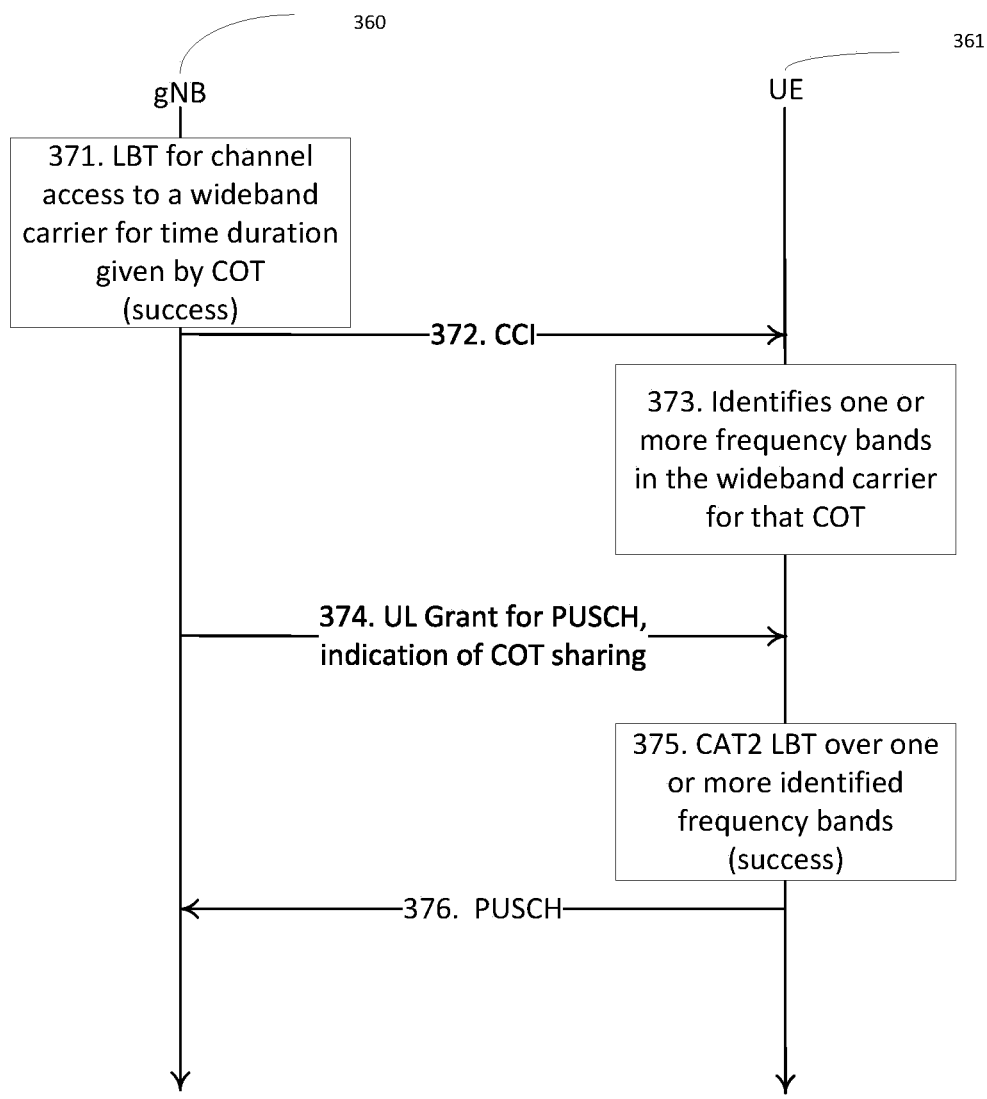
FIG. 52A illustrates an exemplary UE LBT when UE shares gNB-acquired COT. UE performs CAT2 LBT in certain frequency bands which may correspond to the UE's BWP, or UE's grant resources, or gNB's composite carrier BW—Signaling between gNB and UE.
Figure 52B:
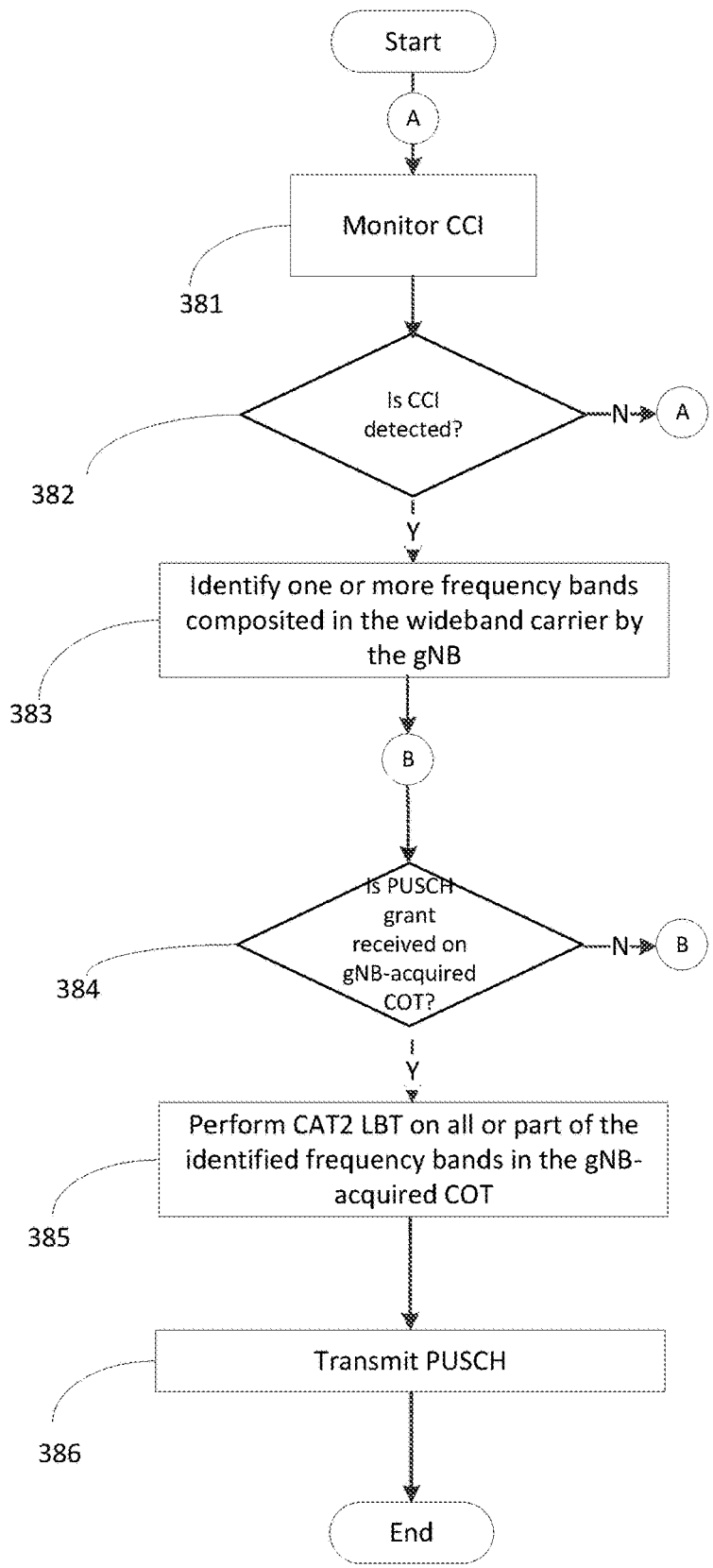
FIG. 52B illustrates an exemplary UE LBT when UE shares gNB-acquired COT. UE performs CAT2 LBT in certain frequency bands which may correspond to the UE's BWP, or UE's grant resources, or gNB's composite carrier BW—UE procedure.

FIG. 52A shows the signaling for enabling gNB-acquired COT sharing with the UE 361 for a composited carrier. At step 371, the gNB 360 obtains channel access for certain duration (COT) across a composite carrier consisting of one or more U-SCBW bands. At step 372, gNB 360 sends a CCI to the UE 361. The UE 361 identifies as least one U-SCBW band in the gNB's COT at step 373. Subsequently, at step 374, the UE 361 receives an UL grant within the gNB's COT. The UE 361 performs CAT2 LBT over $S_{BWP}$ or $S_{UE}$ Or $S_{gNB}$ in step 375 and transmits, at step 376, the PUSCH if the LBT is successful. FIG. 52B shows the UE procedure for sharing the gNB-acquired COT. The UE 361 monitors the CCI (at step 381) and on detecting it (at step 382), identifies, at step 383, at least one of the frequency bands in the composite carrier in that COT. If the UE 361 receives an UL grant in that COT (at step 384), it performs CAT2 LBT (at step 385) and transmits the PUSCH (at step 386).

If the UE 361 has multiple CGs from which it can autonomously select one CG for PUSCH transmission within the gNB-acquired COT, it may do the following. If the UE 361 has at least one CG with resources within $S_{gNB}$, the UE 361 may transmit using that CG on the gNB-acquired COT. If the UE 361 has more than one CG with resource confined to $S_{gNB}$, the UE 361 may select an appropriate CG to transmit PUSCH on the gNB-acquired COT. The UE 361 autonomously selects the CG depending on the type of traffic, latency requirements, priority, etc. The gNB 360 identifies the autonomously selected CG from its DMRS.

Figures 48A, 48B:
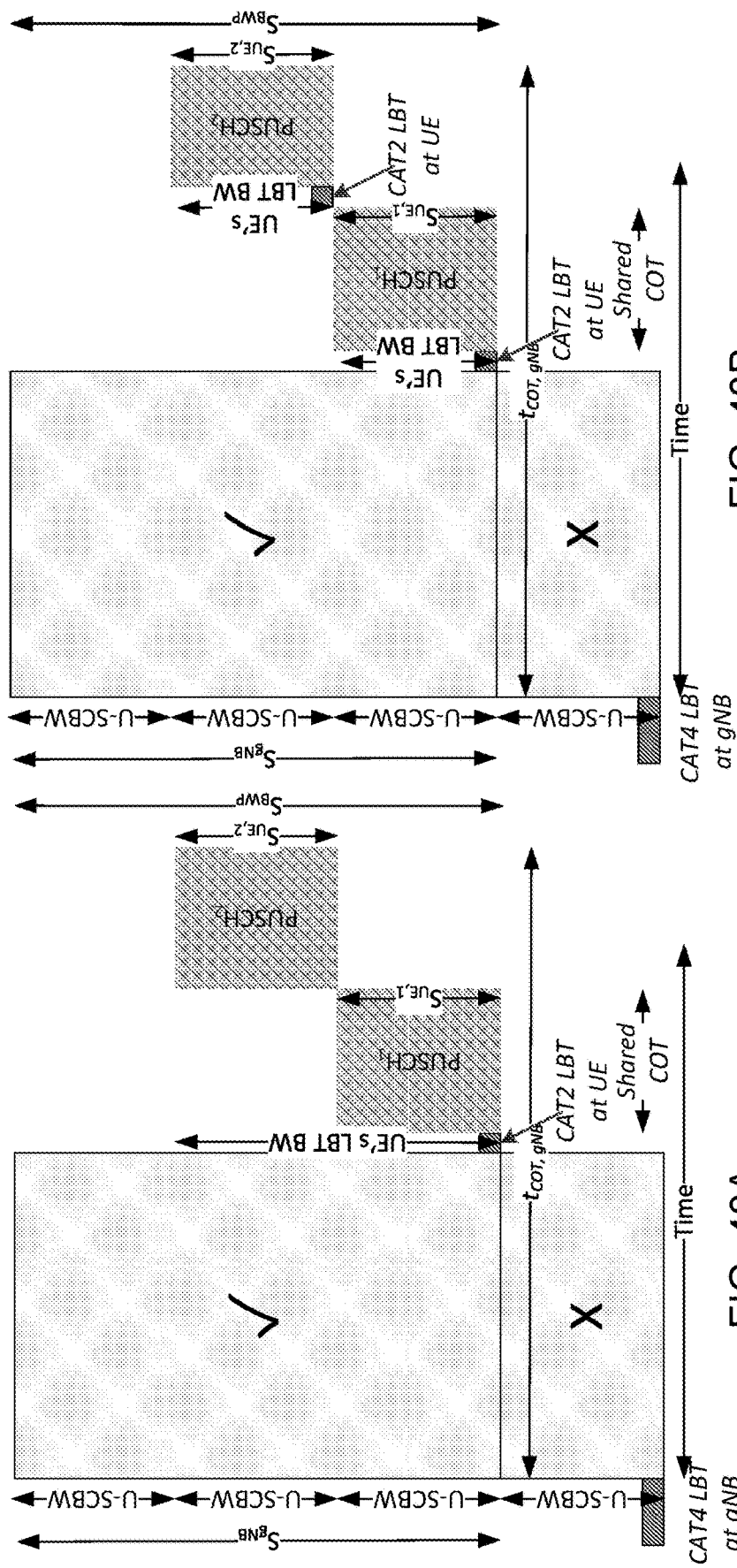
FIG. 48A illustrates an example UE LBT procedure when successive PUSCH resources are different in frequency—LBT across union of PUSCH resources.
FIG. 48B illustrates an example UE LBT procedure when successive PUSCH resources are different in frequency—Separate LBT for each PUSCH if frequency resource in band not included in previous PUSCH.

If a UE 361 receives multiple PUSCH grants in a shared COT where the PUSCH grants span different number of U-SCBWs as shown in FIG. 48A, the UE 361 uses the total set of PUSCH frequency resources across the multiple grants to determine the LBT bandwidth if it is based on $S_{UE}$. In this example, the UE 361 receives grants for $PUSCH_1$ on $S_{UE,1}$ consisting of one U-SCBW and $PUSCH_2$ on $S_{UE,2}$ consisting of another U-SCBWs. The LBT bandwidth is the union of the PUSCH frequency resources for $PUSCH_1$ and $PUSCH_2$ Alternatively, the UE 361 may do separate LBTs prior to each PUSCH if the U-SCBW of a latter PUSCH are not included within the U-SCBW bands of the former PUSCH. In the example in FIG. 48B, the UE 361 docs CAT2 LBT prior to $PUSCH_1$ and between $PUSCH_1$ and $PUSCH_2$. In doing so, the UE 361 may either puncture the last symbol of PUSCH1 or the first symbol of $PUSCH_2$.

Figure 48C:
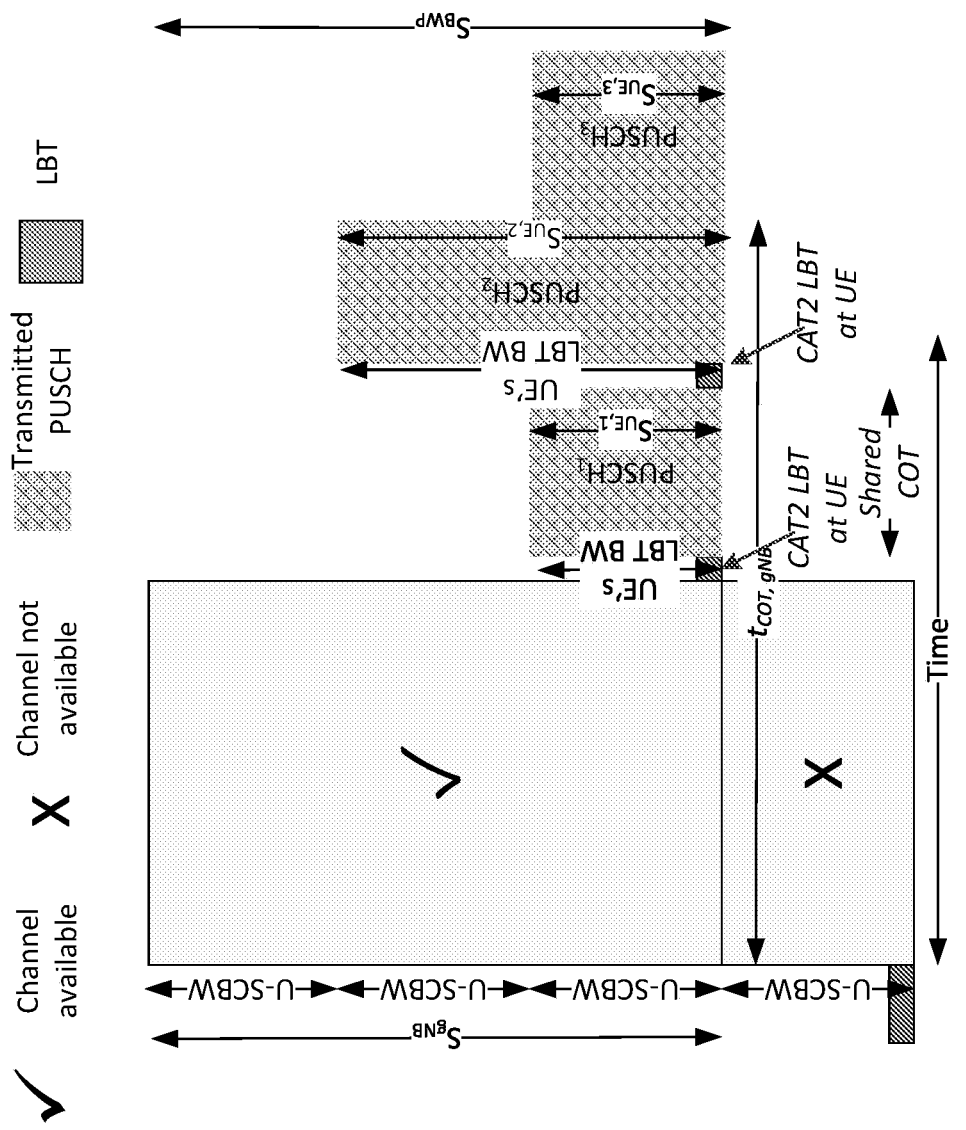
FIG. 48C illustrates an example UE LBT procedure when successive PUSCH resources are different in frequency—LBT across bands of PUSCH2, no LBT prior to PUSCH3.

In FIG. 48C, the U-SCBW bands of $PUSCH_2$ include the bands of $PUSCH_1$ and an additional U-SCBW band. In this case, the UE 361 performs CAT2 LBT over $S_{UE,1}$ to transmit $PUSCH_1$ and then CAT2 LBT over $S_{UE,2}$ to transmit PUSCH2. It does LBT over the bands of $PUSCH_1$ as the gap between $PUSCH_1$ and $PUSCH_2$ due to the need for CCA prior to the additional U-SCBW is long. $PUSCH_3$ is transmitted but is included within the bands of $PUSCH_2$ and therefore no CCA is required between $PUSCH_2$ and $PUSCH_3$.

Figure 48D:
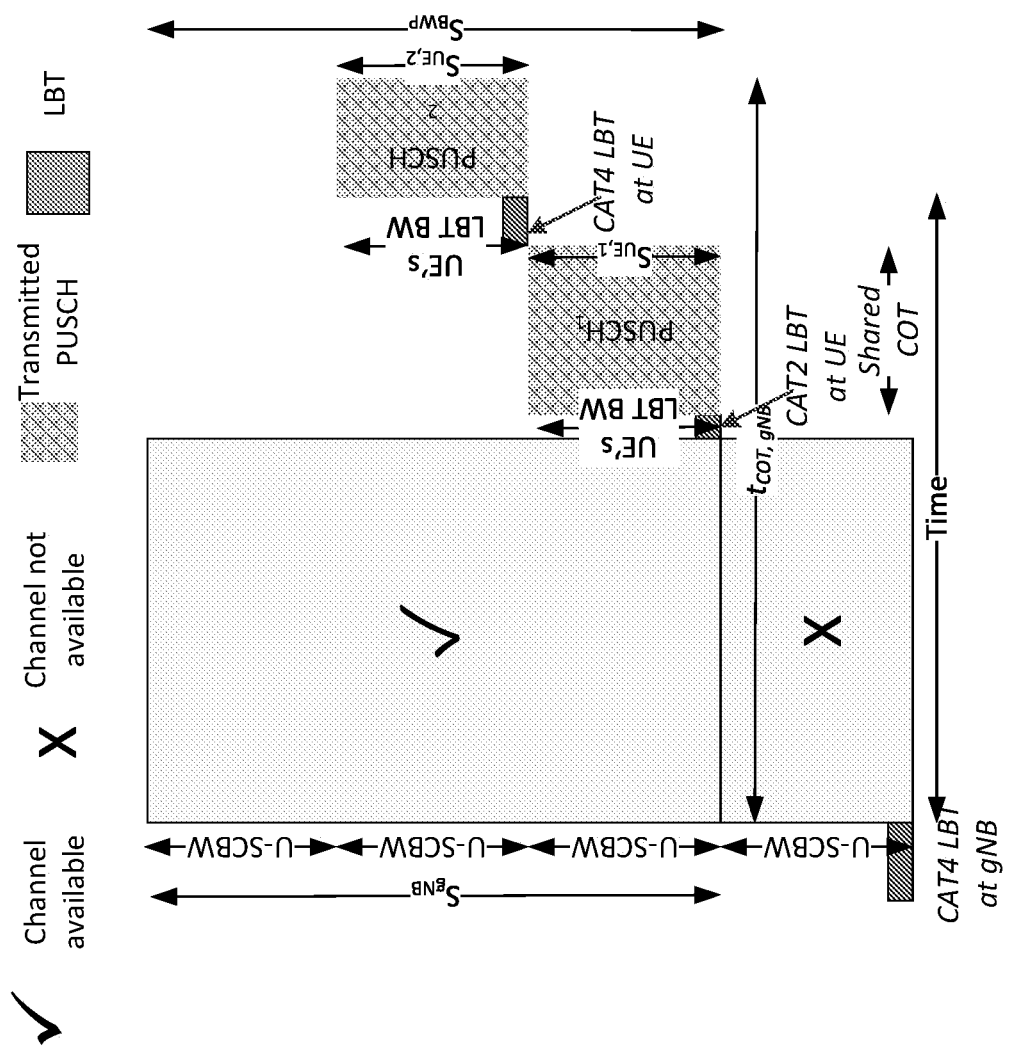
FIG. 48D illustrates an example UE LBT procedure when successive PUSCH resources are different in frequency—CAT4 LBT prior to PUSCH2 due to large gap between DL and UL.

The following procedure may be supported. The UE 361 may do a CAT2 LBT for $PUSCH_2$ as shown in the example in FIG. 48C only if it had obtained the channel for at least one or more bands included in $PUSCH_2$, e.g., there is overlap between PUSCH1 and $PUSCH_2$ frequency resources. In this case, UE 361 already had channel access to the bands of $PUSCH_1$. If this is not the case, the UE 361 may do only CAT4 LBT to access the channel for $PUSCH_2$ as shown in FIG. 48D.

Figure 53A:
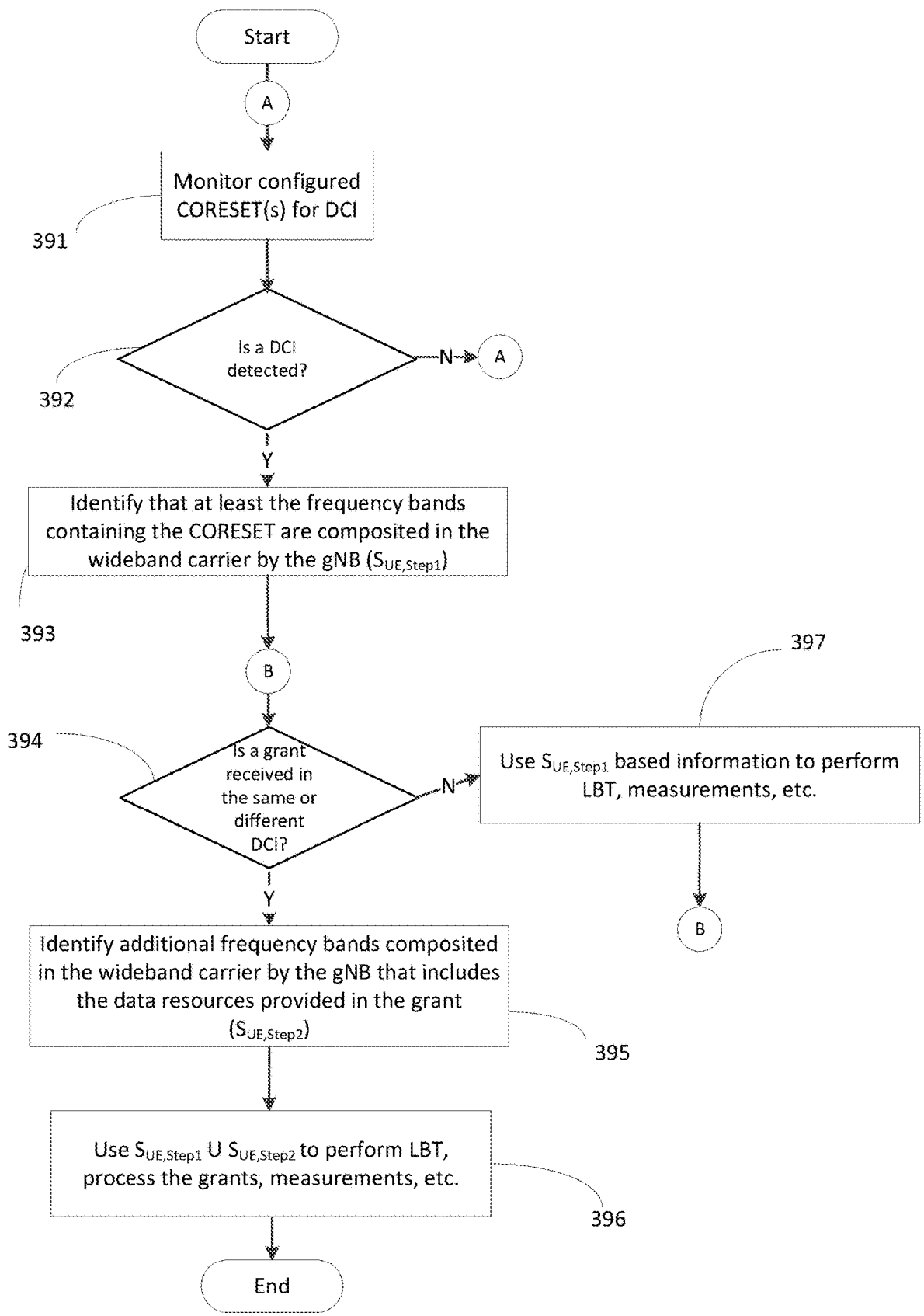
FIG. 53A illustrates an exemplary UE Procedure for detecting frequency bands in the composited carrier—Detection through a 2-step process.

Thus the UE 361 may determine the entire $S_{gNB}$ or a subset of it through a single step or through more than one step. Using this information, the UE 361 determines its LBT bandwidth according to a configured rule that may be provided through RRC signaling or through a dynamic indication obtained through one of the following ways. In a first way, through a DCI in a common search space or UE-specific search space. The procedure is shown in FIG. 53A. Here, the UE 361 may monitor its configured CORE-SETs at step 391. On successfully decoding a DCI that may be a broadcast or groupcast or UE-specific DCI (at step 392), the UE 361 identifies, at step 393, that its gNB 360 is transmitting and at least the U-SCBWs including the CORE-SET in which the DCI was detected are within the gNB's COT. In step 397 step-1, the UE 361 may identify a set of composited U-SCBWs denoted as $S_{UE,Step1}$. If that DCI or another DCI provides the UE 361 a DL grant within that COT, the UE 361 may infer that the gNB's COT bandwidth includes at least the U-SCBWs including those PDSCH resources. Similarly, if that DCI provides the UE 361 an UL grant within that COT, the UE 361 may infer that the gNB's COT bandwidth includes at least the U-SCBWs including those PUSCH resources. The UE 361 identifies $S_{UE,Step2}$ in this second step step-2 (step 395). Thus the DCI behaves like an implicit CCI. At step 396, if a UE 361 must perform LBT or measurements or process a grant, it uses the information from Step-1 (step 397) and Step-2 (step 395), e.g., the union $S_{UE,Step1} \cup S_{UE,Step2}$, to determine the BW of signals to be processed. If Step-2 (step 395) information is not available, the UE 361 is expected to perform its operations using the outcome of step-1 (step 397). Note that $S_{UE,Step1} \cup S_{UE,Step2}$ may equal $S_{UE}$, $S_{BWP}$, $S_{gNB}$.

The rules for the PUSCH transmission method (such as whether or not to puncture PUSCH) may be configured to the UE 361 through RRC signaling.

Figure 53B:
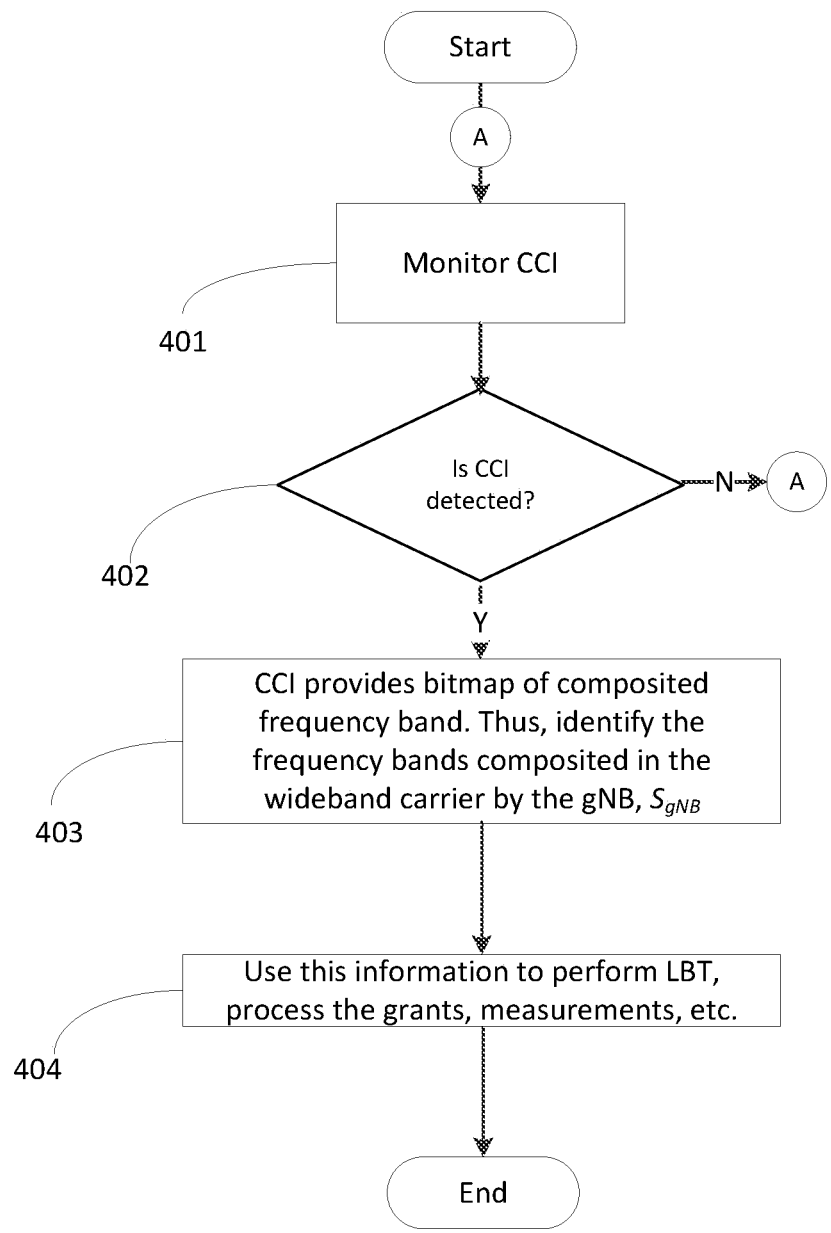
FIG. 53B illustrates an exemplary UE Procedure for detecting frequency bands in the composited carrier—Detection through a single step.

In a second way, as shown in the procedure in FIG. 53B, the CCI may indicate that at least the current U-SCBW(s) (on which the receiver receives the CCI) is in the gNB's COT. The CCI may indicate at step 403, a subset or all the U-SCBWs in the gNB's COT explicitly, for example, through a bitmap. The CCI itself may be in the form of a DCI. On receiving the CCI (step 401, step 402), the UE 361, at step 404, has enough knowledge of the composite carrier to process signals of its interest. Note that this may not comprise the full knowledge of all the composited frequency bands in the wideband carrier.

Figure 53C:
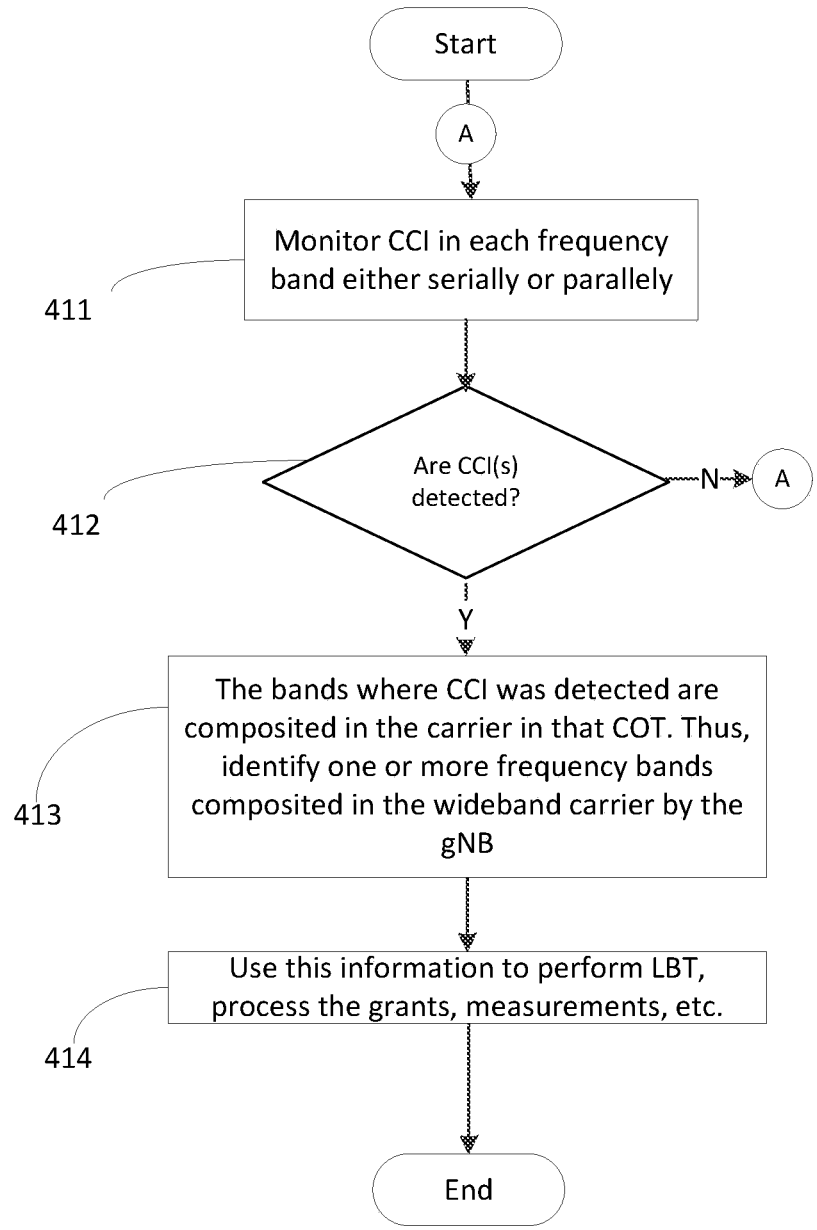
FIG. 53C illustrates an exemplary UE Procedure for detecting frequency bands in the composited carrier—Detect a CCI in each frequency band.

In a third way, as shown in the procedure in FIG. 53C, the UE 361 may determine if a U-SCBW in the gNB's COT by detecting a CCI (step 411 and step 412) in that U-SCBW. If multiple U-SCBWs are composited in the carrier, the UE 361 may detect one CCI in each of the composited U-SCBWs (step 413). The number of U-SCBWs to be monitored is configured to the UE 361 through RRC signaling. For example, the CCI may be in the form of DMRS. The UE 361 may sequentially monitor the possible U-SCBWs to detect the DMRS(s). If it detects the DMRS, it identifies that U-SCBW as part of the COT and uses that information to process its signals within that COT (step 414).

In the interest of power savings, a UE 361 may monitor a narrow BWP such as a default for the DCI or CCI. The DCI or CCI may explicitly indicate the LBT bandwidth for that COT through a field or implicitly (without additional signaling or fields) through grants. If UE 361 has received indication of as $S_{gNB}$ explicitly, it may use an LBT bandwidth corresponding to U-SCBWs covering $S_{gNB}$. If it has no explicit knowledge of $S_{gNB}$, it may use LBT bandwidth corresponding to $S_{BWP}$ or $S_{UE}$ (if a grant is available).

Figure 49A:
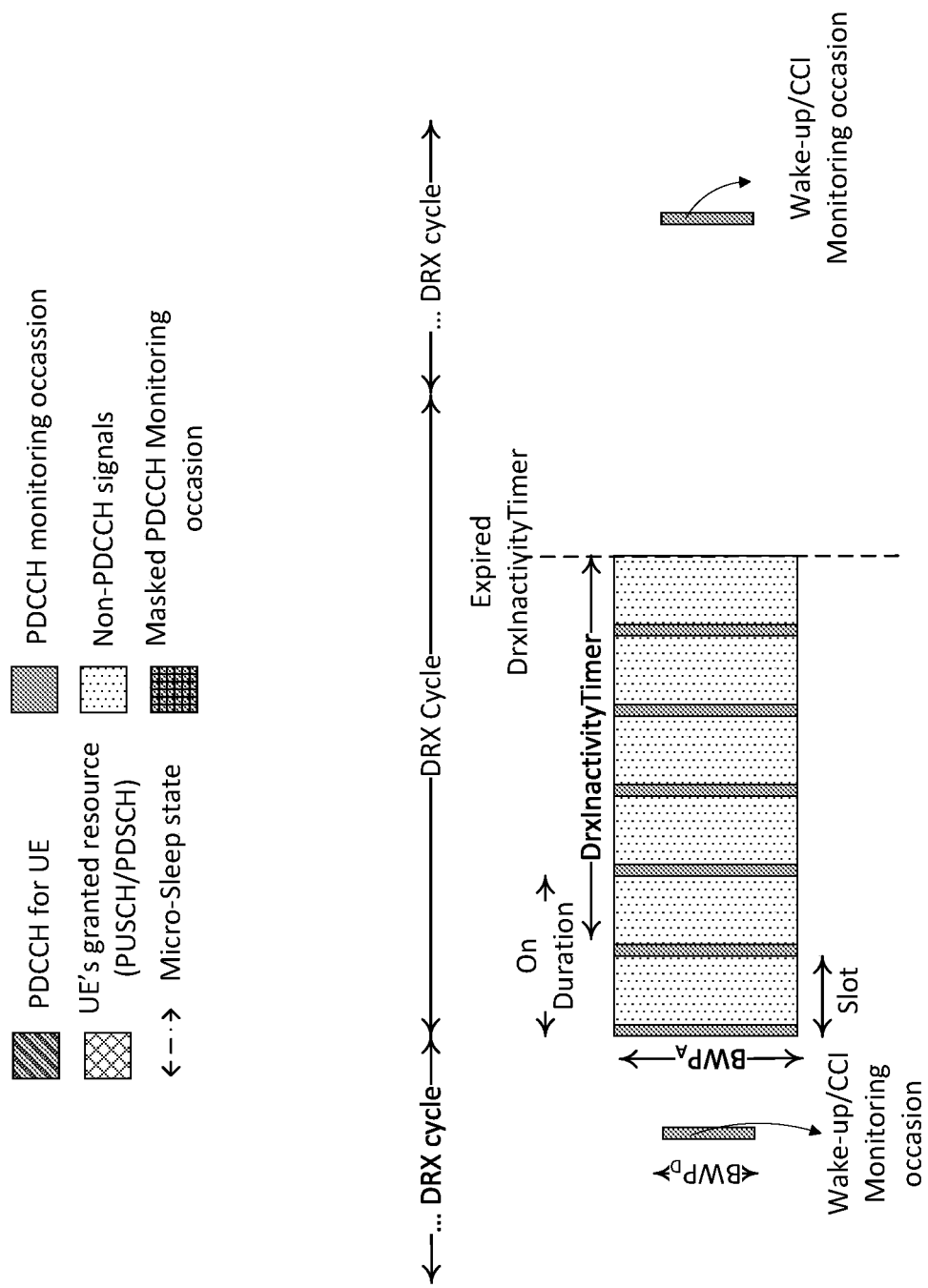
FIG. 49A illustrates an example for CCI monitoring with respect to the DRX cycle—CCI is received prior to the DRX OnDuration.

A wake-up signal may be used for power savings for the NR-U UE 361. The wake-up signal may indicate if a UE 361 must wake up to monitor gNB's transmissions or can remain asleep for a certain time duration. The wake-up signal may act as the CCI and may provide information about $S_{gNB}$ or a subset of $S_{gNB}$. The wake-up signal may be transmitted outside the discontinuous reception (DRX) ON cycle and a UE 361 may monitor it on its default BWP, $BWP_D$, which may be confined to a portion of a U-SCBW to keep the processed BW small for power savings. An example is shown in FIG. 49A. On receiving a wake-up signal or CCI, the UE 361 wakes up on its active BWP, $BWP_A$, in the DRX ON cycle. The bands of $BWP_A$ are determined from the CCI.

Figure 49B:
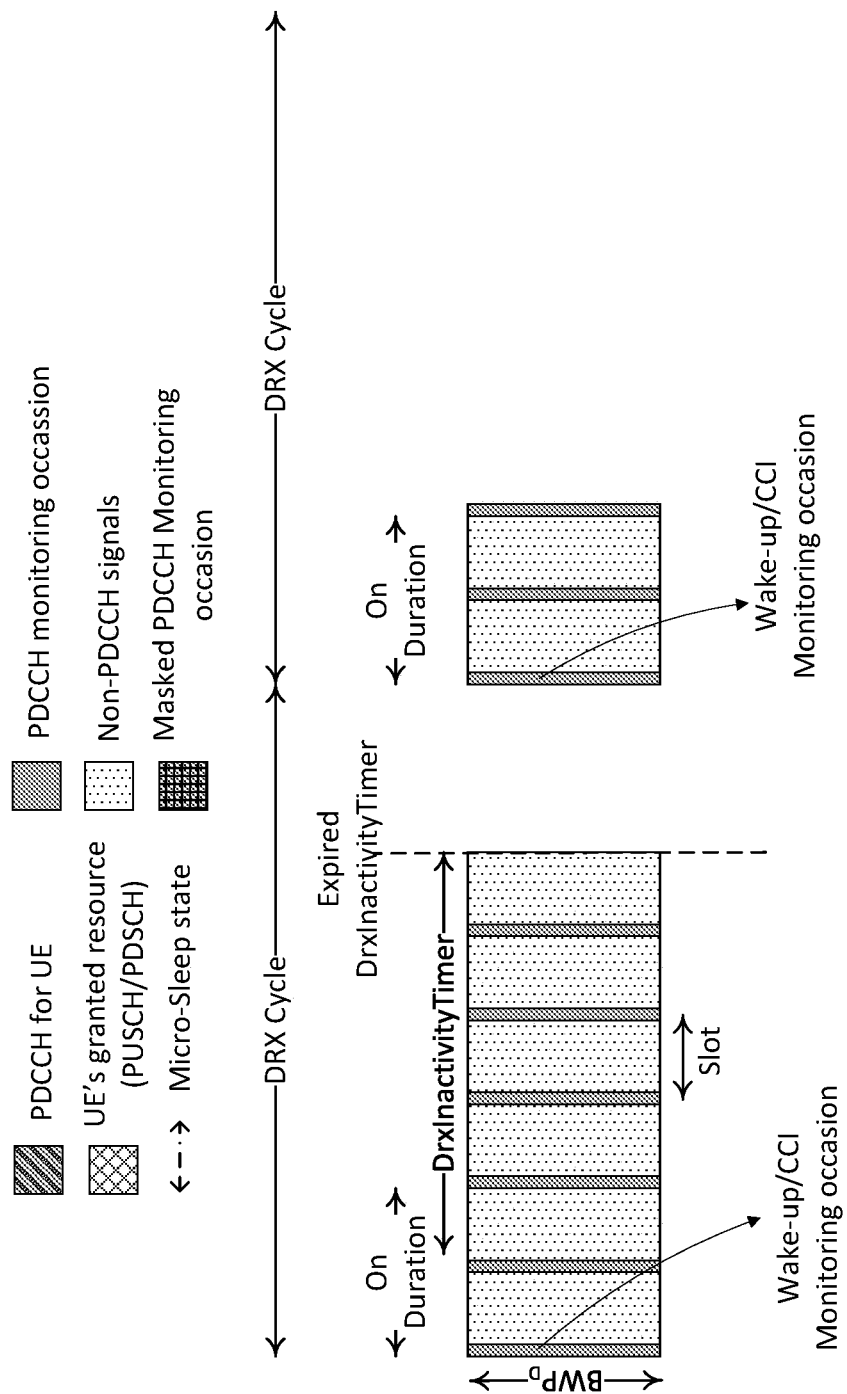
FIG. 49B illustrates an example for CCI monitoring with respect to the DRX cycle—CCI is received during the OnDuration.

Alternatively, the UE 361 may monitor the wake-up signal in its DRX ON duration as shown in FIG. 49B, which may occur on its default BWP ($BWP_D$) or active BWP ($BWP_A$).

If the UE 361 receives the wake-up signal indicating it to wake up, it will monitor PDCCH during its DRX ON duration. If it receives the wake-up signal which indicates that it may sleep, the UE 361 will not monitor during one or more following DRX cycles. If it does not receive the wake-up signal, it continues to monitor for the wake-up considering that the wake-up signal serves as a CCI indicating that the gNB 360 has obtained channel access. The wake-up signal may be transmitted by the gNB 360 as a UE-specific DCI or a group common DCI. Alternatively, a preamble or RS may be used as a wake-up signal. The UE 361 is configured through RRC to monitor the wake-up signal at certain periodicity.

Disclosed below is how synchronization signals may be transmitted in a wideband carrier. The methods below may be further considerations for how SSBs may be assigned in a wideband carrier.

When a node such as the gNB 360 composites the channels into a wideband composite carrier, it may handle the transmission of the SSB or DRS in the following ways. One or more raster points in frequency may be predefined for the cell defining SSB/DRS per U-SCBW. The gNB 360 would transmit the SSB/DRS on one or more raster points within its composite carrier. The gNB 360 may perform CAT2 LBT access for transmitting high priority SSB/DRS in the following ways. As only high priority transmission may follow CAT2 LBT, but OCB requirements must still be fulfilled, channel blocking should be avoided for fair coexistence with other nodes. In a first way, gNB 360 may perform CAT2 LBT over multiple U-SCBWs at a time and transmit the SBB/DRS on multiple raster points over the composite band with the COT. This is shown in FIG. 50A. In a second way, gNB 360 may perform CAT2 LBT on one or more U-SCBWs but transmit SBB/DRS on a single raster point in the COT. This may avoid blocking the entire wideband carrier at the same time. If the CAT2 LBT is successful on multiple U-SCBWs bands, the gNB 360 may select one raster point in one of the following options. In a first way, the raster point to be used is known a priori for the configuration of the composite carrier. For example, the raster point carrying the SSB/DRS may be the lowest raster point within that composite carrier. This raster point location may be predefined in the spec or configured to the UE 361 through RRC signaling or indicated by the PCell. This is shown in FIG. 50B. In a second option, the gNB 360 may dynamically select the raster point on which it transmits the SSB/DRS.

Figures 50C, 50D:
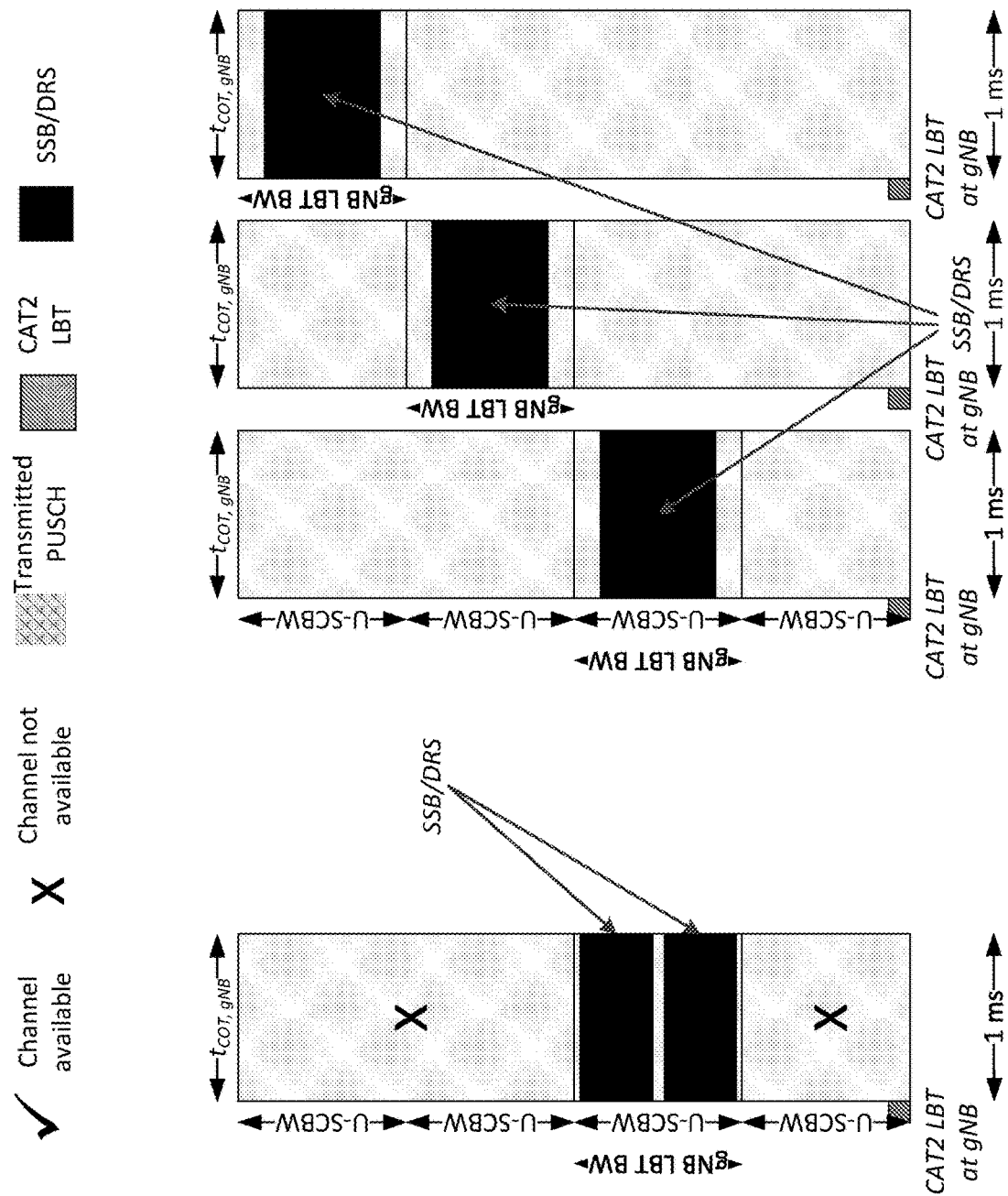
FIG. 50C illustrates an example for SSB/DRS transmission following CAT2 LBT—SSB/DRS repetition within U-SCBW for OCB requirement.
FIG. 50D illustrates an example for SSB/DRS transmission following CAT2 LBT—Staggered transmission opportunity of SSB/DRS across different U-SCBW.

In third way, gNB 360 may perform CAT2 LBT only over single U-SCBW and transmit the SSB/DRS along with signals satisfying the OCB requirements for the frequency band. Within a single U-SCBW band, SSB/DRS could be repeated in frequency to fulfil OCB requirements and provide more robustness for discovery, synchronization and measurements. This is shown in FIG. 50C. In a fourth way, raster points may be staggered in time across the U-SCBW bands. Consider that there is one raster point for each U-SCBW. The gNB 360 obtains CAT2 access to the channel separately for each U-SCBW as shown in FIG. 50D. The relative shift of DRS between the U-SCBW bands may be predefined or configured to the UE 361 through RRC signaling or indicated via the PCell. Using the knowledge of the shift and the periodicity of the DRS, the UE 361 can detect the DRS signaling on each U-SCBW band.

Disclosed below are methods by which a UE 361 may use the CCI to perform measurements and reporting in wideband operation. Some of the following contents may be a consideration of application of CCI to CSI measurements or reporting.

If UE 361 must perform measurements, it should know the bandwidth of the gNB's COT so that it can know with certainty that corresponding RS (such as CSI-RS, DMRS, SSB) are available. If UE 361 has knowledge of $S_{UE,Step1} \subseteq S_{Gnb}$, then, UE may perform measurements based only on $S_{UE,Step1}$.

Figure 54:
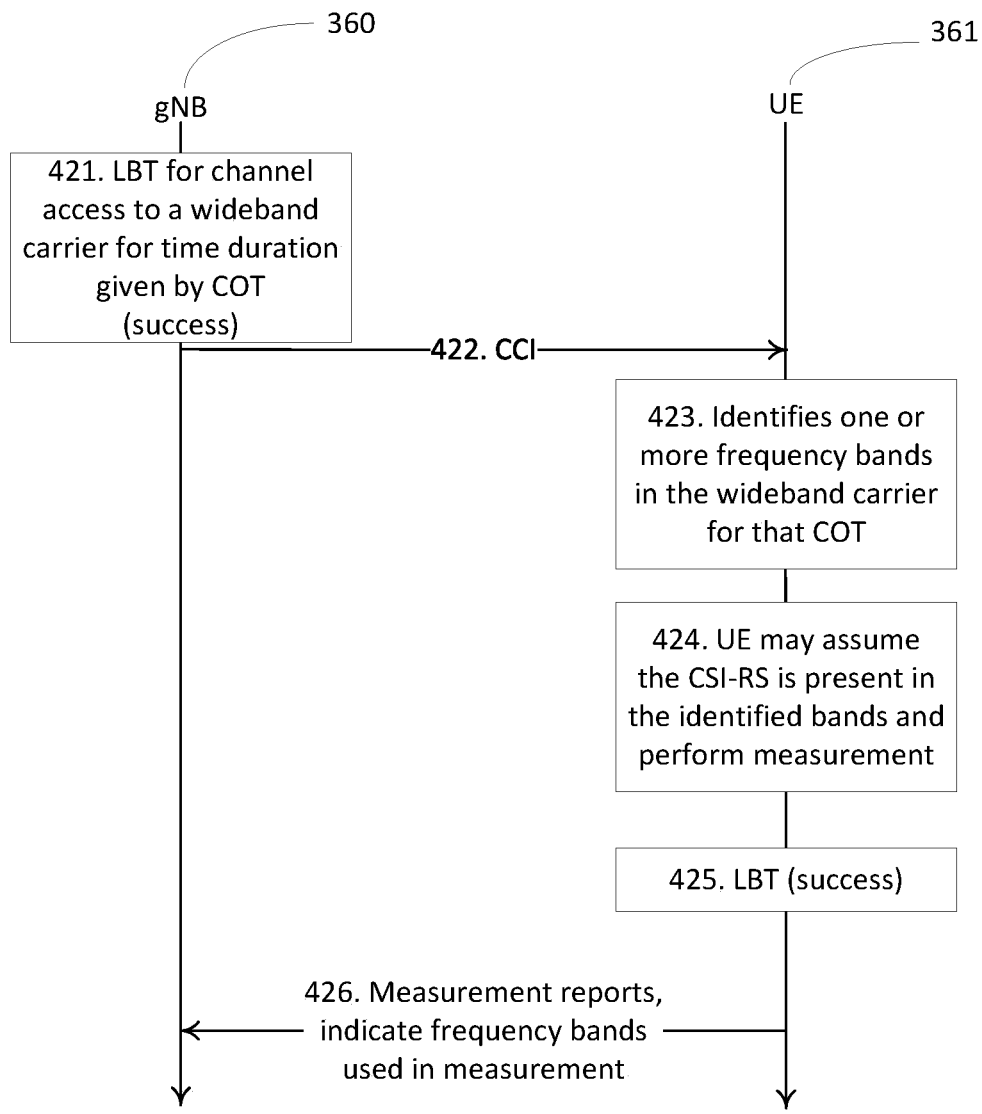
FIG. 54 illustrates an exemplary procedure for UE reporting of measurement. UE identifies the one or more frequency bands in the gNB's COT and performs measurement over CSI-RS in those bands. It may report the measurements and the frequency bands used in the measurement.

Determination of $S_{UE,Step1}$ may depend on UE capability. One UE 361 may detect only one U-SCBW in the COT in the first step while another UE 361 may detect more than one U-SCBW in the COT in the first step. Then the measurements become dependent on the UE 361 capability. To support this, the UE 361 may indicate to the gNB 360 its capability to determine the U-SCBWs in $S_{UE,Step1}$. This may occur through higher layer signaling. Alternatively, the UE 361 may report the band over which a measurement is made during a COT. Note that within a COT, measurements immediately following $S_{UE,Step1}$ could be over smaller bandwidth but subsequent measurements which occur after other U-SCBWs in the COT are determined, may occur over multiple U-SCBWs and therefore, over wider bandwidths. FIG. 54 shows an example of the signaling between gNB 360 and UE 361 to determine the measurement bandwidth and reporting. At step 421, the gNB 360 performs LBT and transmits the CCI to the UE 361 at step 422. Depending on its capability, the UE 361, at step 423, may detect one or more composited U-SCBWs in that COT. UE 361 does measurements based on the identified composited bands at step 424. LBT success at step 425. At step 426, the UE 361 reports measurement and bandwidth over which the measurement was made to the gNB 360.

Figure 51:
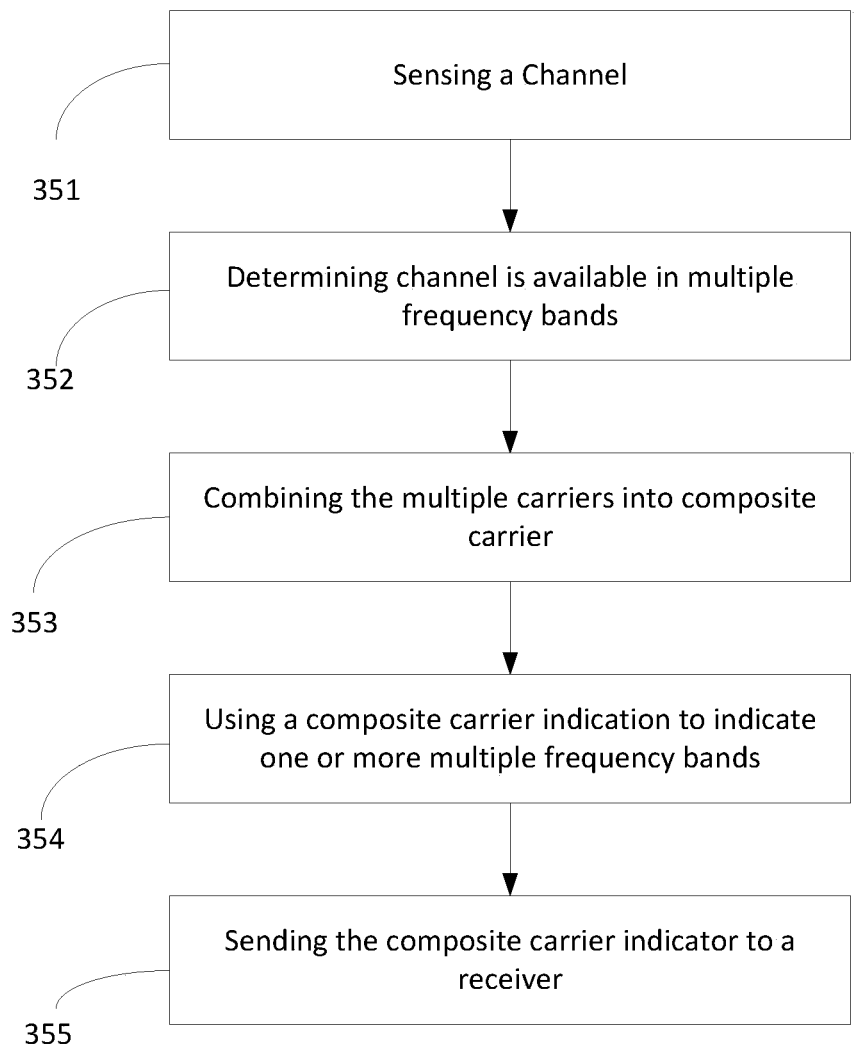
FIG. 51 illustrates an exemplary method flow for channelization BWP as disclosed herein.

FIG. 51 illustrates an exemplary method flow associated with channelization and bandwidth parts as disclosed herein. At step 351, sensing a channel. At step 352, determining a channel is available in multiple frequency bands (e.g., 20 MHz for each carrier) based on the sensing. At step 353, based on the channel being available in multiple frequency bands, combining the multiple frequency bands into a composite carrier. The composite carrier may be a wideband carrier, in which multiple frequency bands total more than 20 MHz. At step 354, using a CCI to indicate one or more frequency bands in the composited carrier. At step 355, sending the CCI to a receiver. The CCI may be sent via a preamble of a Zadoff-Chu sequence, DCI of a UE specific PDCCH, a RRC, or DCI of a group-common PDCCH, among other ways as disclosed herein. Compositing may be restricted to carriers with adjacent frequencies.

Channel, band, and carrier refer to a frequency spectrum. When we say carrier, it is commonly understood as a Cell. So when we say carrier aggregation, each carrier (up to 20 MHz in LTE) is a Cell. A UE is provided an aggregation of spectrum by assigning it multiple cells. However, conventionally, even if adjacent carriers are provided to the a UE, there are guard bands between the cells to avoid spectrum leakage from cell to another as each cell operates independently.

The disclosed subject matter allows for creation of a single wideband carrier by compositing multiple smaller frequency bands provided the node has channel access to those bands. It is contemplated that channel may indicate the frequency band(s) that the node desires to access—this may be narrow or wideband. It is contemplated that individual carriers as used herein, particularly with composite carrier implementation, is compositing of frequency bands.

With regard to LBT, if CAT4 is successful on a first adjacent band (e.g., 20 MHz band) then the transmitter performs CAT2 (e.g., 25 microseconds) on the second band (e.g., 20 MHz band) and if successful then there may be a compositing of the first and second bands into a single carrier. In FR1, the frequency bands may correspond to the 20 MHz carriers used for unlicensed operation in WiFi and LTE-U. In situations when the UE determines that it's network doesn't have access to any of the multiple 20 MHz bands, it may freeze the bandwidth part inactivity timer. It is contemplated that the subject matter of FIG. 51 and the description thereof may be combined with the description as associated with other figures herein.

Note that carrier aggregation that is done conventionally recognizes each carrier as a Cell and has signaling for each carrier. For example, in FR1, LTE-U uses each 20 MHz band as a carrier and may aggregate it as an SCell. It also is more device processor intensive than the disclosed carrier compositing disclosed herein. Carrier compositing as described, provides for multiple frequency bands or carriers to be recognized as one cell for wireless communication between devices. This may lead to less signaling overhead, more spectral efficiency by eliminating the guard spectrum between adjacent frequency bands and reduced load on the processor of a device.

Table 3 includes abbreviations and definitions for some subject matter disclosed herein.

TABLE 3

| Abbreviations and Definitions | |
|---|---|
| BWP | Bandwidth Part |
| CAT2 | Category 2 LBT |
| CAT4 | Category 4 LBT |
| CA | Carrier Aggregation |
| CCI | Composite Carrier Indicator |
| CBRA | Contention Based Random Access |
| CBW | Carrier Bandwidth |
| CCA | Clear Channel Assessment |
| CFRA | Contention Free Random Access |

TABLE 3-continued

| Abbreviations and Definitions | |
|---|---|
| CG | Configured Grant |
| C-RNTI | Cell Radio-Network Temporary Identifier |
| CSI-RS | Channel State Information Reference Signal |
| DC | Dual Connectivity |
| DL | Downlink |
| DL-SCH | Downlink Shared Channel |
| DRS | Discovery Reference Signal |
| DRX | Discontinuous Reception |
| ED | Energy Detection |
| eLAA | evolved Licesnse Assisted Access |
| eMBB | enhanced Mobile Broadband |
| eNB | Evolved Node B |
| FDD | Frequency Division Duplex |
| FR1 | Frequency Range—1 (0.45 GHz to 6 GHz) |
| gNB | NR NodeB |
| HARQ | Hybrid ARQ |
| IE | Information Element |
| KPI | Key Performance Indicators |
| L1 | Layer 1 |
| L2 | Layer 2 |
| L3 | Layer 3 |
| LAA | License Assisted Access |
| LBT | Listen before talk |
| LTE | Long Term Evolution |
| MAC | Medium Access Control |
| MIB | Master Information Block |
| MTC | Machine-Type Communications |
| mMTC | Massive Machine Type Communication |
| NR | New Radio |
| NR-U | NR Unlicensed |
| OFDM | Orthogonal Frequency Division Multiplexing |
| OCB | Occupied Channel Bandwidth |
| PCell | Primary Cell |
| PHY | Physical Layer |
| PRACH | Physical Random Access Channel |
| RACH | Random Access Channel |
| RAN | Radio Access Network |
| RAT | Radio Access Technology |
| RRC | Radio Resource Control |
| RRM | Radio Resource Monitoring |
| RSRP | Reference Signal Received Power |
| RSRQ | Reference Signal Received Quality |
| SA | Stand Alone |
| SCell | Secondary Cell |
| SCG | Secondary Cell Group |
| SC-PTM | Single Cell Point to Multipoint |
| SDU | Service Data Unit |
| SI | System Information |
| SIB | System Information Block |
| SR | Scheduling Request |
| SS | Synchronization Signal |
| SSB | SS Block |
| TDD | Time Division Duplex |
| TRP | Transmission and Reception Point |
| TTI | Transmission Time Interval |
| UE | User Equipment |
| UL | Uplink |
| UL-SCH | Uplink Shared Channel |
| URLLC | Ultra-Reliable and Low Latency Communications |

It is understood that the entities performing the steps illustrated herein, such as steps in FIG. 9-FIG. 12, FIG. 19, FIG. 28, FIG. 30, FIG. 36, FIG. 39, FIG. 41, among others, may be logical entities. The steps may be stored in a memory of, and executing on a processor of, a device, server, or computer system such as those illustrated in FIG. 43F or FIG. 43G. Skipping steps, combining steps, or adding steps between exemplary methods disclosed herein (e.g., FIG. 9-FIG. 12, FIG. 19, FIG. 28, FIG. 30, FIG. 36, FIG. 39, FIG. 41, among others) is contemplated.

Figure 42:
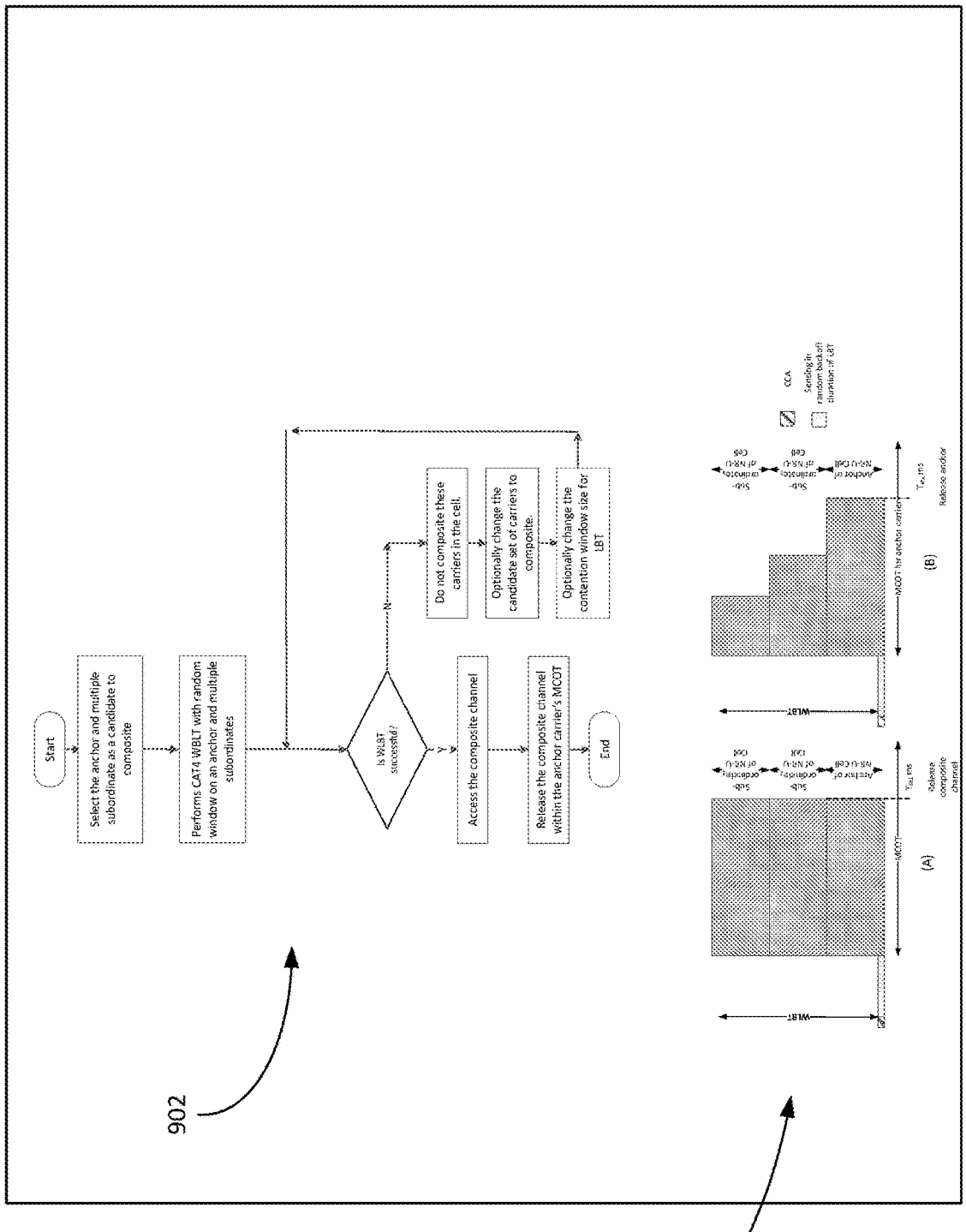
FIG. 42 illustrates an exemplary display (e.g., graphical user interface) that may be generated based on the methods and systems of mobility signaling load reduction.

FIG. 42 illustrates an exemplary display (e.g., graphical user interface) that may be generated based on the methods and systems for channelization and BWP, as discussed herein. Display interface 901 (e.g., touch screen display)

may provide text in block 902 associated with channelization and BWP, such as whether the WLBT is successful. Progress of any of the steps (e.g., sent messages or success of steps) discussed herein may be displayed in block 902. In addition, graphical output 902 may be displayed on display interface 901. Graphical output 903 may be the topology of the devices implementing the methods and systems for channelization and BWP, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHZ, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHZ, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 43A:
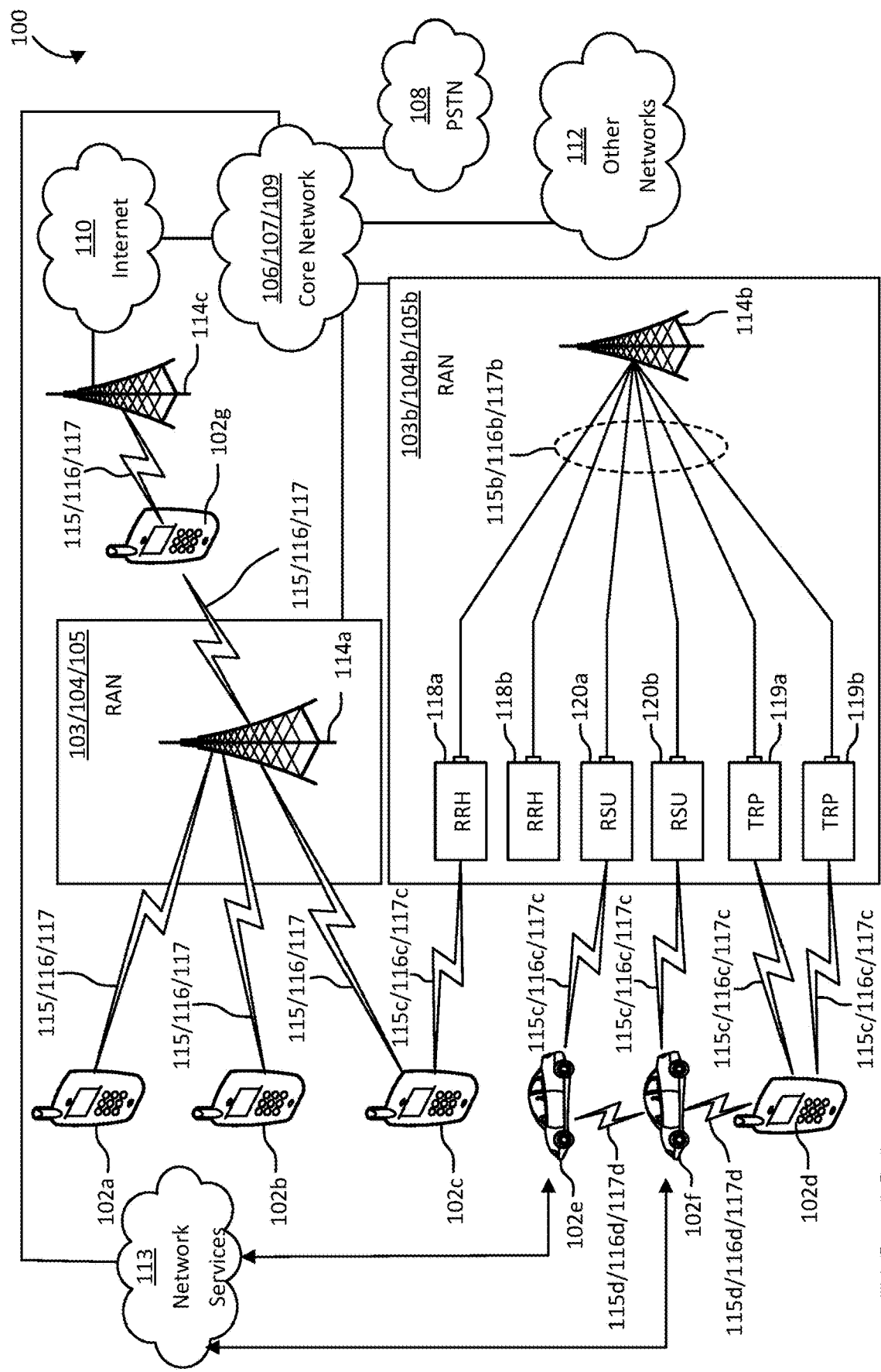
FIG. 43A illustrates an example communications system.

FIG. 43A illustrates an example communications system 100 in which the methods, systems, and apparatuses (e.g., UE or gNB) for channelization and BWP, such as the examples illustrated in FIG. 2 through FIG. 22 described and claimed herein may be used. The communications system 100 may include wireless transmit/receive units (WTRUs) 102*a*, 102*b*, 102*c*, 102*d*, 102*e*, 102*f*, or 102*g* (which generally or collectively may be referred to as WTRU 102 or WTRUs 102). The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102*a*, 102*b*, 102*c*, 102*d*, 102*e*, 102*f*, or 102*g* may be any type of apparatus or device configured to operate or communicate in a wireless environment. Although each WTRU 102*a*, 102*b*, 102*c*, 102*d*, 102*c*, 102*f*, or 102*g* may be depicted in FIG. 43A, FIG. 43B, FIG. 43C, FIG. 43D, FIG. 43E, or FIG. 43F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114*a* and a base station 114*b*. In the example of FIG. 43A, each base stations 114*a* and 114*b* is depicted as a single element. In practice, the base stations 114*a* and 114*b* may include any number of interconnected base stations or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, or the other networks 112. Similarly, base station 114*b* may be any type of device configured to wiredly or wirelessly interface with at least one of the Remote Radio Heads (RRHs) 118*a*, 118*b*, Transmission and Reception Points (TRPs) 119*a*, 119*b*, or Roadside Units (RSUs) 120*a* and 120*b* to facilitate access to one or more communication networks, such as the core network 106/107/109, the Internet 110, other networks 112, or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, or other networks 112

TRPs 119*a*, 119*b* may be any type of device configured to wirelessly interface with at least one of the WTRU 102*d*, to facilitate access to one or more communication networks, such as the core network 106/107/109, the Internet 110, Network Services 113, or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, apparatuses, and systems for channelization and BWP, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102c, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mm Wave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102c, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 43A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of channelization and BWP, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 43A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VOIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 43A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of channelization and BWP, as disclosed herein. For example, the WTRU 102g shown in FIG. 43A may be configured to communicate with the base station 114a, which may employ a cellular-based radio technology, and with the base station 114c, which may employ an IEEE 802 radio technology.

Although not shown in FIG. 43A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 43B:
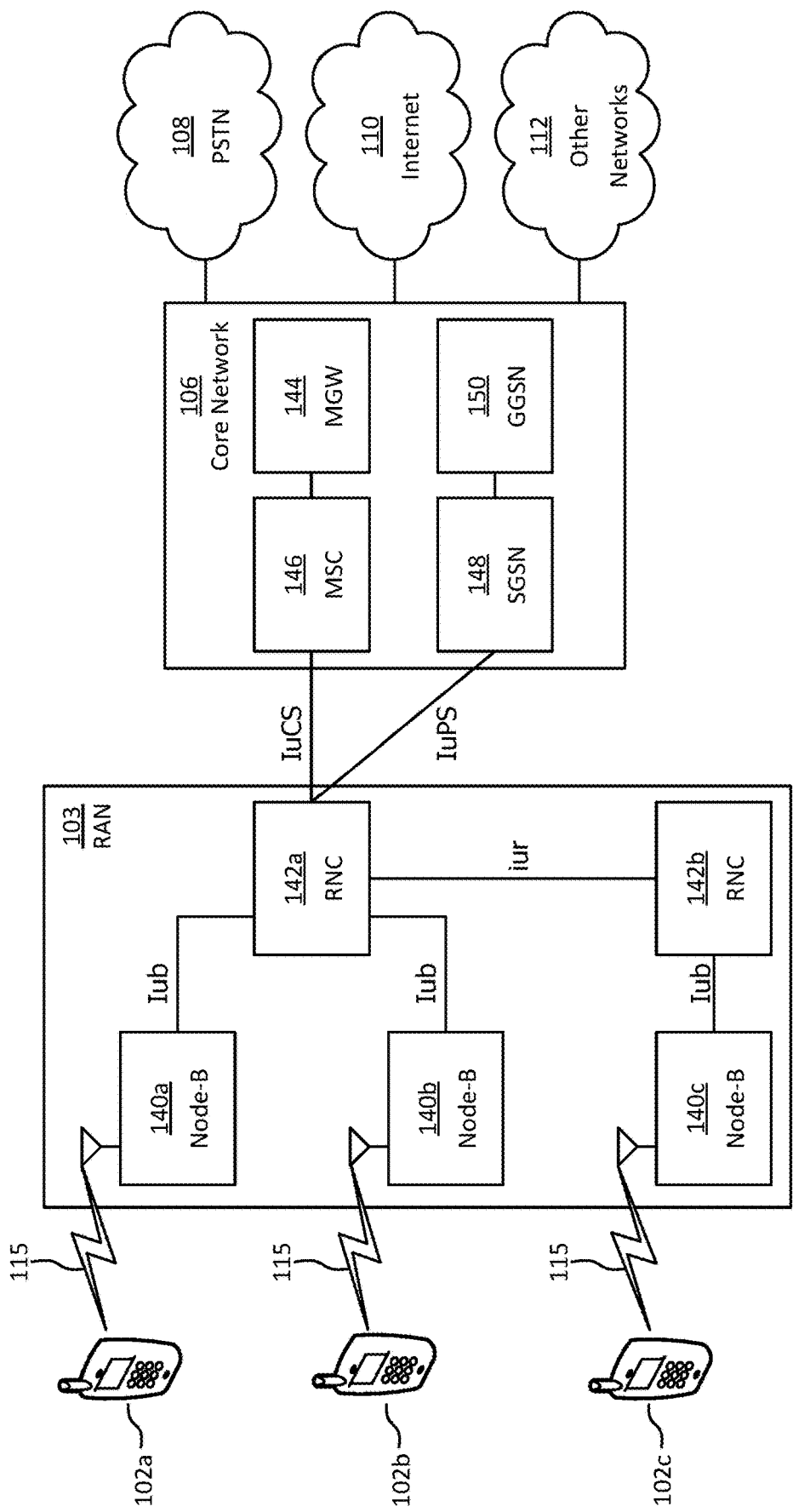
FIG. 43B illustrates an exemplary system that includes RANs and core networks.

FIG. 43B is a system diagram of an example RAN 103 and core network 106 that may implement methods, systems, and devices of channelization and BWP, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 43B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 43B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 43B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 43C:
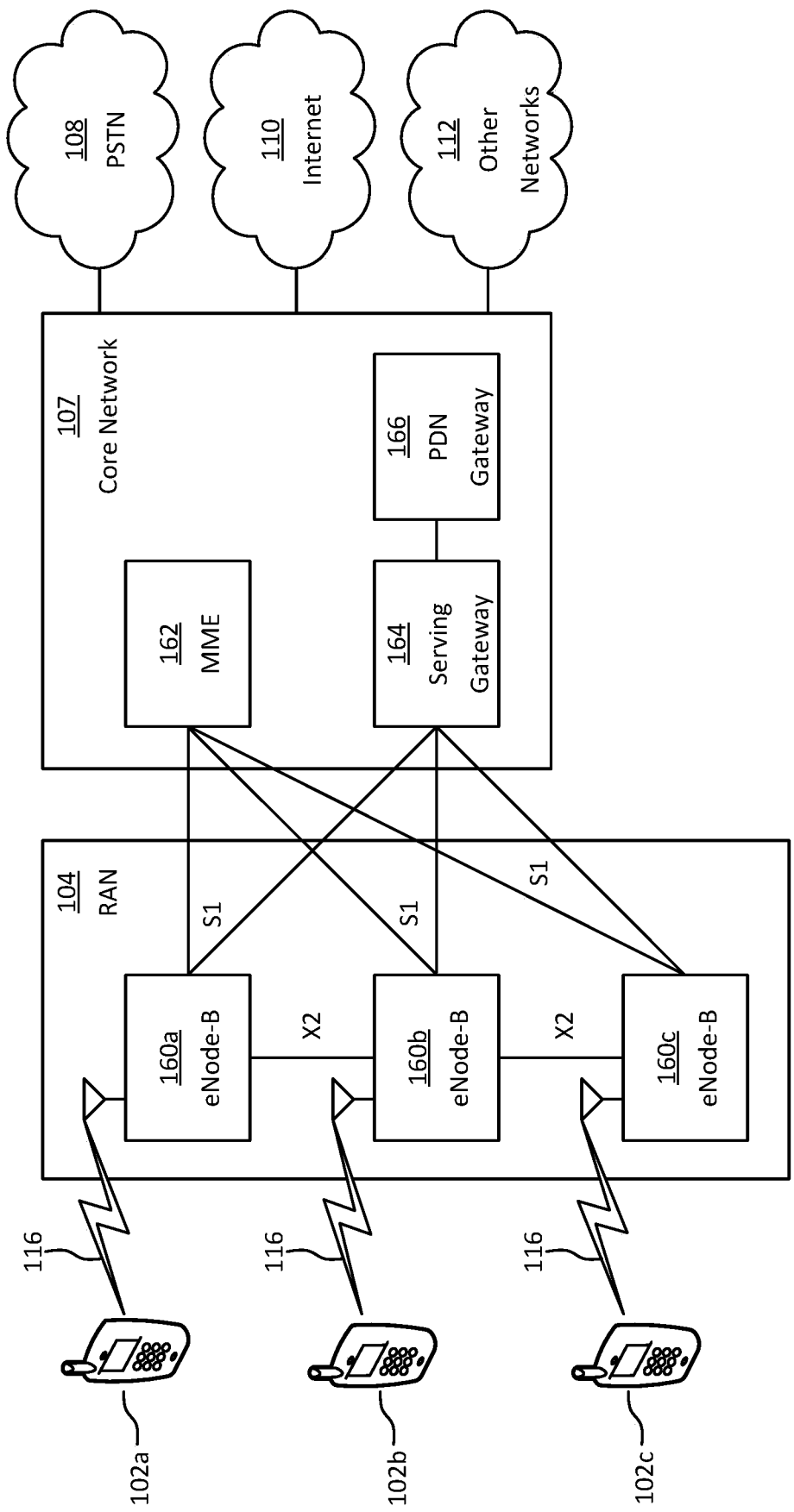
FIG. 43C illustrates an exemplary system that includes RANs and core networks.

FIG. 43C is a system diagram of an example RAN 104 and core network 107 that may implement methods, systems, and devices of channelization and BWP, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 43C, the eNode-Bs 160a, 160b, and 160c may communicate with one another over an X2 interface.

The core network 107 shown in FIG. 43C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the SI interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 43D:
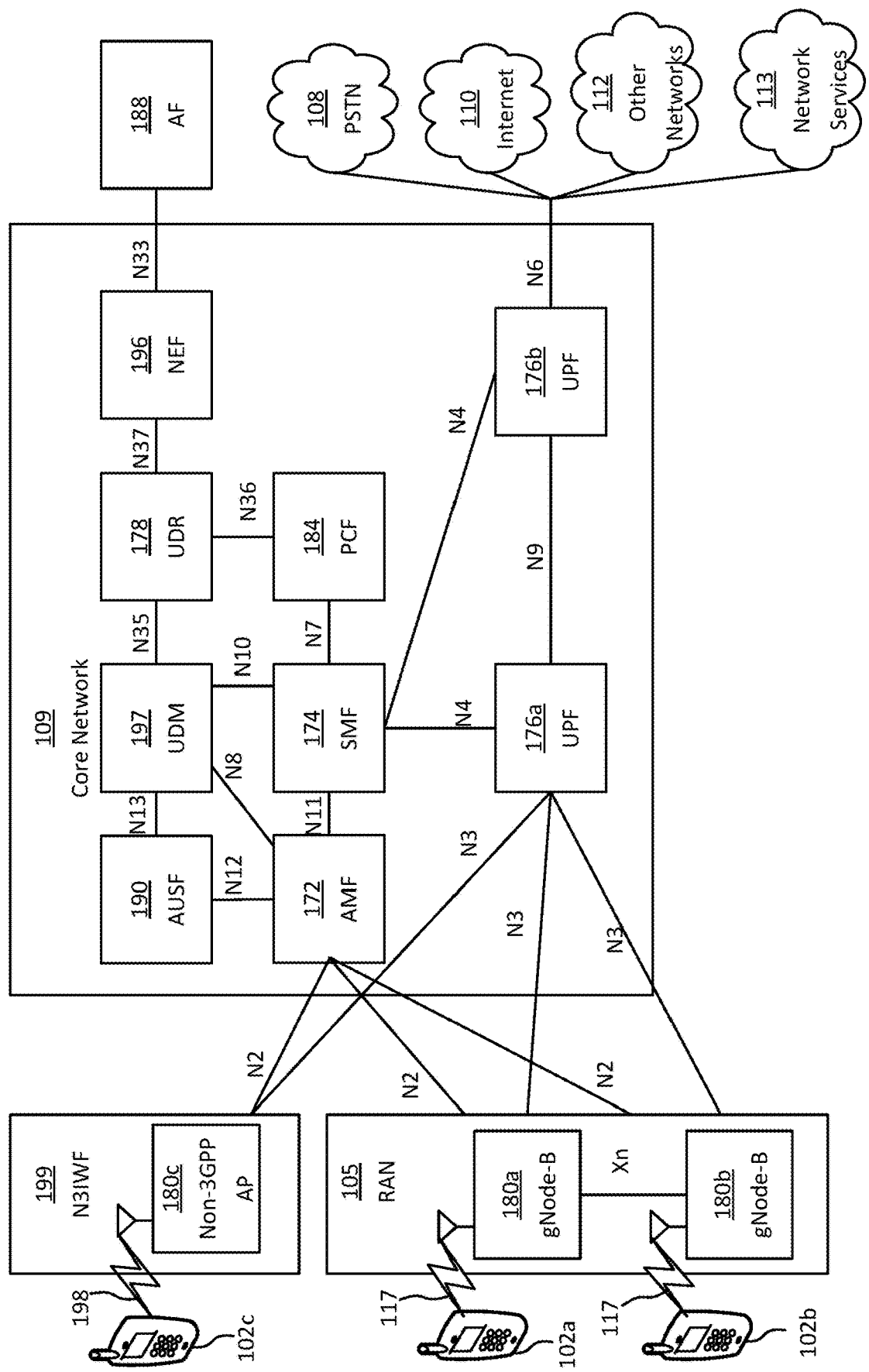
FIG. 43D illustrates an exemplary system that includes RANs and core networks.

FIG. 43D is a system diagram of an example RAN 105 and core network 109 that may implement methods, systems, and devices of channelization and BWP, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 43D, the gNode-Bs 180a and 180b may communicate with one another over an Xn interface, for example.

The core network 109 shown in FIG. 43D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 43G.

In the example of FIG. 43D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 43D shows that network functions directly connect to one another, however, it should be appreciated that they may communicate via routing agents such as a diameter routing agent or message buses.

In the example of FIG. 43D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 43D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 43D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 43D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 43A, FIG. 43C, FIG. 43D, or FIG. 43E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 43A, FIG. 43B, FIG. 43C, FIG. 43D, or FIG. 43E are provided by way of example only, and it is understood that the subject matter disclosed and claimed herein may be embodied or implemented in any similar communication system, whether presently defined or defined in the future.

Figure 43E:
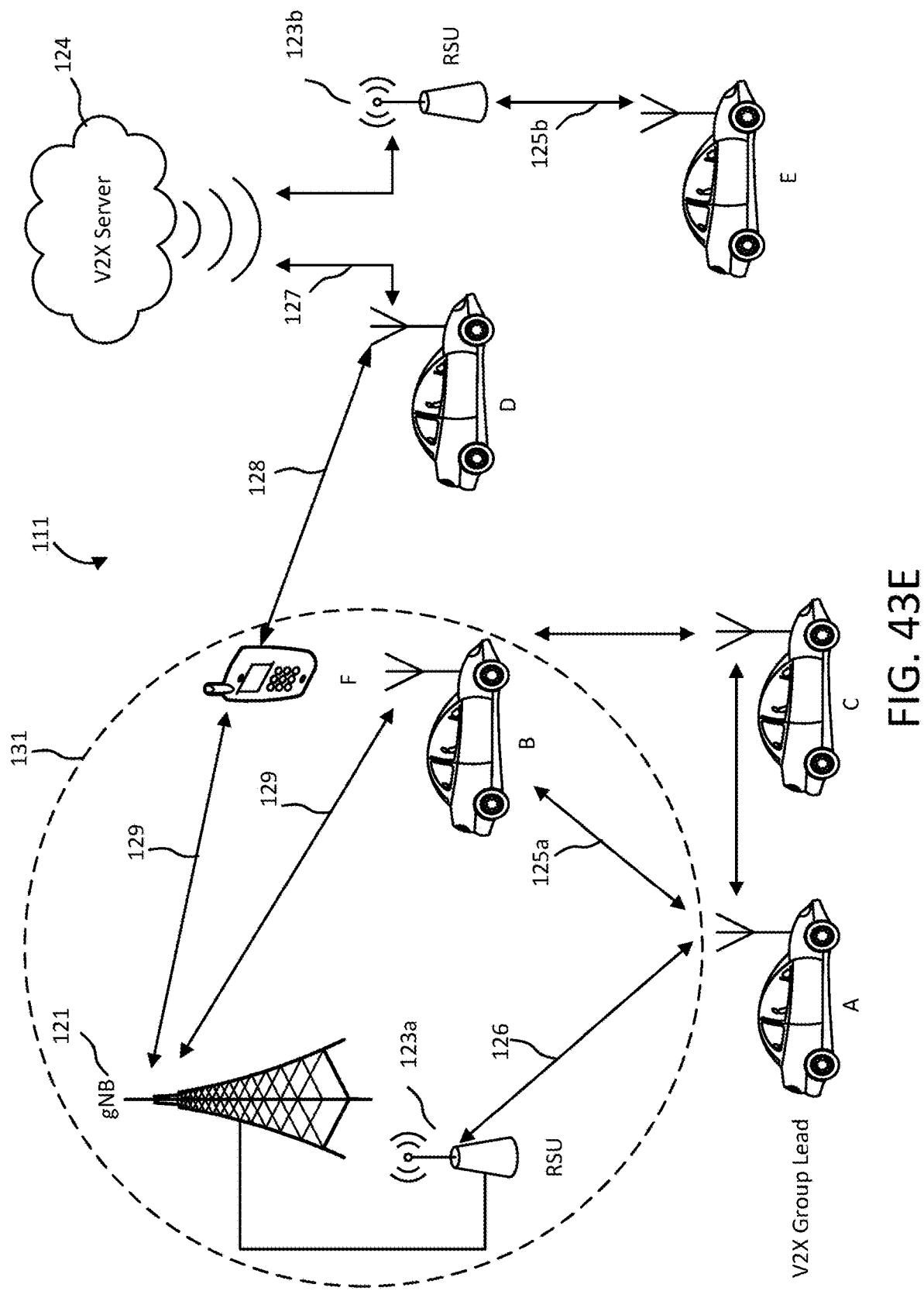
FIG. 43E illustrates another example communications system.

FIG. 43E illustrates an example communications system 111 in which the systems, methods, apparatuses that implement channelization and BWP, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUS A, B, C, D, E, and F may communicate with each other over a Uu interface 129 via the gNB 121 if they are within the access network coverage 131. In the example of FIG. 43E, WTRUs B and F are shown within access network coverage 131. WTRUS A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 43E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 43F:
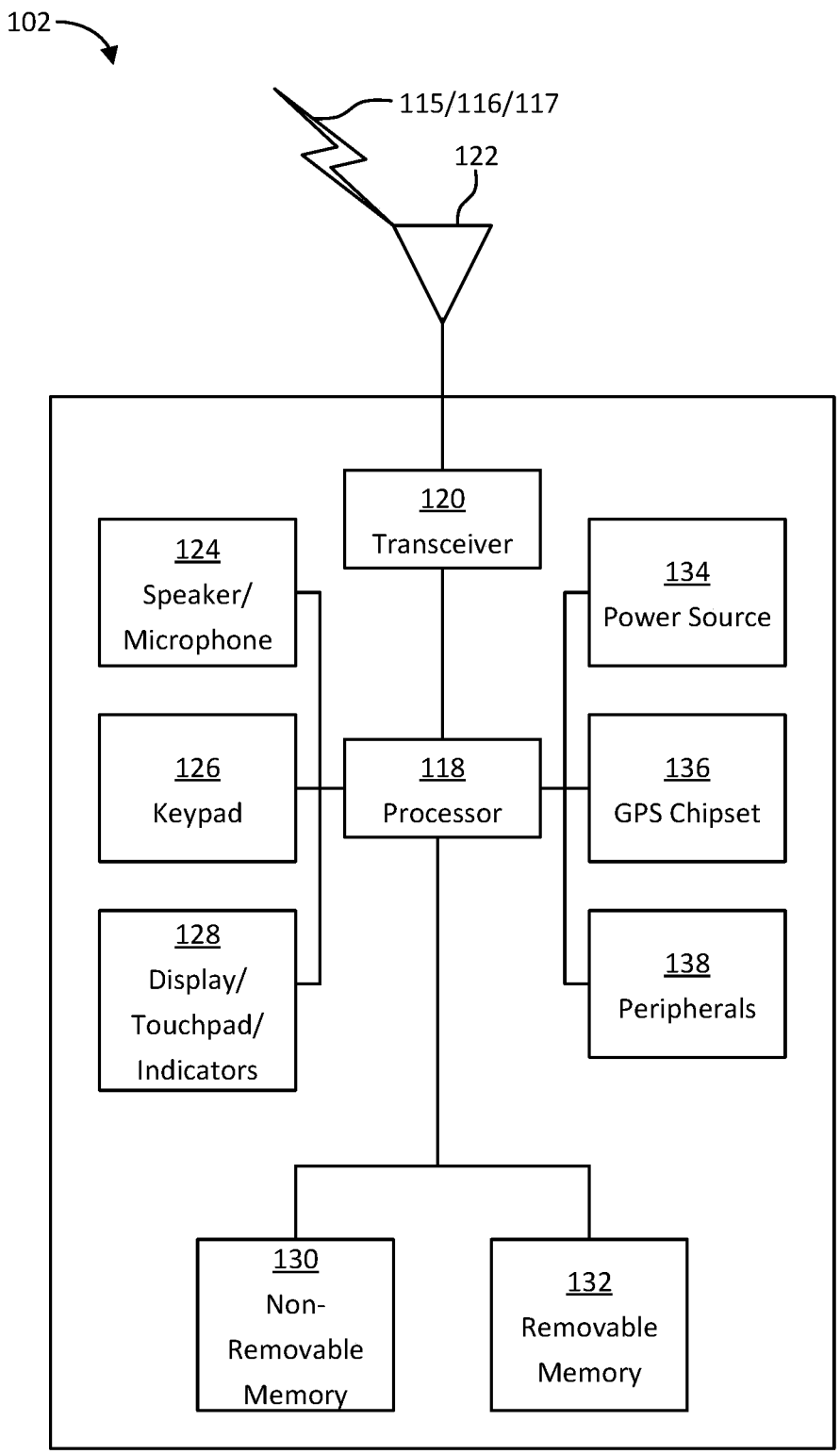
FIG. 43F is a block diagram of an example apparatus or device, such as a WTRU.

FIG. 43F is a block diagram of an example apparatus or device WTRU 102 that may be configured for wireless communications and operations in accordance with the systems, methods, and apparatuses that implement channelization and BWP, described herein, such as a WTRU 102 of FIG. 43A, FIG. 43B, FIG. 43C, FIG. 43D, or FIG. 43E, or UE's disclosed throughout, such as UE 361. As shown in FIG. 43F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B) (e.g., gNB 360), and proxy nodes, among others, may include some or all of the elements depicted in FIG. 43F and may be an exemplary implementation that performs the disclosed methods for channelization and BWP described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 43F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 43A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 43F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the for channelization and BWP in some of the examples described herein work as intended, or otherwise indicate a status of associated components. The control lighting patterns, images, or colors on the display or indicators 128 may be reflective of the status of any of the method flows or components in the FIG.'s illustrated or discussed herein (e.g., FIG. 9-FIG. 12, FIG. 19, etc.). Disclosed herein are messages and procedures for channelization and BWP. The messages and procedures may be extended to provide interface/API for users to request resources via an input source (e.g., speaker/microphone 124, keypad 126, or display/touchpad/indicators 128) and request, configure, or query for channelization and BWP related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 43G:
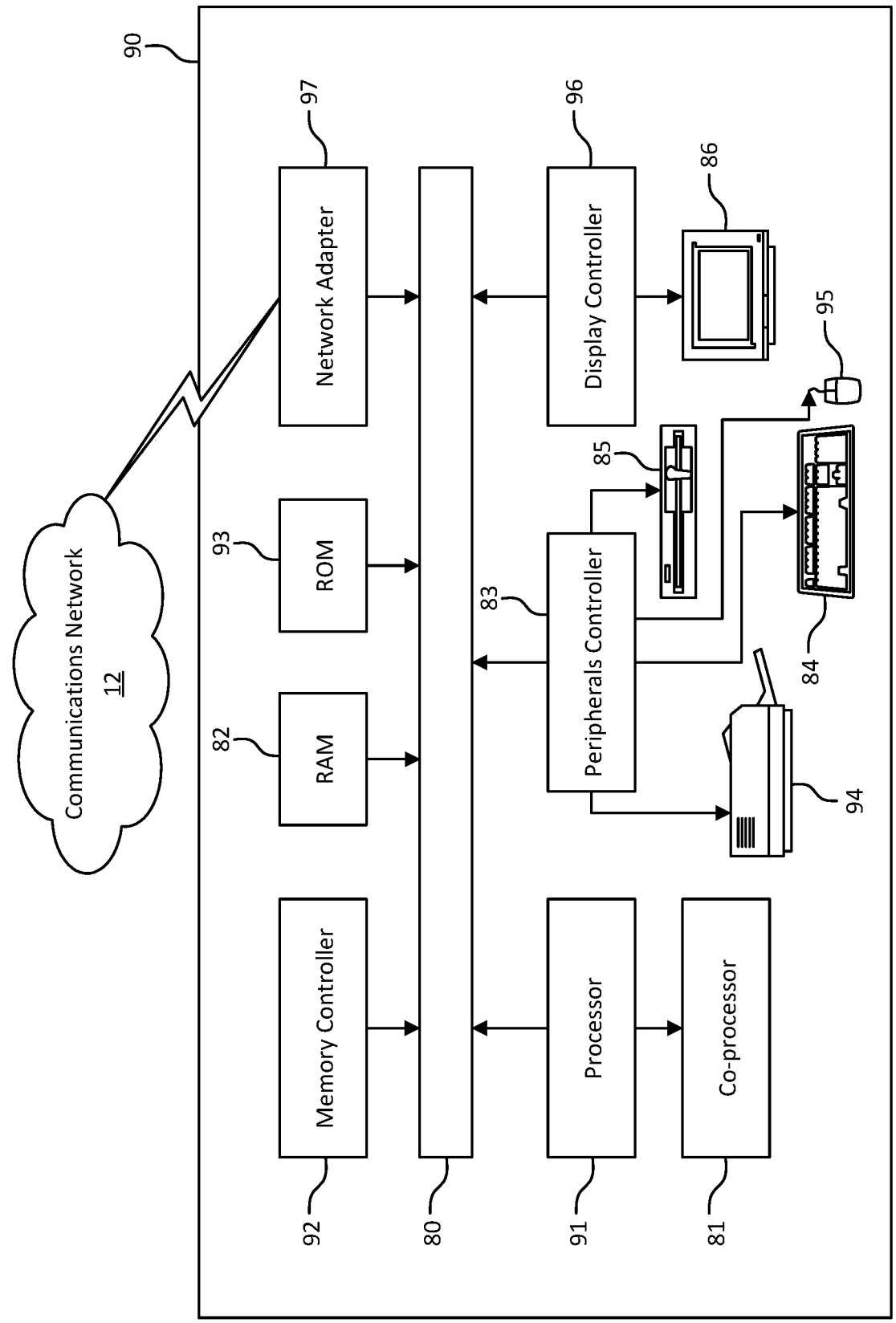
FIG. 43G is a block diagram of an exemplary computing system.

FIG. 43G is a block diagram of an exemplary computing system 90 in which one or more apparatuses of the communications networks illustrated in FIG. 43A, FIG. 43C, FIG. 43D and FIG. 43E as well as channelization and BWP, such as the systems and methods illustrated in described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for channelization and BWP, such as success of WLBT.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 43A, FIG. 43B, FIG. 43C, FIG. 43D, or FIG. 43E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—channelization and BWP—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

User equipment may share the channel occupancy time with the transmitter and transmit data to the transmitter after successful CAT2 channel sensing over frequency bands spanning its data resources. UE may transmit UL PUSCH within the COT obtained by the gNB because gNb allows the UE to share the COT. Then UE performs short LBT (CAT2). If that is successful it may transmit. This claim provides what frequency the UE perform LBT. UE may perform LBT over the frequency bands that cover the UL PUSCH resources.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims. The described subject matter herein for anchor carrier may apply to non-anchor carrier-based deployments. Similarly, subject matter herein described for non-anchor based may apply to anchor-carrier based deployments. For example, this idea of indicating the 20 MHz in carrier can apply to both cases. The methods of indicating it (like bitmap in FIG. 4) may apply to both cases. Again, the described subject matter may be seen in the context of the respective cases but be applicable to both cases.

Methods, systems, and apparatuses, among other things, as described herein may provide for means for performing wireless communication. A method, system, computer readable storage medium, or apparatus has means for determining that a channel is available based on an indication of a composite carrier indicator (CCI); and based on the determining that the channel is available, dynamically increasing bandwidth by adding subordinates to an anchor cell. monitoring a first anchor and a second anchor for a composite carrier indicator (CCI); when CCI is obtained in the first anchor, increasing a bandwidth on a first receive chain when required to receive a first cell with a subordinate for the second anchor; and do not monitor a second cell on the second receive chain until the first cell grant is complete or the first cell releases the subordinate for the second anchor. The apparatus may be a base station or a user equipment. A method, system, computer readable storage medium, or apparatus has means for sensing a channel; based on the sensing, determining that the channel is available in multiple frequency bands, based on the determining that the channel is available in multiple frequency bands, combining the multiple frequency bands into a composite carrier; generating a composite carrier indicator (CCI) that indicates one or more of the multiple frequency bands that are within the composite carrier; communicating the CCI to a receiver. The multiple frequency bands may be 20 MHz each. The composite carrier may be a wideband carrier. The apparatus may be a base station, a user equipment, or other device. The CCI may be obtained or communicated via a preamble of a Zadoff-Chu sequence, downlink control information, an uplink grant, a downlink grant, or a radio resource control signaling. The CCI may be obtained or communicated via downlink control information of a UE specific PDCCH or downlink control information of a group-common PDCCH. The carriers may only be composited when adjacent in frequency. The method, system, computer readable storage medium, or apparatus has means for determining that a category four listen-before talk (LBT) is successful on a first carrier of the multiple frequency bands; based on the category four LBT being successful on the first carrier of the multiple frequency bands and the first carrier being adjacent to a second carrier, performing a category two LBT on the second carrier; and based on the category two LBT being successful, compositing the first carrier and the second carrier into the composite carrier. The method, system, computer readable storage medium, or apparatus has means for determining that a base station does not have access to a first carrier; and based on the determining that the base station does not have access to the first carrier, pausing a bandwidth part inactivity timer. The method, system, computer readable storage medium, or apparatus has means for gaining channel access to a pre-defined anchor frequency band before compositing other frequency bands to form the composite carrier. If it does not have channel access the anchor frequency bands, it may not form a composite carrier with other frequency bands that may be available during that channel access opportunity. Method, system, computer readable storage medium, or apparatus has means for obtaining a composite carrier indicator (CCI) from a transmitter; based on the CCI, identifying the bandwidth of a composite carrier; based on identifying one or more frequency bands in the transmitter's composite carrier, performing measurements, transmission, reception, or synchronization. UE may receive knowledge of all or part of gNB's frequency bands and performs procedures (e.g., transmitting, receiving, etc.) on those bands. A user equipment may share the channel occupancy time with the transmitter and transmit data to the transmitter after successful CAT2 channel sensing over frequency bands spanning its data resources. The user equipment may share the channel occupancy time with the transmitter and transmit data to the transmitter after successful CAT2 channel sensing over frequency bands spanning its BWP. The user equipment may share the channel occupancy time with the transmitter and transmit data to the transmitter after successful CAT2 channel sensing not exceeding the composite carrier bandwidth of the transmitter. All combinations in this paragraph (including the removal or addition of steps) are contemplated in a manner that is consistent with the other portions of the detailed description.

What is claimed:

1. A wireless transmit/receive unit (WTRU) comprising a processor and memory, the processor and memory configured to:
    receive, from a network node, a composite carrier indicator (CCI), wherein the CCI is communicated via downlink control information (DCI) of a physical downlink control channel (PDCCH) transmission via a common search space, wherein the CCI is for identification of a plurality of frequency bands that are available in an unlicensed carrier, and the DCI indicates a channel occupancy time associated with the plurality of frequency bands that are identified as available in the unlicensed carrier;
    determine that an uplink transmission is comprised within the plurality of frequency bands that are identified as available in the unlicensed carrier and that the uplink transmission occurs within the channel occupancy time indicated by the DCI;
    determine that at least one guard band is available for the uplink transmission based at least on determining that the guard band is between the plurality of frequency bands used for the uplink transmission;
    based on determining that that the uplink grant comprised within the plurality of frequency bands that are identified as available in the unlicensed carrier occurs within the channel occupancy time indicated by the DCI, determine to switch from a first type of listen before talk (LBT) procedure to a second type LBT procedure for the uplink transmission;
    determine that the second type of LBT procedure is successful for the uplink transmission comprised within the plurality of frequency bands that are identified as available in the unlicensed carrier occurring within the channel occupancy time indicated by the DCI; and
    send the uplink transmission based on the second type of LBT being successful.

2. The WTRU of claim 1, wherein the plurality of frequency bands comprise a first frequency band and a second frequency band, the first and second frequency bands being separated by the guard band.

3. The WTRU of claim 2, wherein the first frequency band is adjacent to the second frequency band of the plurality of frequency bands.

4. The WTRU of claim 1, wherein each of the plurality of frequency bands are associated with the same maximum channel occupancy time (MCOT).

5. The WTRU of claim 1, wherein the plurality of frequency bands correspond to a composite carrier.

6. The WTRU of claim 1, wherein the plurality of frequency bands correspond to frequency resources that are separated a plurality of guard bands.

7. A method implemented by a wireless transmit receive unit (WTRU), the method comprising:
    receiving, from a network node, a composite carrier indicator (CCI), wherein the CCI is communicated via downlink control information (DCI) of a physical downlink control channel (PDCCH) transmission via a common search space, wherein the CCI is for identification of a plurality of frequency bands that are available in an unlicensed carrier, and the DCI indicates a channel occupancy time associated with the plurality of frequency bands that are identified as available in the unlicensed carrier;
    determining that an uplink transmission is comprised within the plurality of frequency bands that are identified as available in the unlicensed carrier and that the uplink transmission occurs within the channel occupancy time indicated by the DCI;
    determining that at least one guard band is available for the uplink transmission based at least on determining that the guard band is between the plurality of frequency bands used for the uplink transmission;
    based on determining that that the uplink grant comprised within the plurality of frequency bands that are identified as available in the unlicensed carrier occurs within the channel occupancy time indicated by the DCI, determining to switch from a first type of listen before talk (LBT) procedure to a second type LBT procedure for the uplink transmission;
    determining that the second type of LBT procedure is successful for the uplink transmission comprised within the plurality of frequency bands that are identified as available in the unlicensed carrier occurring within the channel occupancy time indicated by the DCI; and sending the uplink transmission based on the LBT being successful.

8. The method of claim 7, wherein the plurality of frequency bands comprise a first frequency band and a second frequency band, the first and second frequency bands being separated by the guard band.

9. The method of claim 8, wherein the first frequency band is adjacent to the second frequency band of the plurality of frequency bands.

10. The method of claim 7, wherein each of the plurality of frequency bands are associated with the same maximum channel occupancy time (MCOT).

11. The method of claim 7, wherein the plurality of frequency bands correspond to a composite carrier.

12. The method of claim 7, wherein the plurality of frequency bands correspond to frequency resources that are separated a plurality of guard bands.

13. The method of claim 7, wherein sending the uplink transmission comprises sending the uplink transmission via at least one resource corresponding to the guard band.

14. The method of claim 7, wherein the PDCCH transmission corresponds to a group common PDCCH transmission received using radio network temporary identifier received via higher layer signaling.

15. The method of claim 7, further comprising:
determining that traffic of a specified priority is available for transmission;
determining that a first configured grant or a plurality of configured grants is configured for transmission of traffic of the specified priority;
determining whether a physical uplink shared channel (PUSCH) transmission corresponding to the configured grants is within the plurality of frequency bands that are identified as available in the unlicensed carrier and that the PUSCH transmission corresponding to the configured grant occurs within the channel occupancy time indicated by the DCI;
on condition that the PUSCH transmission corresponding to the configured grants is not within the plurality of frequency bands that are identified as available in the unlicensed carrier or that the PUSCH transmission corresponding to the configured grant does not occur within the channel occupancy time indicated by the DCI, performing the first type of LBT procedure for the PUSCH transmission corresponding to the configured grant; and
on condition that the PUSCH transmission corresponding to the configured grants is within the plurality of frequency bands that are identified as available in the unlicensed carrier and that the PUSCH transmission corresponding to the configured grant occurs within the channel occupancy time indicated by the DCI, performing the second type of LBT procedure for the PUSCH transmission corresponding to the configured grant.

16. The method of claim 7, wherein the first type of LBT procedure corresponds to a category four (CAT4) LBT procedure, and the second type of LBT procedure corresponds to a category two (CAT2) LBT procedure.

17. The WTRU of claim 1, wherein the processor and memory being configured to send the uplink transmission comprises the processor and memory being configured to send the uplink transmission via at least one resource corresponding to the guard band.

18. The WTRU of claim 1, wherein the PDCCH transmission corresponds to a group common PDCCH transmission received using radio network temporary identifier received via higher layer signaling.

19. The WTRU of claim 1, wherein the processor and memory are configured to:
determine that traffic of a specified priority is available for transmission;
determine that a first configured grant or a plurality of configured grants is configured for transmission of traffic of the specified priority;
determine whether a physical uplink shared channel (PUSCH) transmission corresponding to the configured grants is within the plurality of frequency bands that are identified as available in the unlicensed carrier and that the PUSCH transmission corresponding to the configured grant occurs within the channel occupancy time indicated by the DCI;
on condition that the PUSCH transmission corresponding to the configured grants is not within the plurality of frequency bands that are identified as available in the unlicensed carrier or that the PUSCH transmission corresponding to the configured grant does not occur within the channel occupancy time indicated by the DCI, perform the first type of LBT procedure for the PUSCH transmission corresponding to the configured grant; and
on condition that the PUSCH transmission corresponding to the configured grants is within the plurality of frequency bands that are identified as available in the unlicensed carrier and that the PUSCH transmission corresponding to the configured grant occurs within the channel occupancy time indicated by the DCI, perform the second type of LBT procedure for the PUSCH transmission corresponding to the configured grant.

20. The WTRU of claim 1, wherein the first type of LBT procedure corresponds to a category four (CAT4) LBT procedure, and the second type of LBT procedure corresponds to a category two (CAT2) LBT procedure.

* * * * *